United States Patent [19]

Qualizza

[11] Patent Number: 5,235,316
[45] Date of Patent: Aug. 10, 1993

[54] VEHICLE COLLISION AVOIDANCE SYSTEM

[76] Inventor: Gregory K. Qualizza, 7335 W. 80th St., Bridgeview, Ill. 60455

[21] Appl. No.: 811,301

[22] Filed: Dec. 20, 1991

[51] Int. Cl.$^5$ .......................... B60Q 1/00; G01S 15/00
[52] U.S. Cl. .................................. 340/436; 340/435; 340/903; 367/87; 367/909; 180/167; 180/271
[58] Field of Search ................................ 340/435–437, 340/903; 367/93, 94, 909, 87, 95; 180/167, 271

[56] References Cited

U.S. PATENT DOCUMENTS

| | | | |
|---|---|---|---|
| 4,240,152 | 12/1980 | Duncan et al. | 367/909 |
| 4,278,962 | 7/1981 | Lin | 340/436 |
| 4,490,716 | 12/1984 | Tsuda et al. | 367/909 |
| 4,618,948 | 10/1986 | Sakakibara et al. | 367/909 |
| 4,674,073 | 6/1987 | Naruse | 367/909 |
| 4,694,295 | 9/1987 | Miller et al. | 340/903 |
| 4,849,731 | 7/1989 | Melocik | 340/903 |
| 4,943,796 | 7/1990 | Lee | 340/435 |
| 5,059,946 | 10/1991 | Hollowbush | 340/435 |

FOREIGN PATENT DOCUMENTS 0028050 1/1989 Japan .................................. 340/436

Primary Examiner—Donnie L. Crosland
Attorney, Agent, or Firm—Charles F. Meroni, Jr.

[57] ABSTRACT

The collision avoidance system includes structure mountable at the side mirror position of a vehicle. The system includes a rotatable mirror and an ultrasonic transmitting and receiving unit which is adaptable to scan a predetermined area about the vehicle to detect the presence of an object and to calculate its distance from the vehicle. If the distance and speed are determined to pose a threat, the distance is placed on a display and an alarm is sounded. Two displays are provided, one for the forward end of the vehicle and another for the rear end of the vehicle. The system operates when the vehicle is moving forwardly and rearwardly. Also, when the vehicle is not moving, the presence of a potential intruder is also monitored and the system can actuate an anti-theft alarm of the vehicle. Further, the system can be programmed by a plurality of operators to particular distances, with the system discerning which operator is driving and automatically using that operator's input.

42 Claims, 22 Drawing Sheets

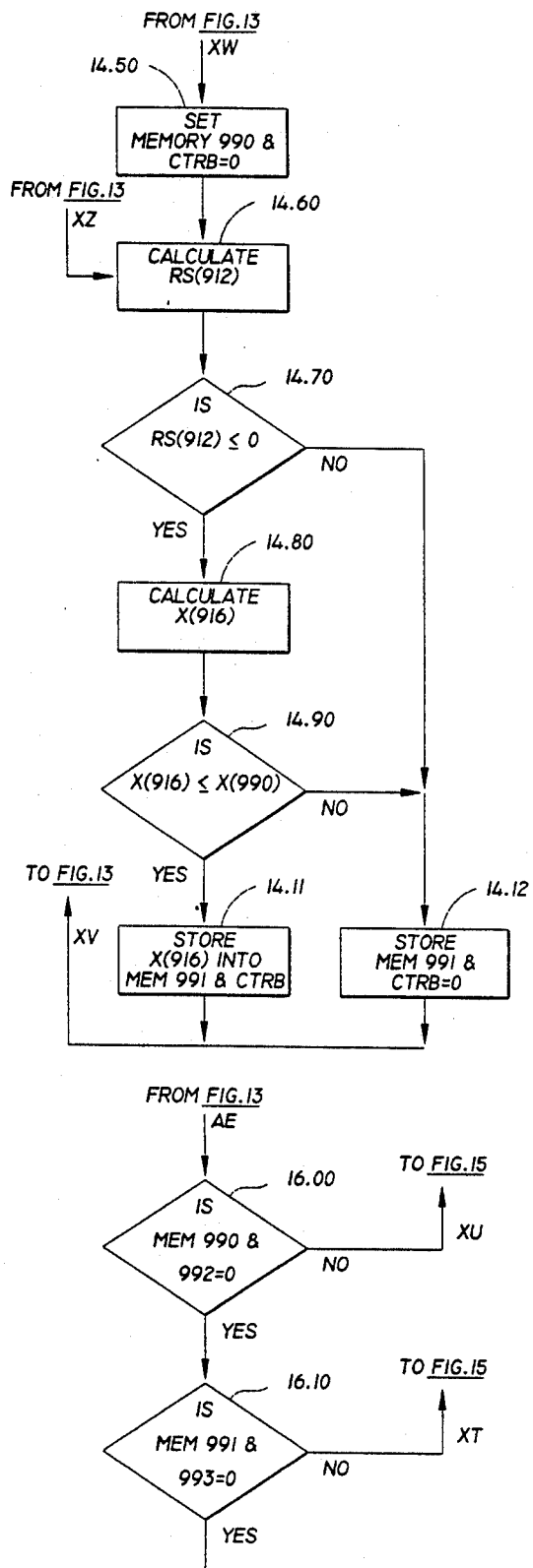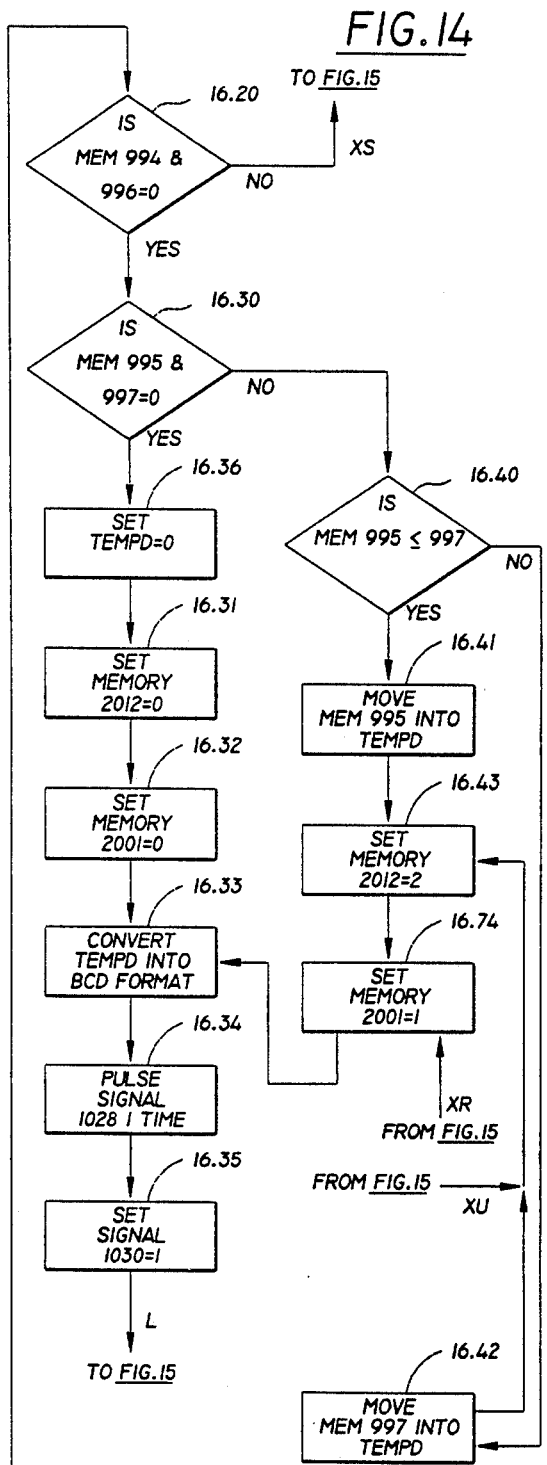
FIG.14

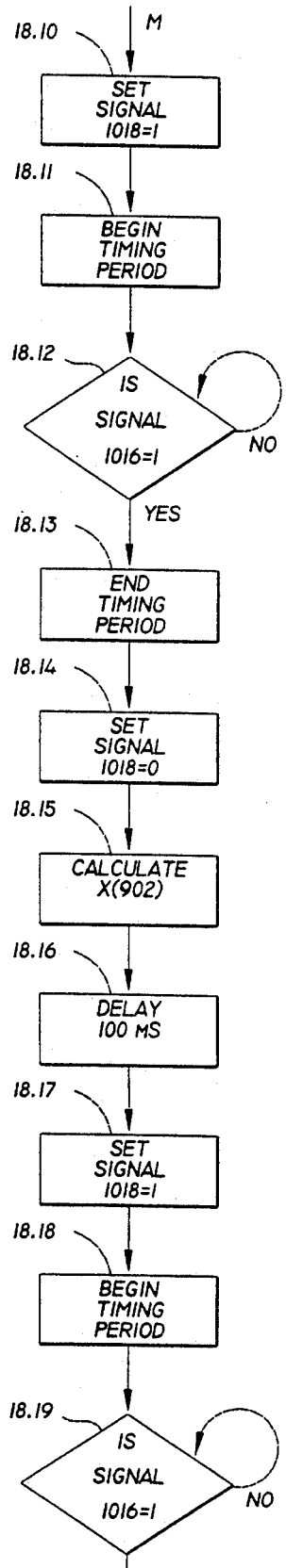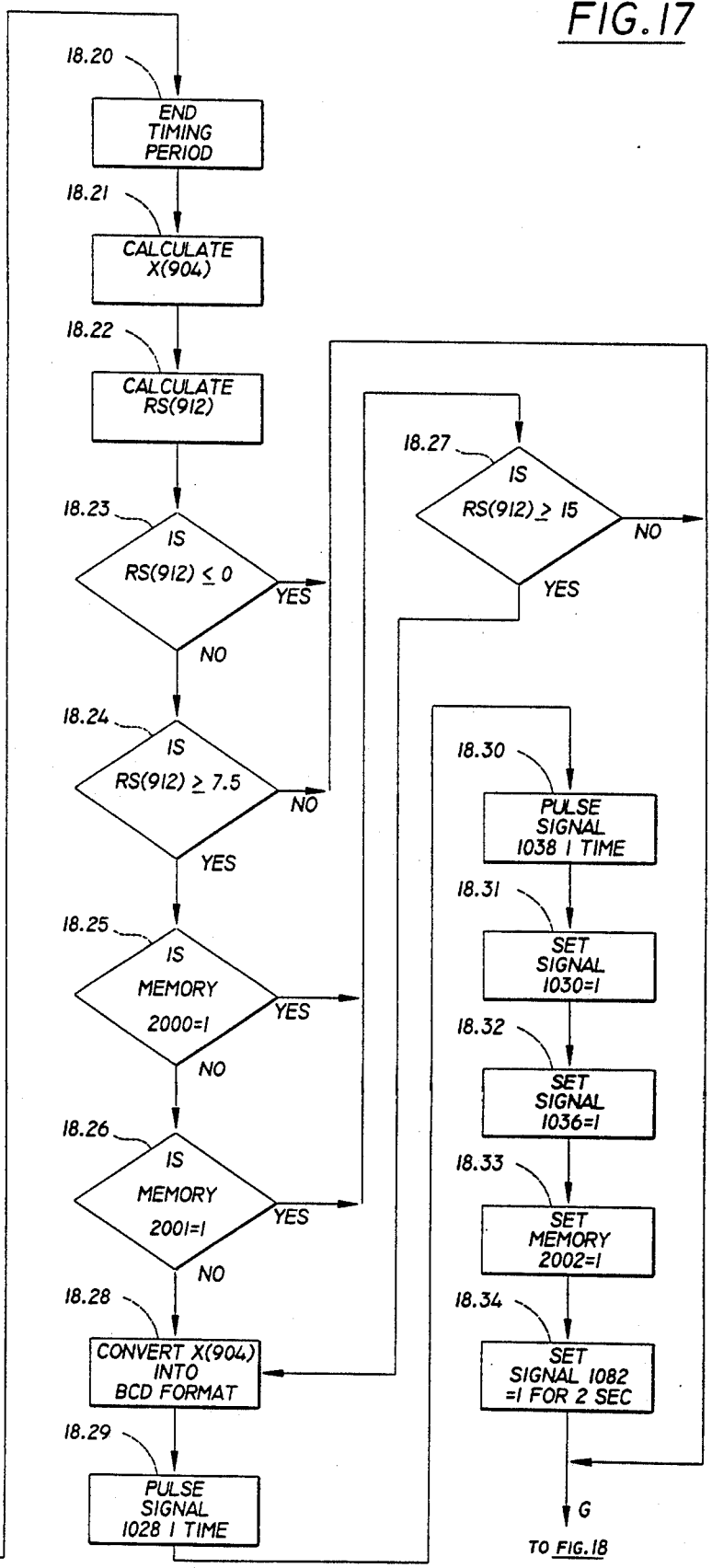
FIG. 17

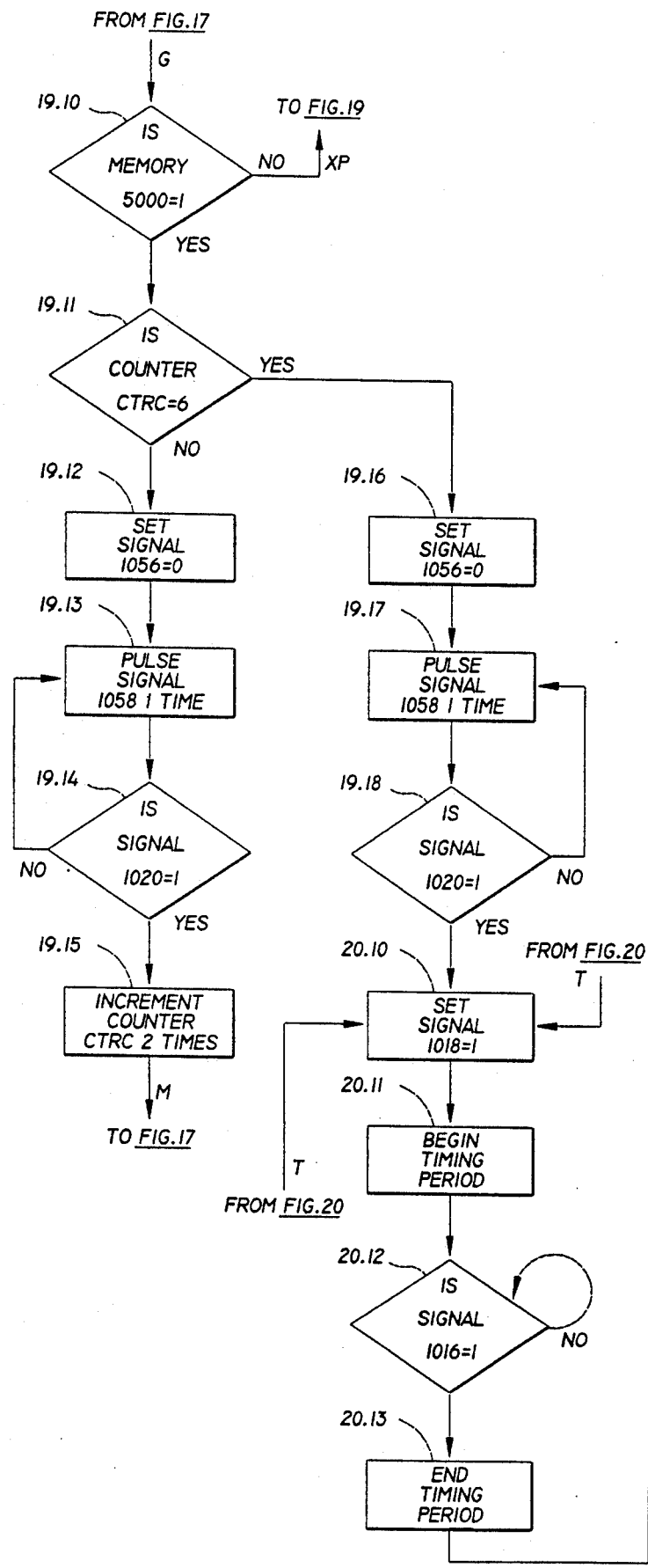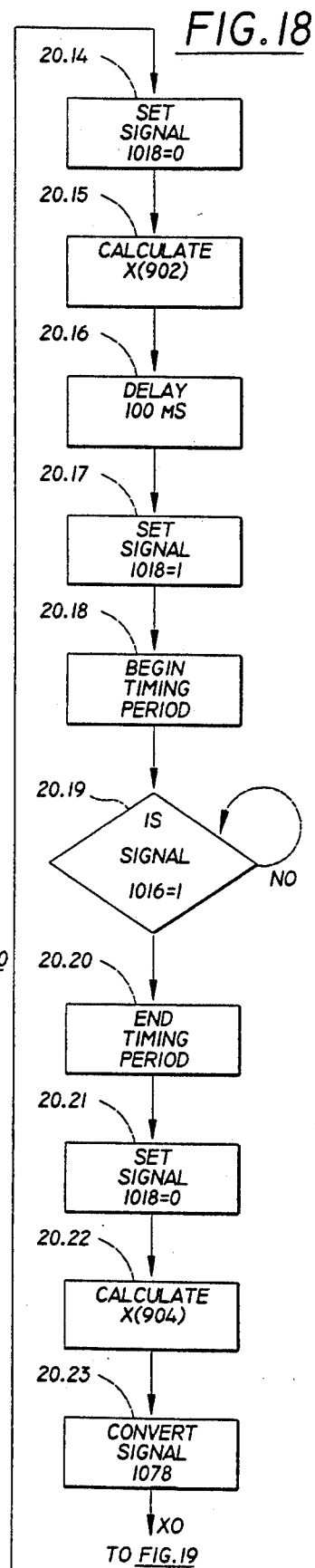
FIG. 18

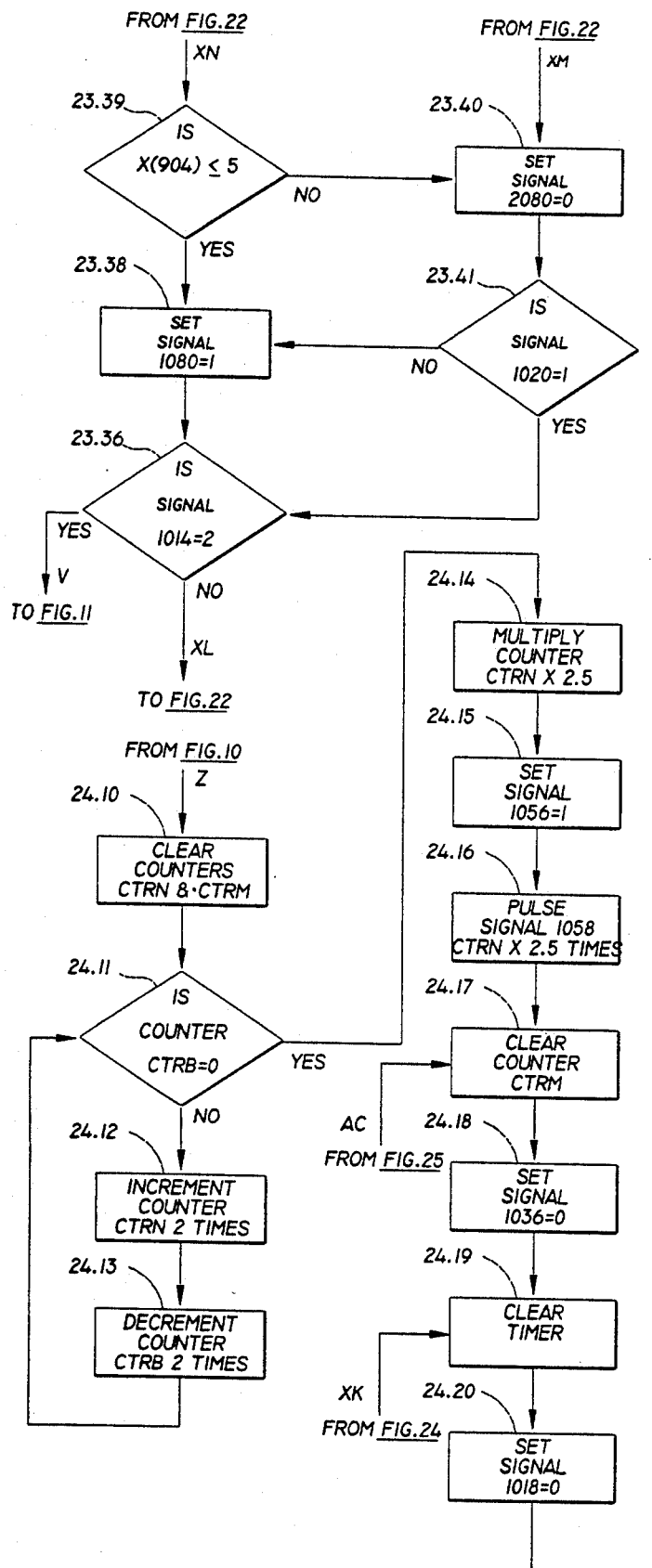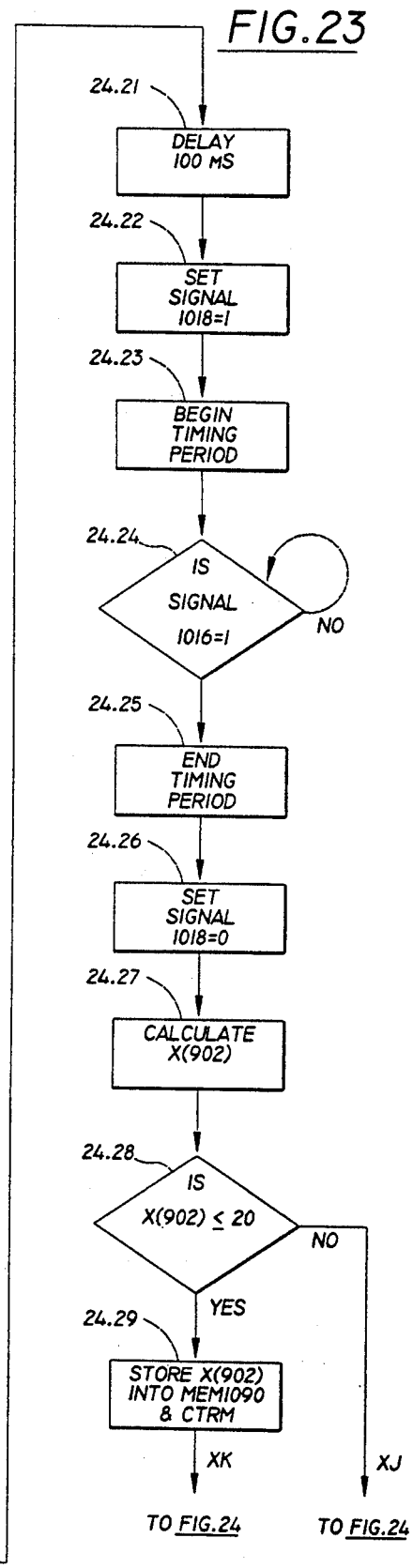
FIG. 23

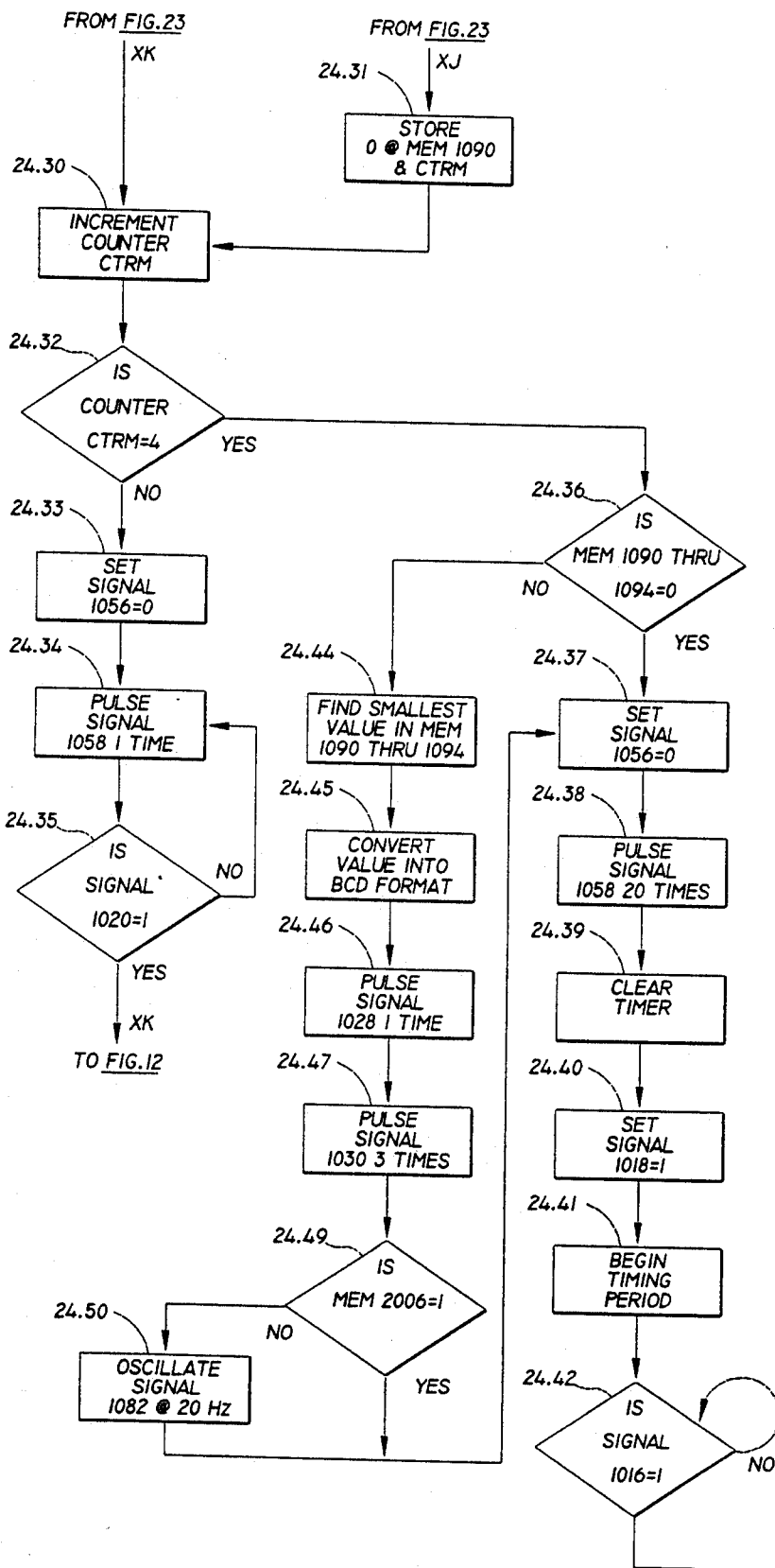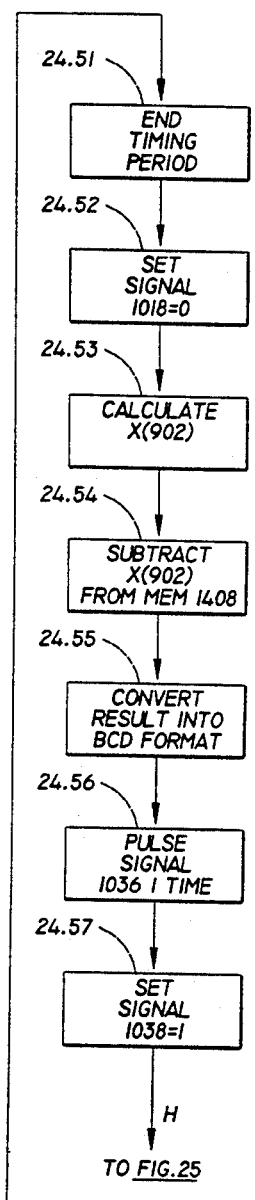
FIG. 24

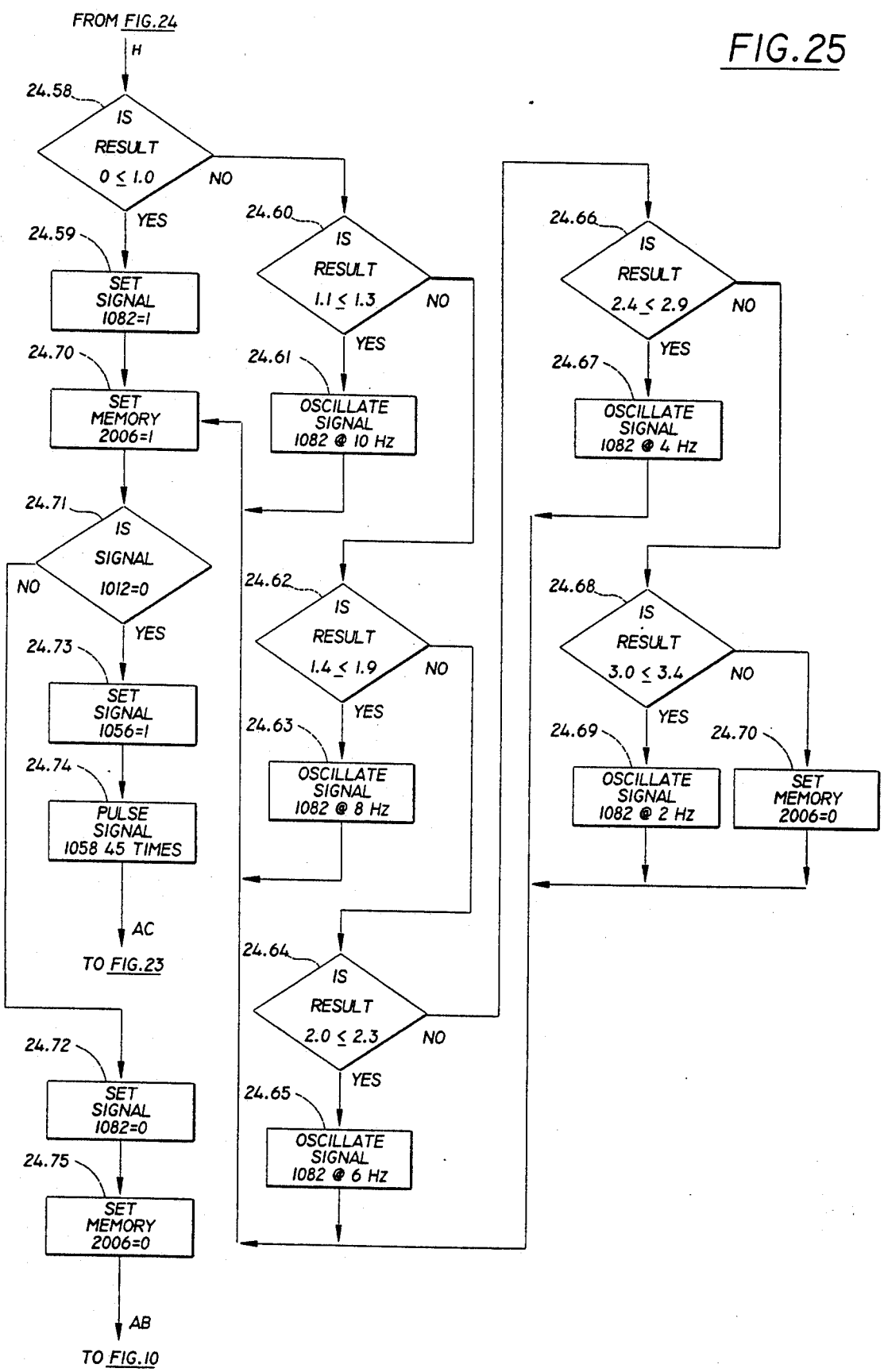

VEHICLE COLLISION AVOIDANCE SYSTEM

BACKGROUND OF THE INVENTION

1. Field of Invention

The present invention relates to collision avoidance systems, and more specifically to an ultrasonic system used on vehicles.

2. Description of Prior Art

In the course of operating a motor vehicle safely at varying speeds it is necessary for the operator of the vehicle to gather information concerning traffic conditions to make sound driving decisions. Information obtained, such as the known proximity of potentially dangerous objects and their associated relative velocities requires mental processing for the operator to make sound driving decisions, such as whether or not there is enough time, or if it is clear, to change lanes, or to stop. The information must be gathered from an area which effectively spans 360 degrees.

In order to gather information from this area the operator is required to physically turn, such as one would do when checking a blind spot. In doing so, the forward progress of the vehicle continues unchecked.

Heretofore several ultrasonic devices have been proposed for assisting the operator in gathering traffic information regarding areas that cannot be viewed easily, such as the blind spot, which is common to all mirrors.

U.S. Pat. No. 3,681,750 to Larka (1972) discloses a passive device which detects ultrasonic signals; however, this device merely detects the presence of moving objects and does not inform the operator of the distance to these objects nor of their velocity, relative to the vehicle. This greatly inhibits the operator's ability to make sound driving decisions. Also, several devices are required to scan all pertinent areas.

Several types of ultrasonic collision avoidance systems have been proposed in, for example, U.S. Pat. Nos. 3,802,397 to Sindle (1974), 4,240,152 to Duncan and Wiley (1980), 4,260,980 to Bates (1981), 4,442,512 to Sigeeyuki and Akite (1980), 4,450,430 to Barishpolsky (1980), 4,626,850 to Chey (1986), and 4,694,295 to Miller and Pitton (1987). All of these systems have certain factors in common.

a) All require numerous transducers along with associated circuitry to scan pertinent areas. This greatly increases the cost of the system. Also, use of multiple transducers increases the complexity of the system, thereby decreasing dependability.

b) All utilize transducers mounted in a way that the emitted ultrasonic signal is perpendicular to the vehicle. This arrangement does not make effective use of the natural shape of the signal since, at very close distances, the width of the signal is very narrow as opposed to having a much larger width at greater distances. As a consequence of this arrangement, multiple transducers are needed in order to scan the entire side of the vehicle.

c) All require separate mountings for each transducer to scan an individual area. Transducers which are located at different points on the vehicle requires great lengths of cable to interconnect and coordinate their activities, creating logistical and design problems.

d) All are unable to differentiate between a stationary object and one that is moving. Stationary objects create false warnings which hinder rather than assist the operator.

e) Their operation merely warns of objects when they are detected within a certain fixed distance. They do not compensate for varying vehicle speeds, which necessarily dictate a greater warning distance.

f) Their operation merely detects the presence of objects and does not calculate the object's relative speed with respect to the vehicle. The relative speed could be used to predict if a lane change could be accomplished safely, in time, before the object arrives in the "safe" zone. This would eliminate the tedious task of guessing if a lane change could be accomplished safely.

g) All are unable to compensate for the addition of a trailer which would effectively void any protection provided by the system since any object located adjacent the trailer would go undetected. Also, the trailer itself would cause a false warning since the transducer used to scan the rear area, if provided, would detect the reflected ultrasonic signal from the trailer.

h) All are unable to compensate for the various blind spots of different operators of the vehicle. Each operator has his or her own blind spot, which is directly related to that person's stature. Therefore, a system which was designed for one specific operator would be useless for another.

i) All are unable to provide protection against would-be thieves when the vehicle is left unattended.

j) All utilize dedicated electrical circuits which do not allow for an operator to program in preferred warning distances.

k) All lack capability for altering the position of the side mirror so that the object which has been detected to be in the blind spot can be in full view of the operator.

l) All are unable to detect the presence of a new driver in order to automatically adjust the mirror position to the new driver's preferred position.

As will be described hereinafter, the ultrasonic system of the present invention meets these requirements by providing structure which is capable of receiving and assimilating information, processing same, making decisions and warning the operator of the vehicle of the possibility of collision in time to avoid same.

SUMMARY OF THE INVENTION

One object of the invention is to provide a collision avoidance system which is incorporated into a side mirror where the placement of such a system takes full advantage of the strategic location of the mirror. The side mirror position on any vehicle is an ideal, centralized location where a single transducer can be rotated about a vertical axis thereof to scan an area which effectively spans 200 degrees.

Another object is to provide a collision avoidance system which is incorporated into a side mirror where the placement of such system allows for propagation of an ultrasonic signal or wave which travels parallel to the vehicle so that a single wave may be used to detect objects located anywhere alongside a vehicle.

Yet another object is to provide a collision avoidance system which utilizes a single transducer for both the transmission and detection of ultrasonic signals.

A further object is to provide a collision avoidance system which utilizes a single transducer to monitor an area which effectively spans 200 degrees.

A further object is to provide a collision avoidance system whose single transducer utilizes a wave guide whose dimensions are such that only signals with a frequency of 40.1 KHz are allowed to propagate.

A still further object is to provide a collision avoidance system which utilizes a rotational base in order to scan an area which spans 200 degrees.

A still further object is to provide a collision avoidance system which utilizes a motor to rotate an acoustic ranging device to any one of a plurality of preselected positions.

Yet a further object is to provide a collision avoidance system that utilizes a programmable microcomputer which allows the operator to program preferred distances at which to sound a warning when an object has been detected when the vehicle is moving forward.

Yet a further object is to provide a collision avoidance system that utilizes a programmable microcomputer which allows for an audible feedback in order to inform the driver of the distance to an object from the front of the vehicle.

Yet a further object is to provide a collision avoidance system that utilizes a programmable microcomputer which has the ability to store multiple warning distances for several different operators.

Still a further object is to provide a collision avoidance system that utilizes a programmable microcomputer which has the ability to distinguish between different operators and then use that operator's preferred warning distances when detecting objects.

Still a further object is to provide a collision avoidance system that utilizes a programmable microcomputer which has the ability to detect vehicle speed in order to modify the operator's programmed warning distance in order to compensate for varying vehicle speeds.

Still a further object is to provide a collision avoidance system that utilizes a programmable microcomputer which has the ability to alter the angle of the side mirror so that the blind spot is effectively eliminated.

Still a further object is to provide a collision avoidance system which utilizes a programmable microcomputer and has the ability to distinguish between stationary and moving objects to eliminate false warnings.

Still a further object is to provide a collision avoidance system which utilizes a programmable microcomputer to calculate the relative speed between the vehicle and an object so that operator may be alerted to the object.

A still further object is to provide a collision avoidance system which utilizes a programmable microcomputer to detect potential intruders when the vehicle is at rest to prevent the theft of the vehicle.

A still further object is to provide a collision avoidance system which utilizes a programmable microcomputer and has the ability to compensate for an object towed by a vehicle.

A still further object is to provide a collision avoidance system the operating characteristics of which can be changed by programming of the programmable microcomputer.

A still further object is to provide a collision avoidance system which utilizes a programmable microcomputer and has the ability to provide different warning distances which are necessary due to varying road conditions such as rain, sleet, or snow.

A still further object is to provide a collision avoidance system which utilizes a programmable microcomputer to adjust the mirror position when a new driver operates the vehicle.

Further objects and advantages will become apparent from a consideration of the ensuing description and drawings.

BRIEF DESCRIPTION OF THE DRAWINGS

FIGS. 9–25 comprise a flow chart of steps performed by the program logic within the microcomputer controller of the system.

DESCRIPTION OF THE PREFERRED EMBODIMENT

Figure 1:
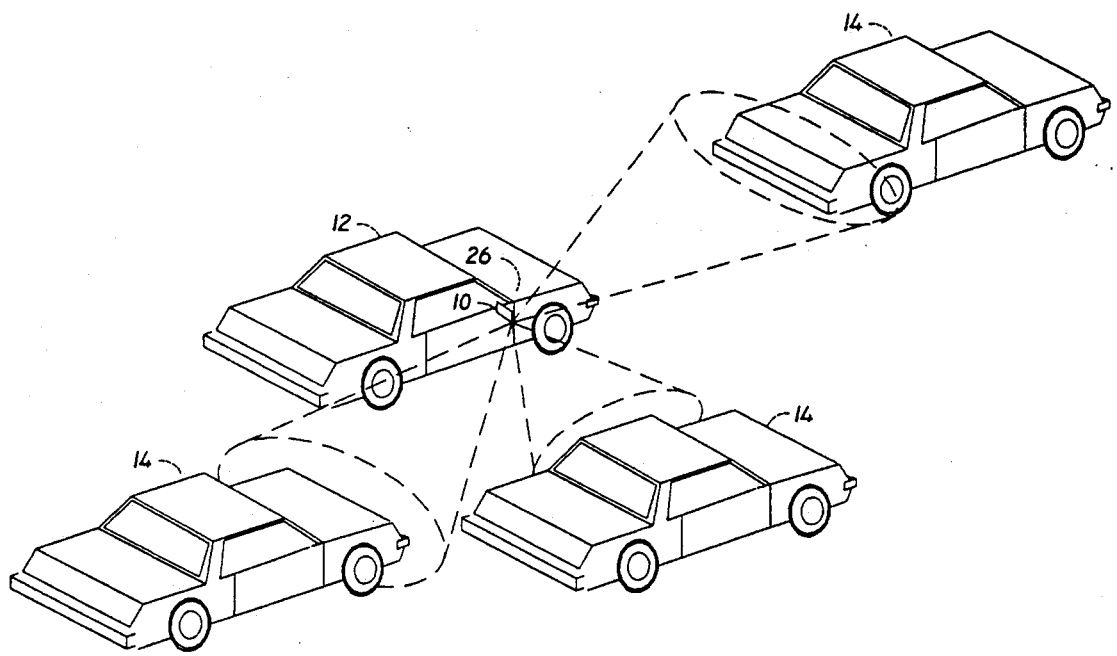
FIG. 1 is a perspective view of a vehicle incorporating the collision avoidance system of the present invention and shows same in traffic, further showing the tracking of objects moving therearound.

Referring to the drawings in greater detail, there is shown therein the vehicle collision avoidance system of the present invention designated by the numeral 10 and disposed upon a vehicle such as an automobile 12 which is in direct competition with other objects 14 in the vicinity of the vehicle 12.

As illustrated in the drawings, the system 10 includes an acoustical ranging unit 16, a receiver/transmitter electronic package 42, a display unit 18, a programmable microcomputer unit 20, and a mirror positioning unit 22, all of which are contained within a single housing unit 24 and mounted at the side view mirror position 26 of the vehicle 12.

Figure 3:
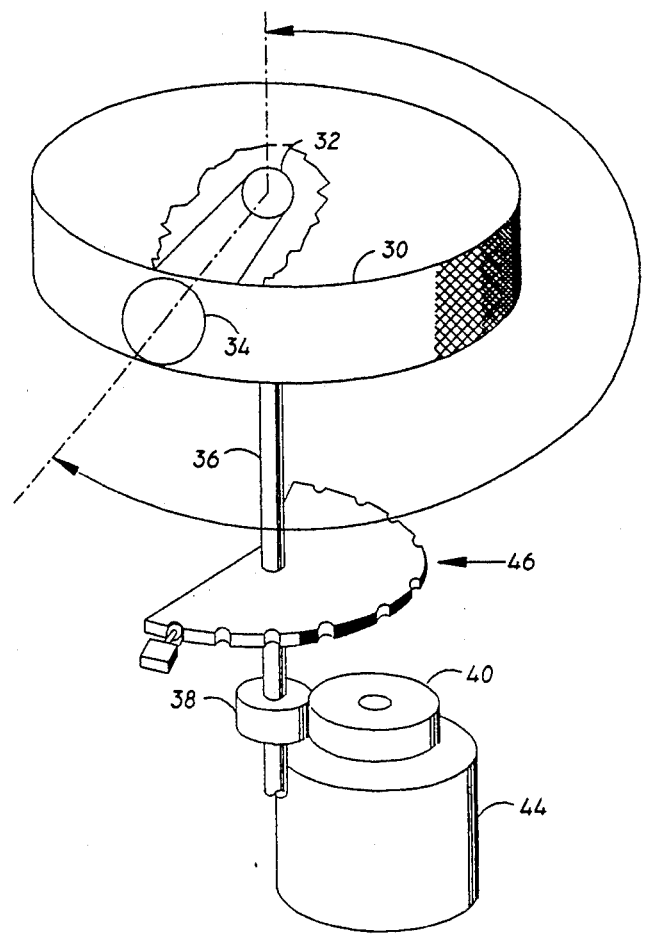
FIG. 3 is a perspective view of fan acoustical ranging unit of the system.

Referring more particularly to FIG. 3, the acoustical ranging unit 16 includes a rotational base 30 upon which an acoustical transducer 32 is centrally mounted. In a preferred embodiment, the acoustical transducer 32 operates within the ultrasonic frequency range and is supplied by the Polaroid Corporation under part no. 607281.

The acoustical transducer 32 is flush with a smaller diameter end of a conical wave guide 34, eliminating any gaps which would cause an attenuation in signal strength. The rotational base 30 is of a disc configuration having a radius dependent upon the total length of the acoustical transducer 32 and conical wave guide 34 and having a height which allows for the full diameter of the larger diameter end of the conical wave guide 34. A rotatable shaft 36 is rigidly fastened to the bottom and center of the rotational base 30 and rotates the base 30, through an arc as indicated by the arrow in FIG. 3.

The acoustical transducer 32 and conical wave guide 34 are rotated back and forth parallel to the ground. The rotational travel is controlled by a stepper motor 44. It is more advantageous to utilize a clock-wise/counter-clockwise scan than to return the rotational base 30 back to a beginning position 84. Rotating the acoustic ranging unit 16 from position 84 through to position 102 constitutes a positive sequence scan and rotating the acoustic ranging unit 16 from position 102 through to position 84 constitutes a negative sequence scan. The combination of both the positive and negative sequence scans constitutes a complete sweep of a 200 degree area.

The rotatable shaft 36 is journaled at one end to the housing 24 and the other end to the rotational base 30 and is disposed in perpendicular orientation to the rotational base 30. A pair of mating gears 38 and 40 is disposed upon on the rotatable shaft 36 and the stepper motor 44, respectively, and are preferably dissimilar in size to provide a gear-reduction ratio. By such arrangement, the rotational base 30 and the acoustical transducer 32 are driven by the combination of the rotatable shaft 36, mating gears 38 and 40, and stepper motor 44 providing unidirectional rotational movement as indicated by the arc length shown in FIG. 3.

Figure 4:
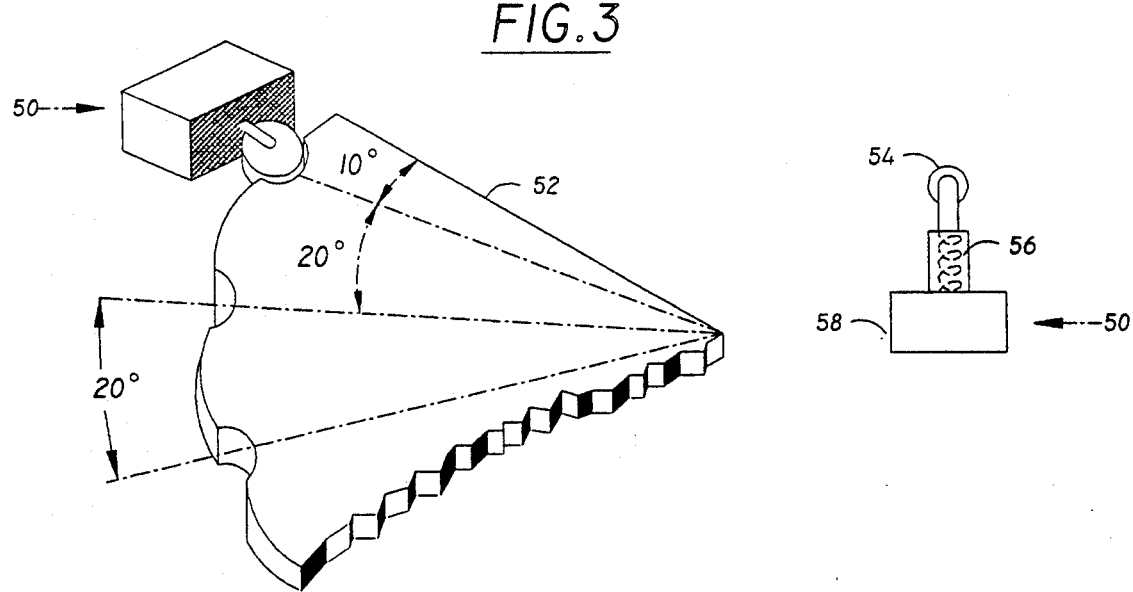
FIGS. 4a and 4b provide an enlarged perspective view of an optical angle encoder of the ranging unit and a coacting detent mechanism thereof.

As best shown in FIGS. 4a and 4b, to provide an electrical logic signal indicating the relative position of the rotational base 30, an angle encoder 46 is provided. The encoder 46 is comprised of an angle encoder plate 52 and a detent mechanism 50. The angle encoder plate 52 is semi-circular in configuration and is equipped with ten detents, the detents situated 20 degrees apart along an arcuate perimeter of the plate 52. The first detent serves to orient the rotational base 30 at a ten degree reference position.

Since the ultrasonic wave has an effective beam angle of twenty degrees the detent orienting the rotational base 30 at position 84 is positioned to orient the rotational base 30 ten degrees away from the side of the vehicle so the vehicle itself does not obstruct the progress of the wave. Therefore the centerline of the detent for rotational base 30 position 84 is located ten degrees from the edge of the angle encoder plate 52. The angle encoder plate 52 is parallel to the vehicle when the rotational base 30 is at position 84. All other detent centerlines are located twenty degrees from the centerline serving position 84.

Each detent is semi-circular in configuration, having a diameter which cooperates with a roller 54. Roller 54 is perpendicular to the detents and is pressed by a spring 56 against each detent when the rotational base 30 is snapped into a detent position, by stepper motor 44 driving gears 38 and 40.

Considerable force must be applied to the rotational base 30 in order to relocate it to an adjacent detent position. The roller 54 cooperates with each detent when the stepper motor 44 is rotating the rotational base 30 to an adjacent detent position. The roller 54 rides along the edge of the angle encoder plate 52 and then snaps into a detent, creating a retarding force opposing the momentum of the rotational base 30 when it is in transition from one detent position to another.

In addition, when the rotational base 30 is set at a detent position by the stepper motor 44 and gears 38 and 40, when a distance measurement to the object 14 is taken at one of the ten detent positions 84 through 102 the action of the roller 54, spring 56 and detent combination cause the rotational base 30 to resist the force of wind encountered by the rotational base 30 when the vehicle 12 is in motion. The roller 54 is subjected to a preload force by spring 56.

At each detent position an electrical logic signal is generated by a detent mechanism switch 58, the signal being indicative of the position of the rotational base 30.

Action of the roller 54 extending into a detent position causes the internal contacts of detent mechanism switch 58 to close due to the mechanical linkage between the roller 54 and the detent mechanism switch 58.

The logic signal generated by detent mechanism switch 58 is utilized by a programmable microcomputer unit 20 to accurately record the position of the rotational base 30 in order to determine the direction in which the ultrasonic signals are to be emitted.

Since the effective beam angle of the acoustical transducer 32 is 20 degrees and with a ten-stop scanning sequence, an effective area spanning 200 degrees is examined for objects.

Although in the preferred embodiment a scanning sequence which includes a 200 degree area is described, the rotational base 30 is capable of being static at detent position 84 or 102 as preferred by the operator to dedicate the acoustical transducer 32 to service a particular chosen area (i.e. dedicated service to monitor the blind spot or the front of the vehicle).

Also, in other embodiments, the rotational base 30 could be replaced by a single transducer stationary package where the transducer is dedicated to service at detent position 84, with the transducer having a unique wave guide formed directly from the housing unit 24.

Figure 2:
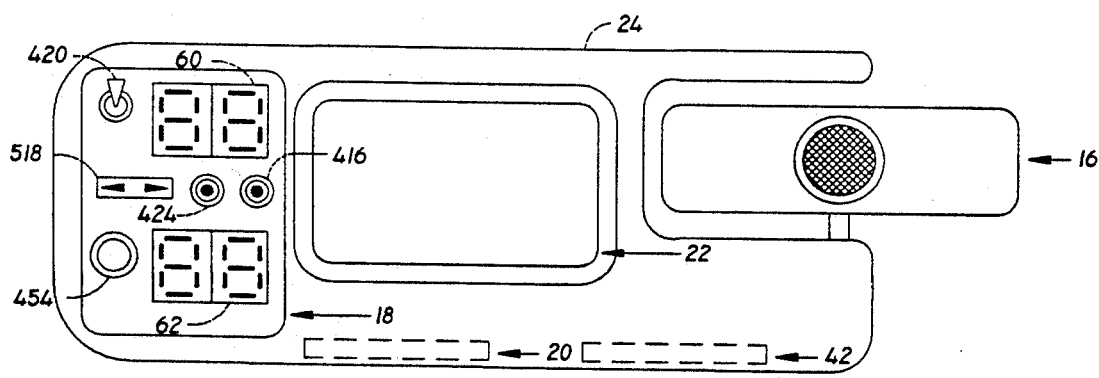
FIG. 2 is a plan view of the collision avoidance system of the present invention.

Referring to FIG. 2, the display unit 18 utilizes the strategic location of the housing unit 24 in reference to side mirror mounting location 26 to inform the operator of pertinent traffic information, such as the distances to objects 14 which have been detected, as the operator of the vehicle 12 views the side mirror in the course of normal driving.

All display unit 18 devices are mounted directly to the housing unit 24. The display unit 18 includes two 2-digit, seven segment light emitting diodes (LED) 60 and 62 which are of the common cathode type and preferably operate in the red light spectrum, a keyed lockable single pole single throw (SPST) electrical switch 424, a momentary contact single pole single throw (SPST) push button switch 416, a maintained contact single pole double throw (SPDT) paddle switch 420, a single pole double throw (SPDT) rocker switch 518, and a beeper 454.

In another embodiment the LED's 60 and 62, the electrical switches 424, 416, 420, and the beeper 454 are mounted in a housing (not shown) located on the dashboard of the vehicle 12 along with another collision avoidance mirror system which is mounted on the left side of the vehicle 12, to provide a complete display protecting both sides of the vehicle 12.

Thus to insure complete protection two collision avoidance systems 10 are utilized, One collision avoidance system 10 being mounted at each side mirror position.

The LED's 60 and 62 perform several functions when the vehicle is traveling forward. First LED 60 is used to inform the operator of the vehicle 12 of the distance to an object 14 which has been detected when the rotational base 30 is at detent positions 100 or 102. When an object 14 has been detected to pose a threat at detent positions 102 and 100 by having a distance to vehicle 12 which is less than an operator programmed distance and which has been modified to reflect the current vehicle speed, or when the object 14 has been detected to be stationary and whose distance is less than a calculated safe distance, the distance to the detected object 14 is displayed on LED 60 and flashes with a frequency of 1 Hz, creating a visual warning for the operator of the vehicle 12. The beeper 454 also sounds an audible alarm lasting approximately 2 seconds.

When no objects 14 are detected at rotational base 30 positions 100 or 102, the number 00 is displayed on LED 60 signalling the operator of the vehicle 12 that these areas are free of threatening objects 14.

When an object 14 has been detected at rotational base 30 positions 92, 94, 96, or 98, the relative speed of which is calculated to be greater than or equal to 0.75 feet per second, the distance to that object 14 will flash on both LED 60 and LED 62. The beeper 454 will also sound an audible alarm with a duration of 2 seconds. However, if a warning is already in progress this warning will be ignored until the detected object 14 achieves a relative speed greater than or equal to 15 feet per second at which time a warning is invoked.

LED 62 informs the operator of the distance to objects 14 detected when the rotational base 30 is at detent positions 84, 86, 88, or 90. When no object 14 is detected at these positions LED 62 displays the number 00 indicating to the operator that no objects 14 threaten. If an object 14, is detected at rotational base 30 positions 84, 86, 88, or 90 and is less than the operator programmed distance from the vehicle 12, the distance is displayed on LED 62 and flashes with a frequency of 1 Hz.

At this time also, if use of a turn signal is detected by programmable microcomputer unit 20, beeper 454 emits an audible alarm with a duration of 2 seconds and the mirror is rotated to allow the operator a view of the detected object.

When an object 14 is determined by the programmable microcomputer unit 20 to have a relative speed which, if a lane change were attempted, would cause a collision to occur, the distance to that object 14 is displayed on LED 62 and flashes with a frequency of 1 Hz. Beeper 454 also sounds an audible alarm with a duration of 2 seconds.

When the keyed lockable single pole single throw electrical switch 424 is engaged, an electrical circuit is made to vehicle 12 ground, taking switches 416 and 420 to ground. When the keyed lockable electrical switch 424 is disengaged, no electrical circuit is made and switches 416 and 420 are not grounded, the key now being removable with unauthorized persons being unable to reprogram the programmed distances or zones. The momentary contact single pole single throw pushbutton switch 416 is used by the operator of the vehicle 12 during a programming session to enter operator preferred distances for a particular set of positions of the acoustical ranging unit 16. Detent positions 84, 86, 88, and 90 constitute one set of positions in which the operator programs a distance and detent positions 100 and 102 constitute another set. When the momentary contact single pole single throw pushbutton switch 416 is in a depressed position, an electrical circuit is made to vehicle 12 ground via switch 424, sending a signal to the programmable microcomputer unit 20 to enter the currently measured distance into an appropriate memory location when a programming session is invoked.

Single pole double throw rocker switch 518 is utilized to instruct the programmable microcontroller unit 20 to rotate mirror 300 to either the left or right upon command from the operator. When the SPDT rocker switch 518 is moved to the left, a circuit to ground is made, signalling the programmable microcontroller unit 20 to effect rotation of the mirror 300 to the left. A separate and distinct signal is sent to the programmable microcontroller unit 20 when the SPDT rocker switch 518 is depressed to the right causing the programmable microcontroller unit 20 to instruct the mirror positioning unit 22 to rotate the mirror 300 to the right.

When the vehicle 12 is operating in reverse LED 60 displays the distance to any object 14 detected when the acoustical ranging unit 16 is at detent position 100.

The beeper 454 continuously emits an audible alarm. The alarm oscillates with a frequency that is inversely proportional to the distance to the object 14 detected until that object's distance is detected to be less than one foot. At that point, the oscillations stop and the beeper 454 emits a constant alarm. The tone from the beeper 454 provides an audible feedback for determining the position of the front of the vehicle 12 when pulling out of a parking space. Also LED 60 displays the distance to the object.

When an object is present at detent positions 84, 86, 88, or 90 at a distance less than 20 feet from the vehicle 12, an audible alarm is emitted by beeper 454 which oscillates with a set frequency of 20 Hz. This frequency is greater than any frequency emitted when an object 14 is detected at detent position 100. Thus, the operator is able to distinguish between a warning invoked due to objects 14 which are detected at the front end and those which are detected at the rear of the vehicle 12.

Also when an object 14 detected at detent positions 84, 86, 88, or 90 at a distance less than 20 feet, the distance flashes on LED 62 three times. When the vehicle 12 is at rest, the rotational base 30 returns to position 84, entering into a surveillance mode.

Figure 5:
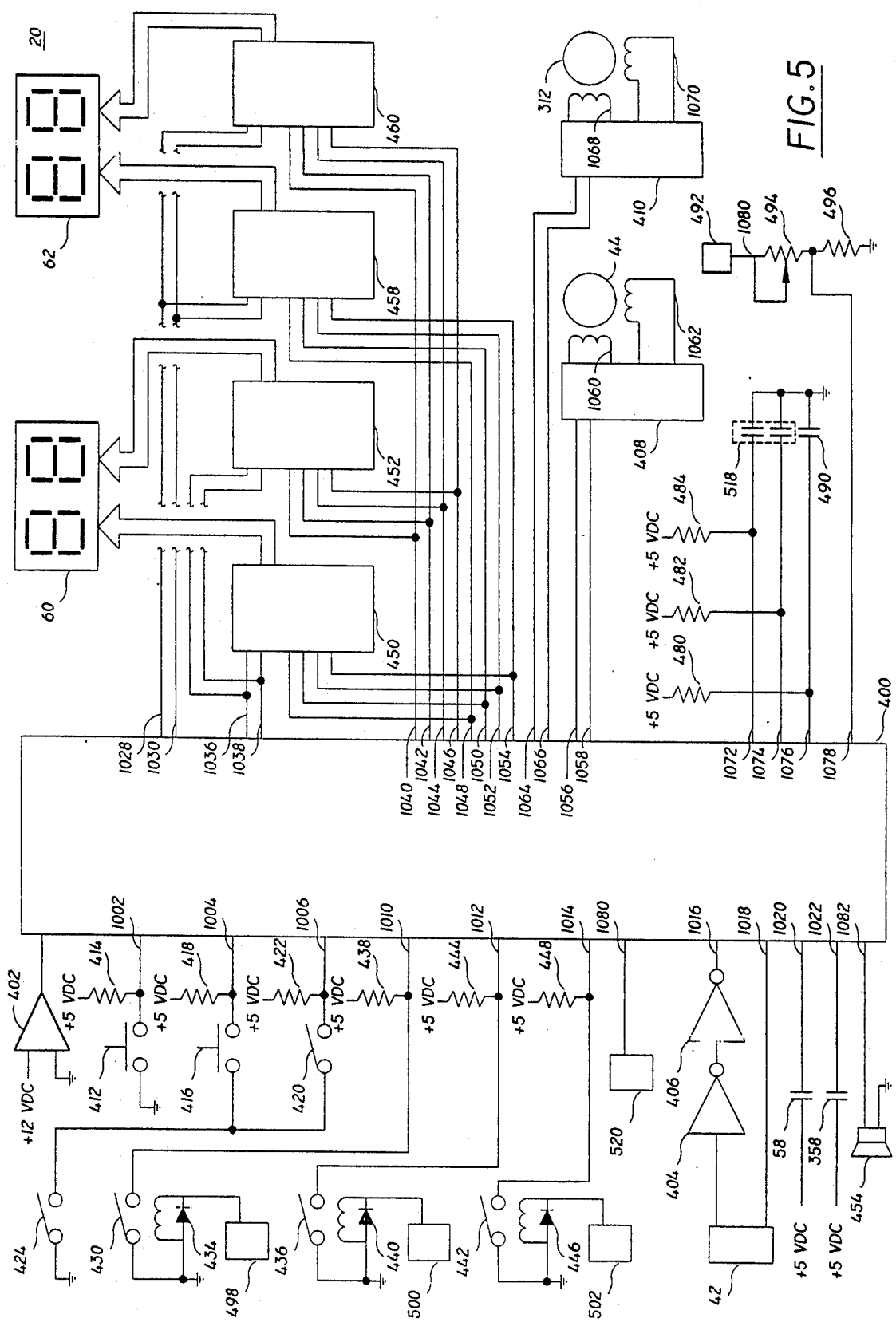
FIG. 5 is a schematic diagram of the circuitry of the collision avoidance system.

In this mode, if an object 14 is detected to be moving within a predetermined range of the vehicle 12 and to have a predetermined velocity a signal is sent to an anti-theft system 520 of the vehicle 12. If the rotational base 30 is physically forced from position 84, a signal is also sent to the anti-theft system 520 to invoke an audible alarm. Referring now to FIG. 5, the programmable microcomputer unit 20 comprises a central processing unit (CPU) 400, a plus 5 volt DC voltage regulator 402, inverter gate integrated circuits 404 and 406, stepper motor operator integrated circuits 408 and 410, binary coded decimal (BCD) to seven segment operator/decoder/latch integrated circuits 450, 452, 458 and 460, and single pole single throw mechanical relays 430, 436, and 442. In the preferred embodiment the CPU 400 is an eight bit, complementary oxide semiconductor logic, stand-alone microcontroller unit such as Motorola Corporation's MC68705R3 which provides 176 bytes of internal random access memory, 240 bytes of internal read only memory, 7600 bytes of erasable programmable read only memory (EPROM) and an internal 8 bit analog to digital converter.

The controller has three bidirectional data ports designated as ports A, B and C and one dedicated input port designated as port D, with each port including eight data lines. Each data line can be configured as either an input or an output. The CPU 400 is utilized to control all aspects of the collision avoidance system functions which include initiating requests to the transmitter/receiver package 42 to initiate an ultrasonic signal, receiving the detected echo signal from the transmitter/receiver package 42, determining the distance to the object 14 from the signals received from the transmitter/receiver package 42, displaying the distance to the object 14 on the appropriate display, determining whether or not to initiate a warning, rotating the rotational base 30 in the proper sequence, and rotating the mirror positioning unit 22.

The CPU 400 utilizes a 4.0 MHz crystal oscillator as a primary timing source and divides this source by two for an internal clock frequency of 2.0 MHz. The CPU 400 operation is dependent upon a software program 900 which is programmed into the erasable programmable read only memory at the time of manufacture. The collision avoidance system operating procedure is completely described by the software flowchart 901. Further, the entire collision avoidance system 10 can be customized to suit any particular application of which the enclosed software flow chart 901 does not make mention.

In addition, the CPU 400 stores operator programmed distances which may be changed any time the operator wishes. Since the CPU 400 is equipped with an arithmetic calculation unit, complex mathematical operations can be carried out without the need for multiple logic circuits. The operating temperature range of −40 C. degrees to +70 C. degrees of the CPU 400 is ideally suited for automotive application.

The transmitter/receiver 42 is supplied by the Polaroid Corporation under part number 615077.

Figure 6:
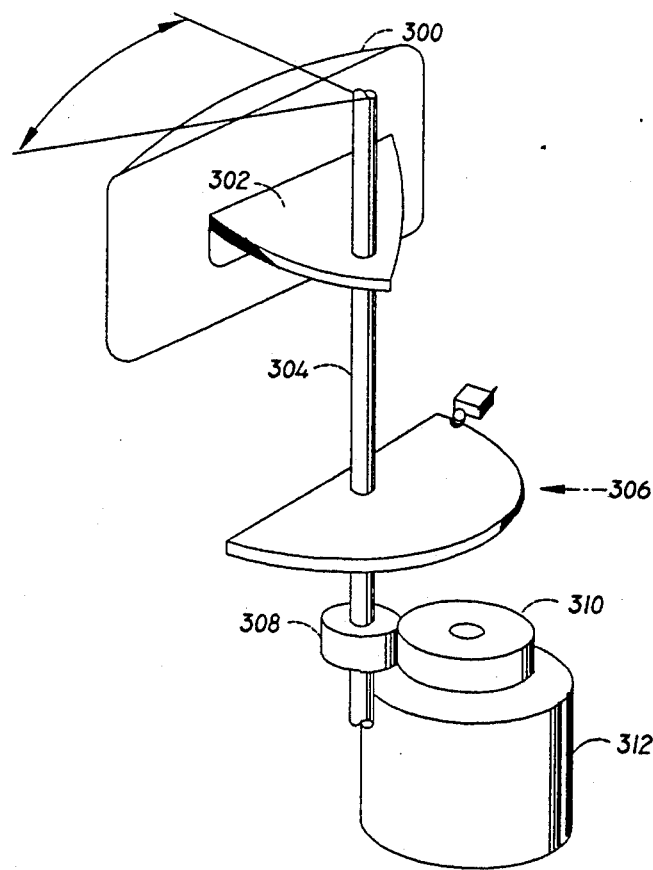
FIG. 6 is a perspective view of a mirror positioning unit of the system.

As best shown in FIG. 6, the mirror positioning unit 22 consists of a mirror 300, a mirror positioning bracket 302, a rotatable shaft 304, a mirror angle encoder 306, mating gears 308 and 310, and stepper motor 312. The mirror positioning bracket 302 is rigidly fastened to the center of the back of the mirror 300 to provide support during rotational motion relative to the housing 24. The mirror positioning bracket 302 has a fan-like shape to give full support to the mirror 300 and provide a mounting for the rotatable shaft 304. The rotatable shaft 304 is journaled at opposite ends to the housing 24 and is disposed in perpendicular orientation to the mirror positioning bracket 302. The mating gears 308 and 310 are disposed upon on the rotatable shaft 304 and the stepper motor 312, respectively, and are preferably dissimilar in size to provide a gear-reduction ratio. By such an arrangement, mirror positioning bracket 302 is driven by the combination of the rotatable shaft 304, mating gears 308 and 310, and stepper motor 312 to provide unidirectional rotational movement, as best indicated by the arc length shown in FIG. 6.

The speed of rotational movement of the mirror 300 and mirror positioning bracket 302, by virtue of the gear-reduction provided by the mating gears 308 and 310, is such that the blind spot is eliminated in sufficient time to allow the operator a view of the object 14 before proceeding with a lane change.

Figure 7:
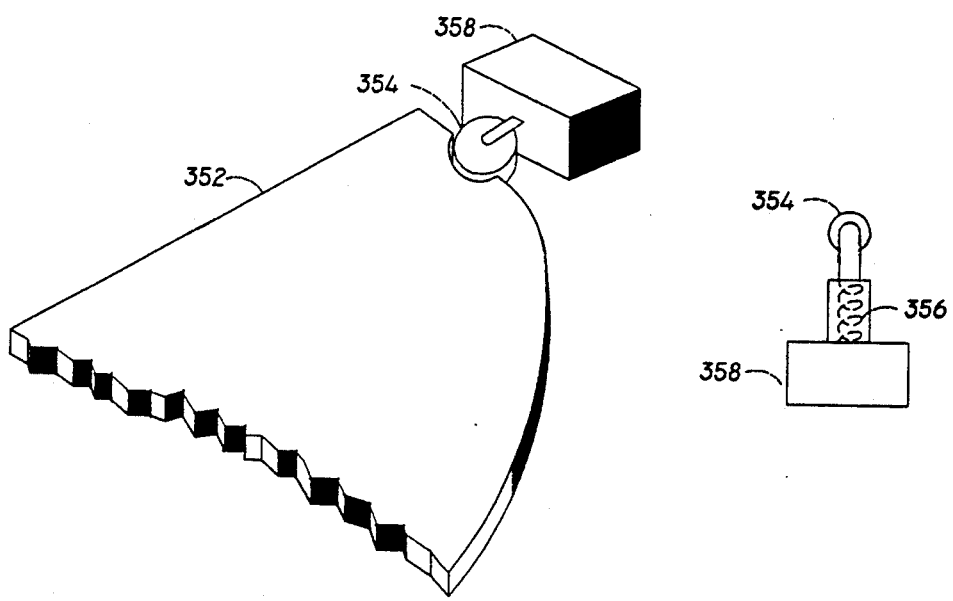
FIGS. 7a and 7b provide an enlarged perspective view of an optical angle encoder of the mirror positioning unit and a coacting detent mechanism thereof.
Figure 8:
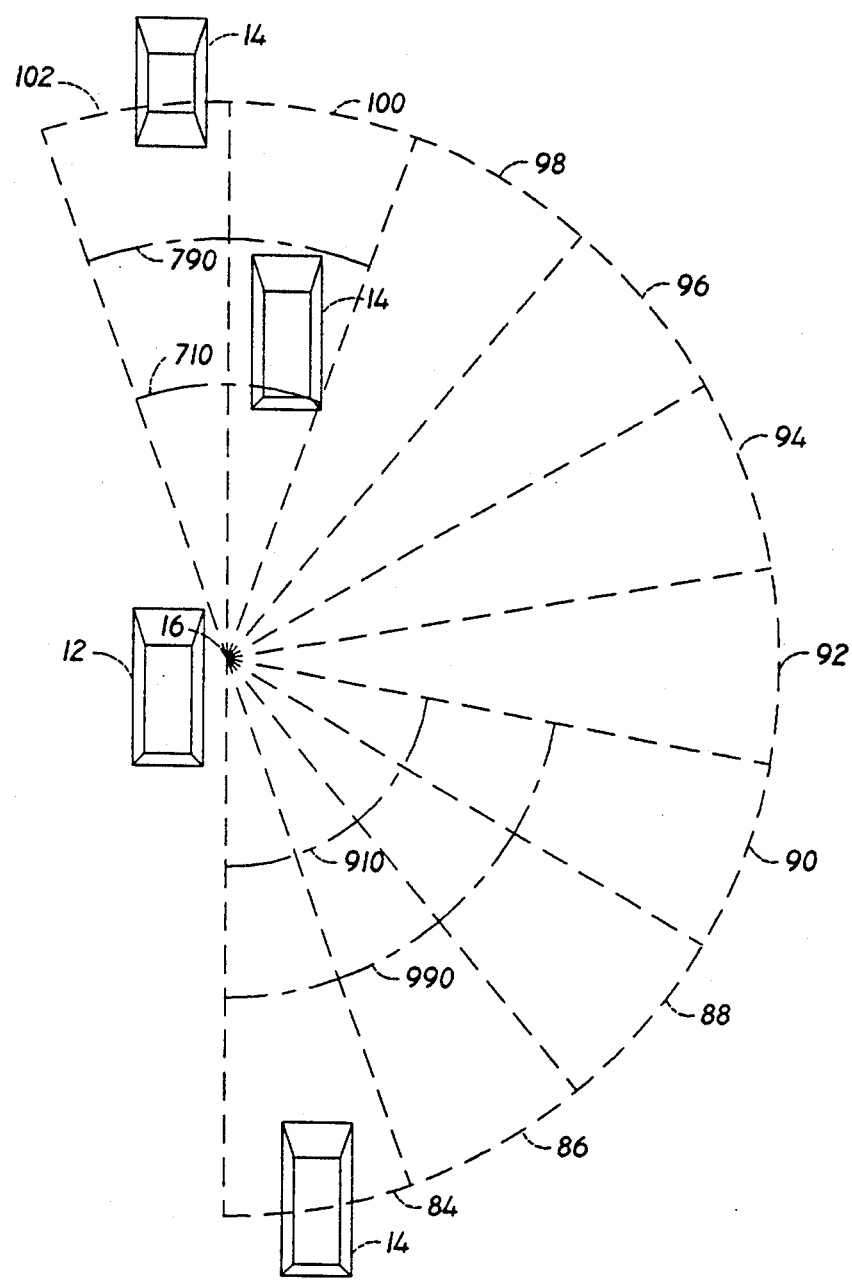
FIG. 8 is a plot of areas monitored by one system of the present invention.
Figure 9:
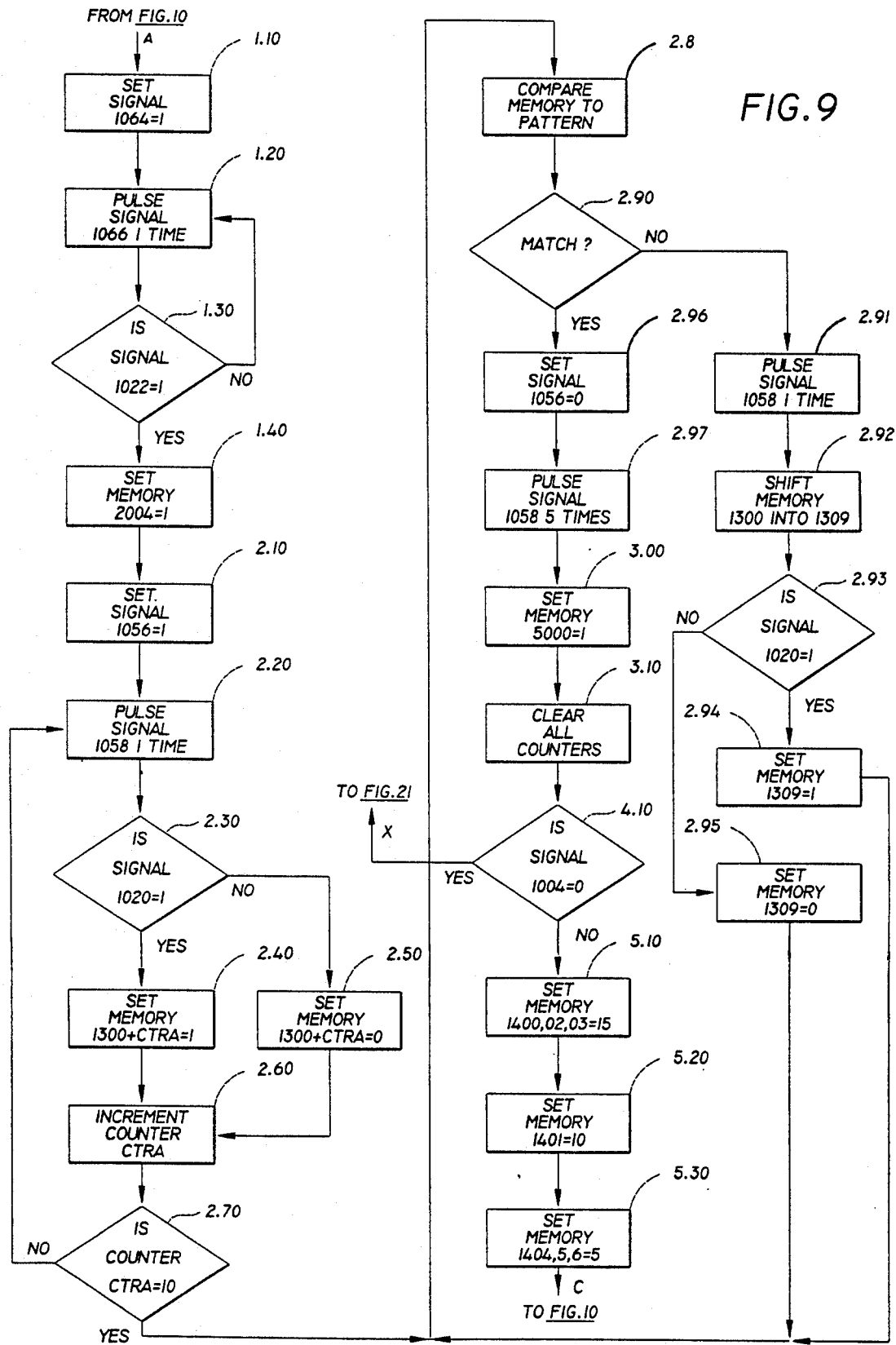
Figure 10:
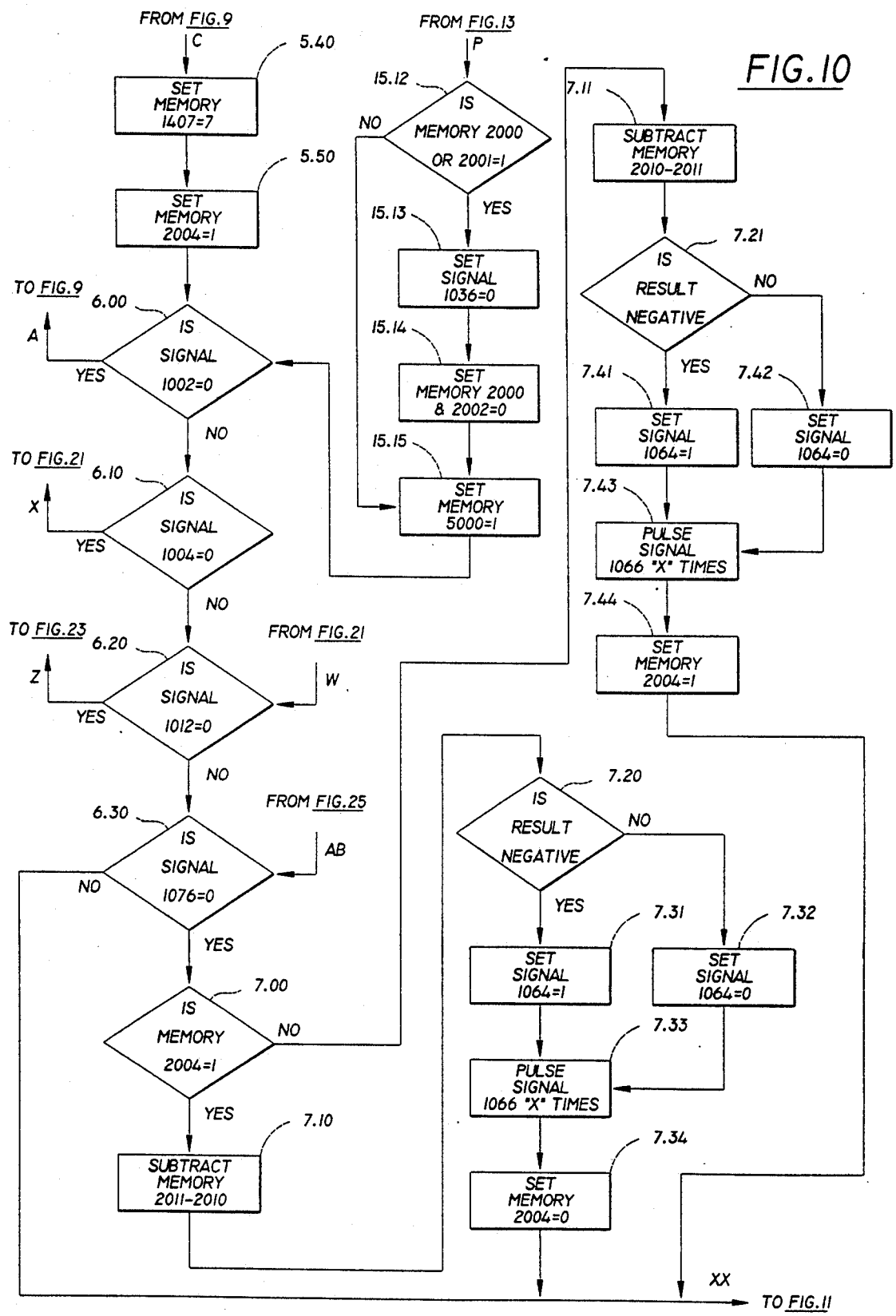
Figure 11:
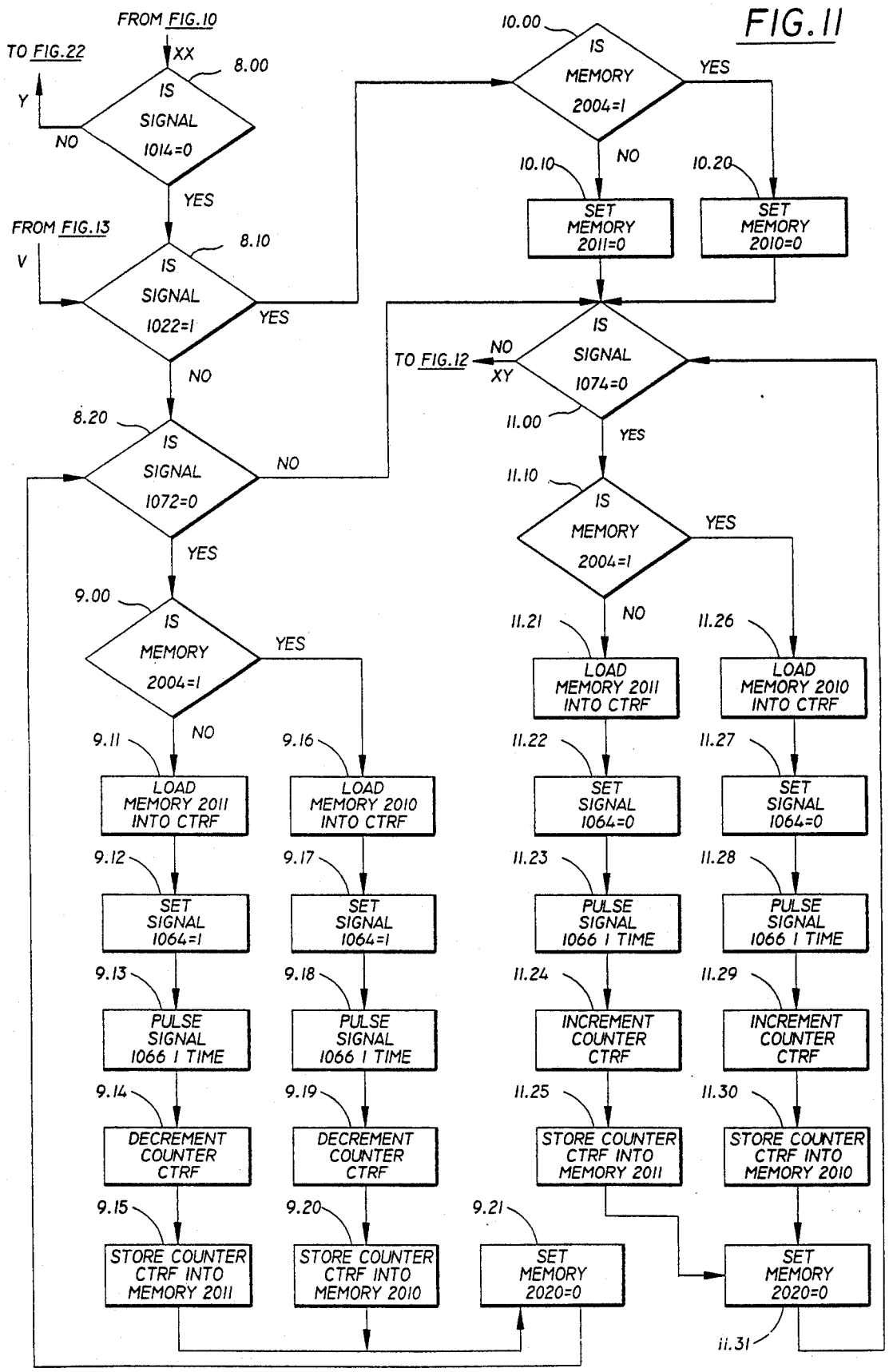
Figure 12:
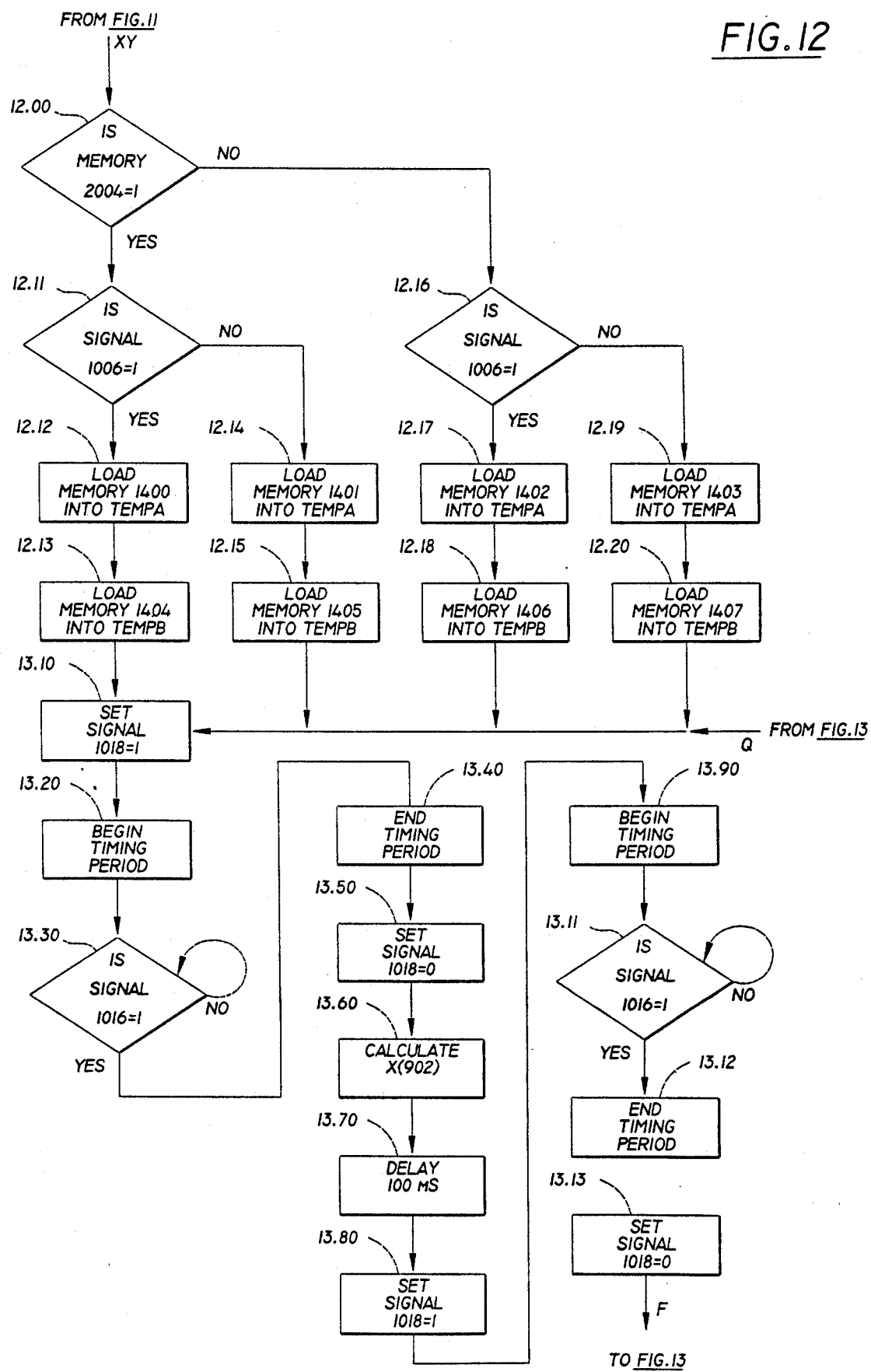
Figure 13:
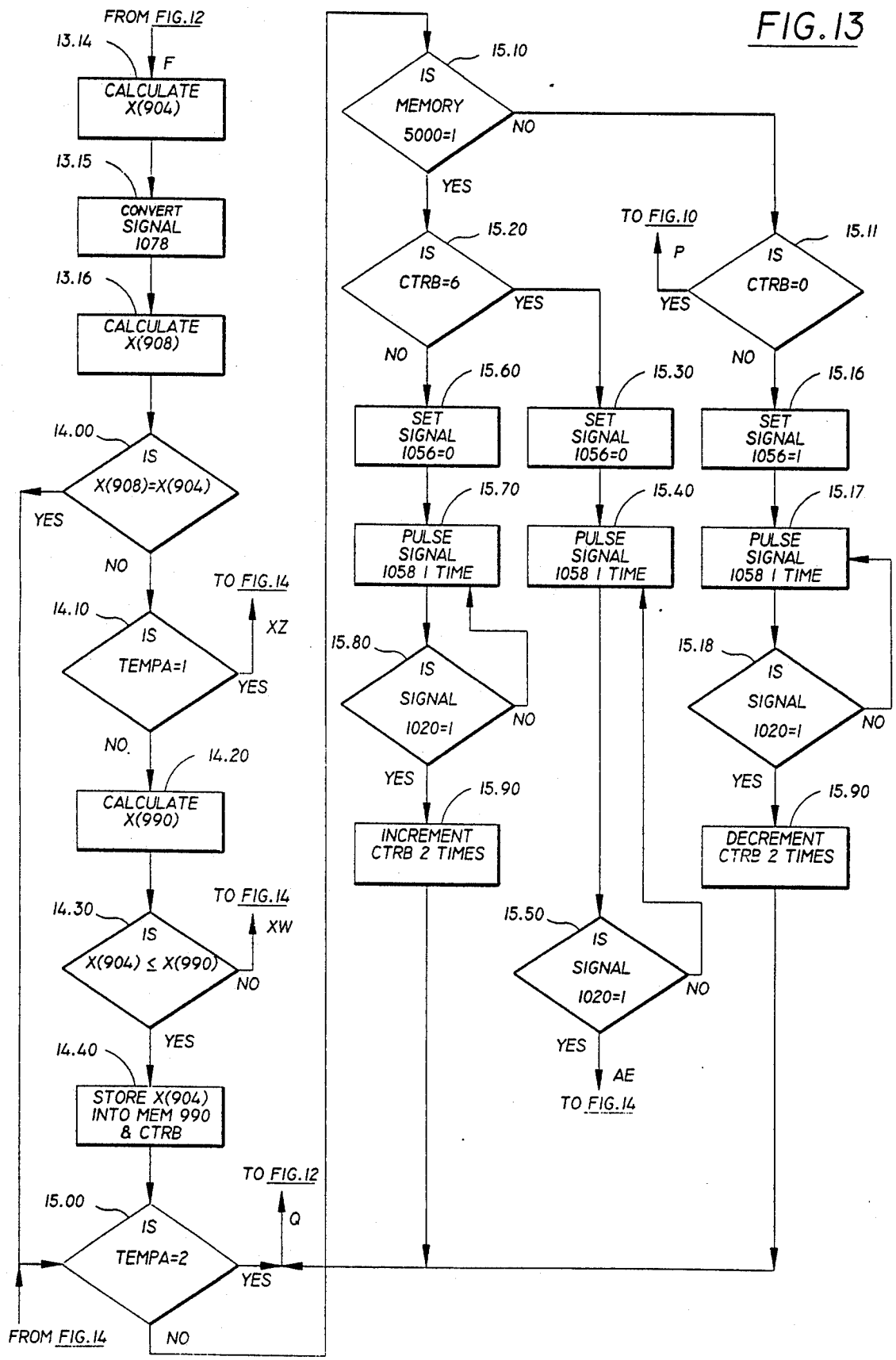
Figure 15:
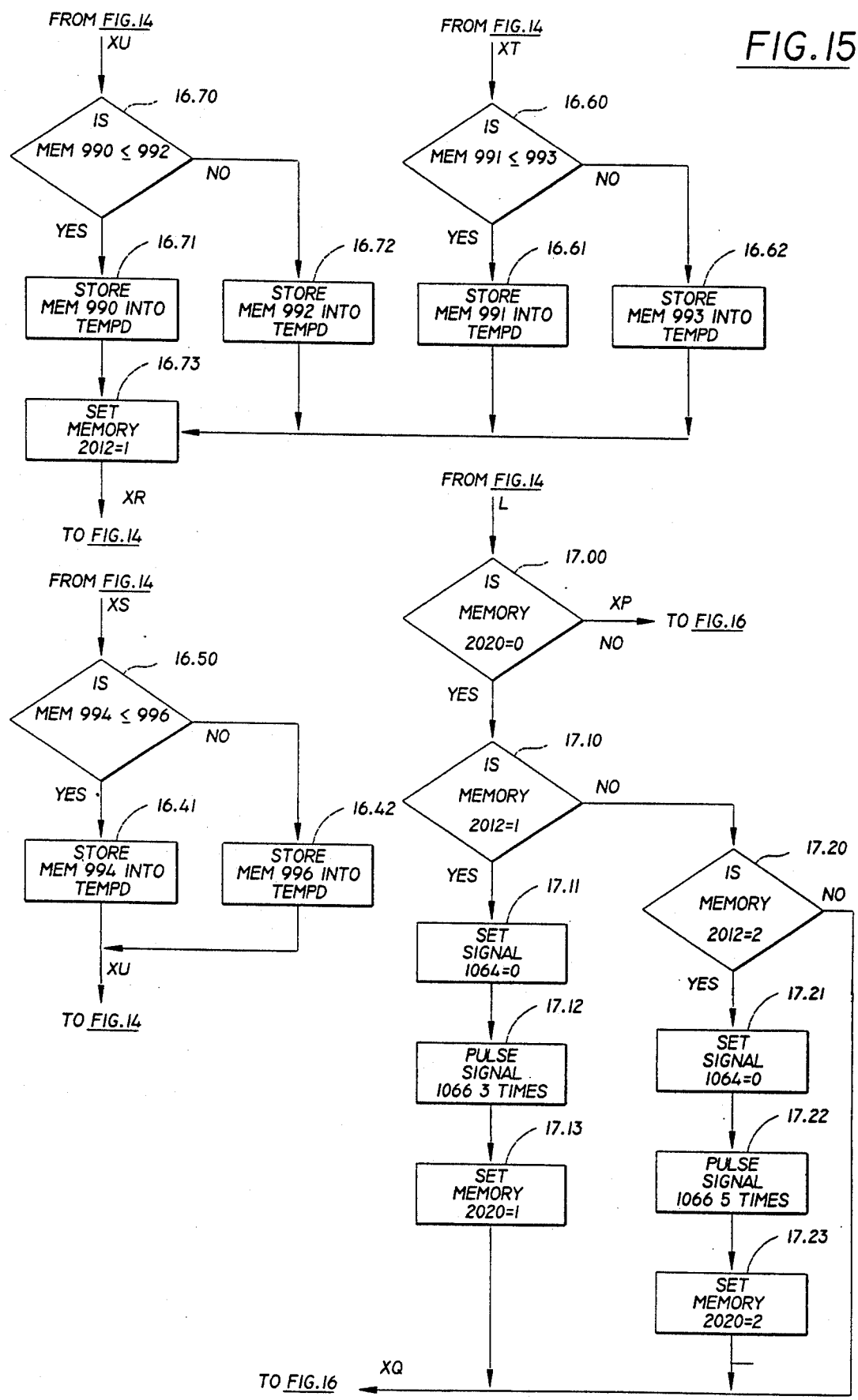
Figure 16:
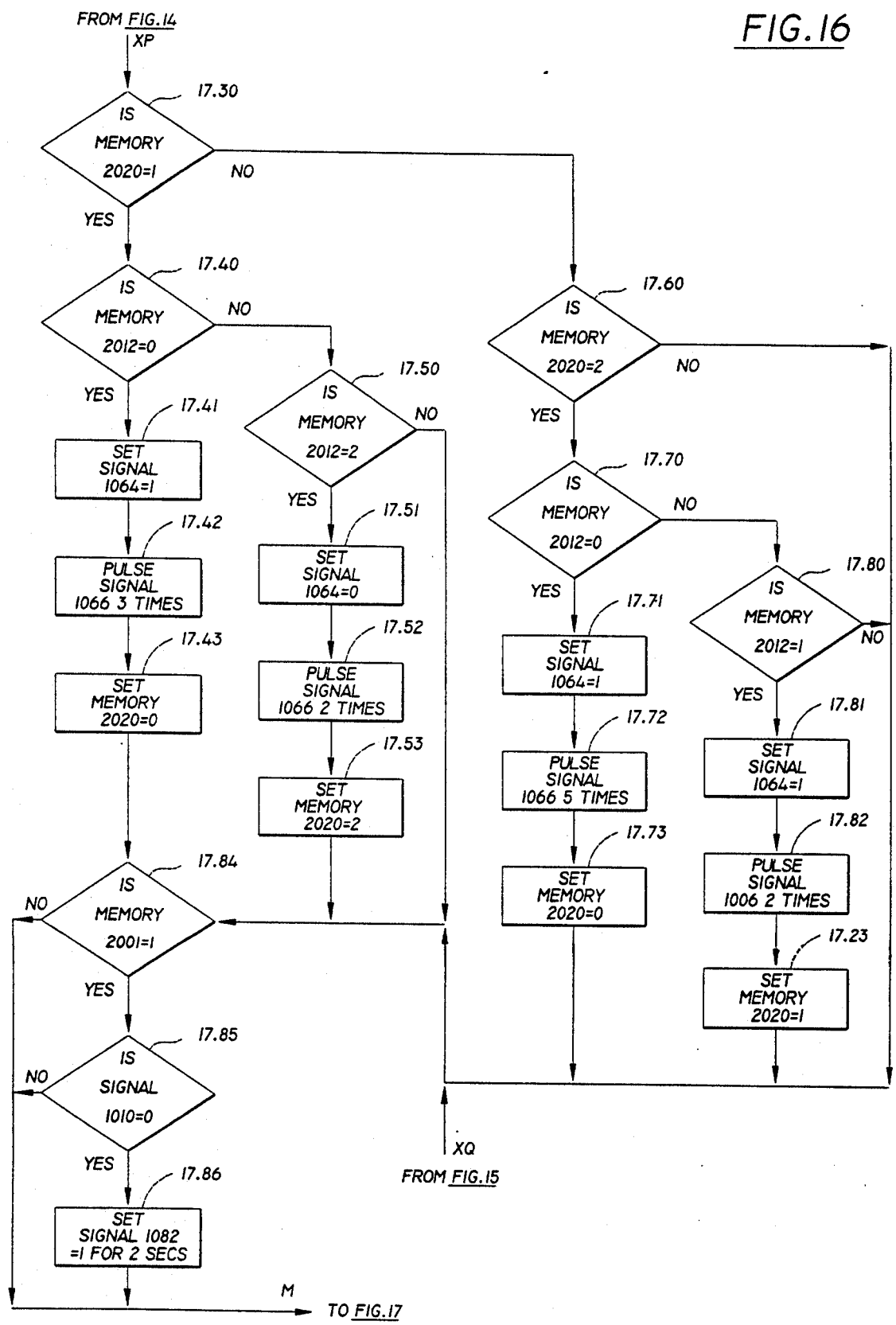
Figure 19:
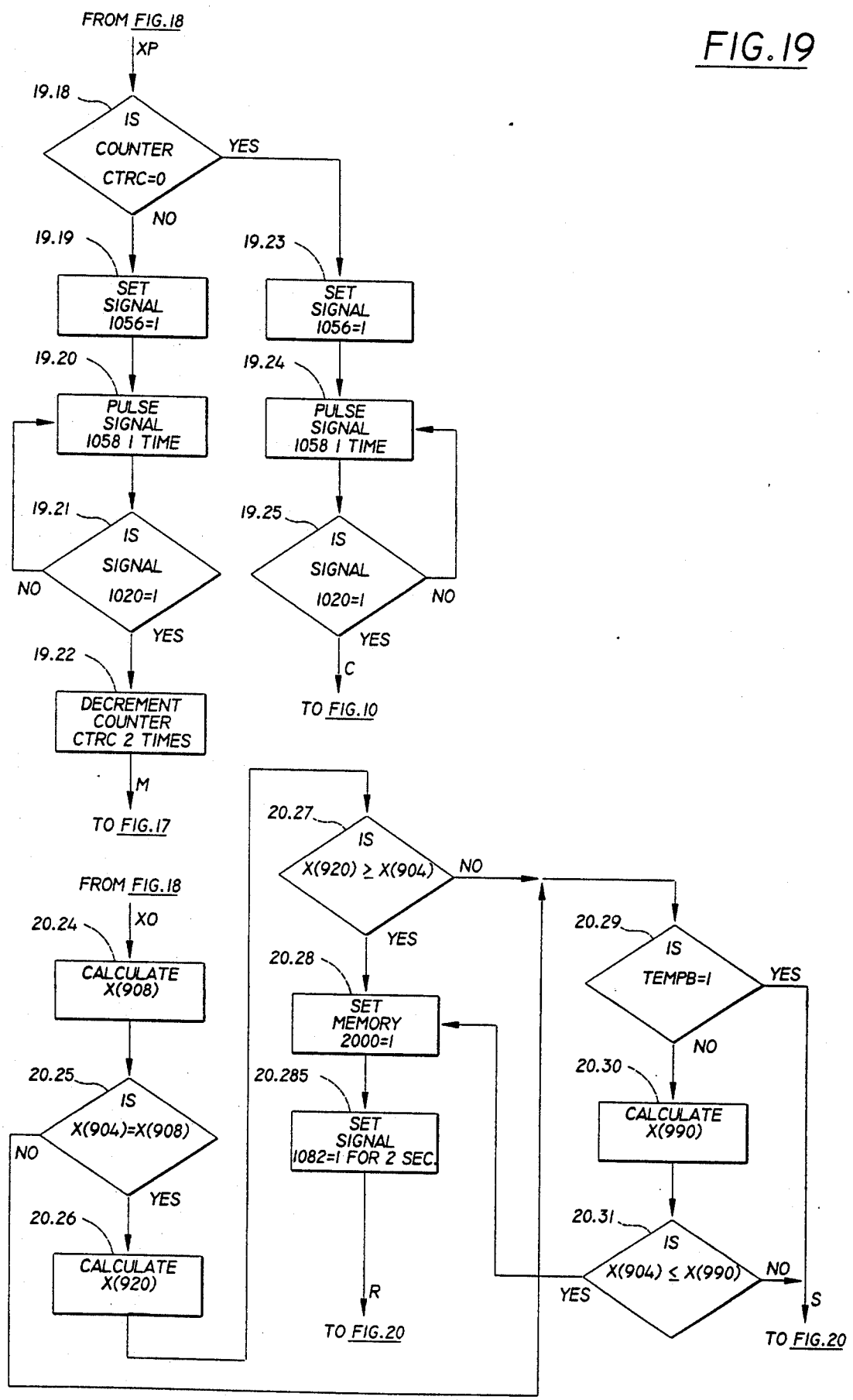
Figure 20:
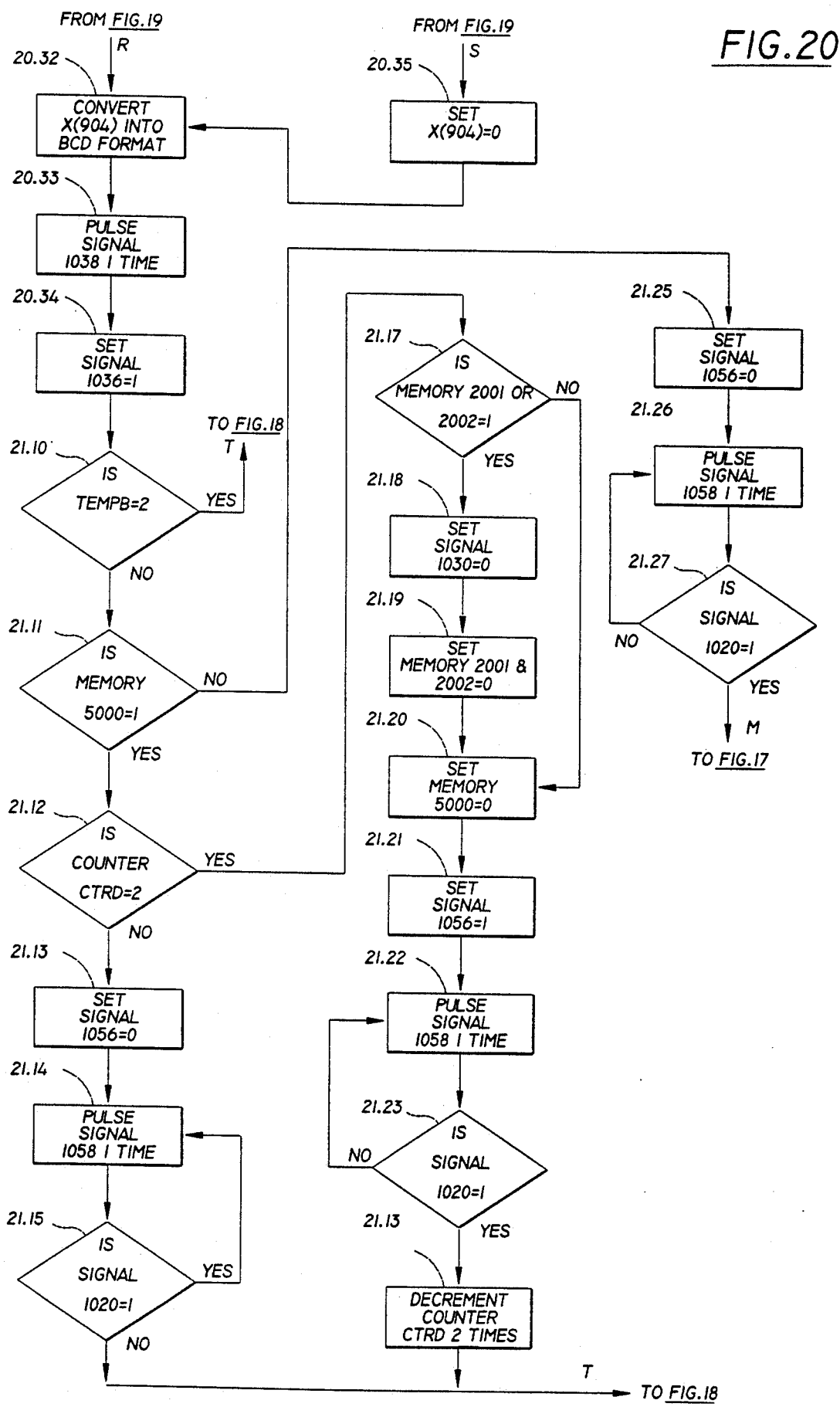
Figure 21:
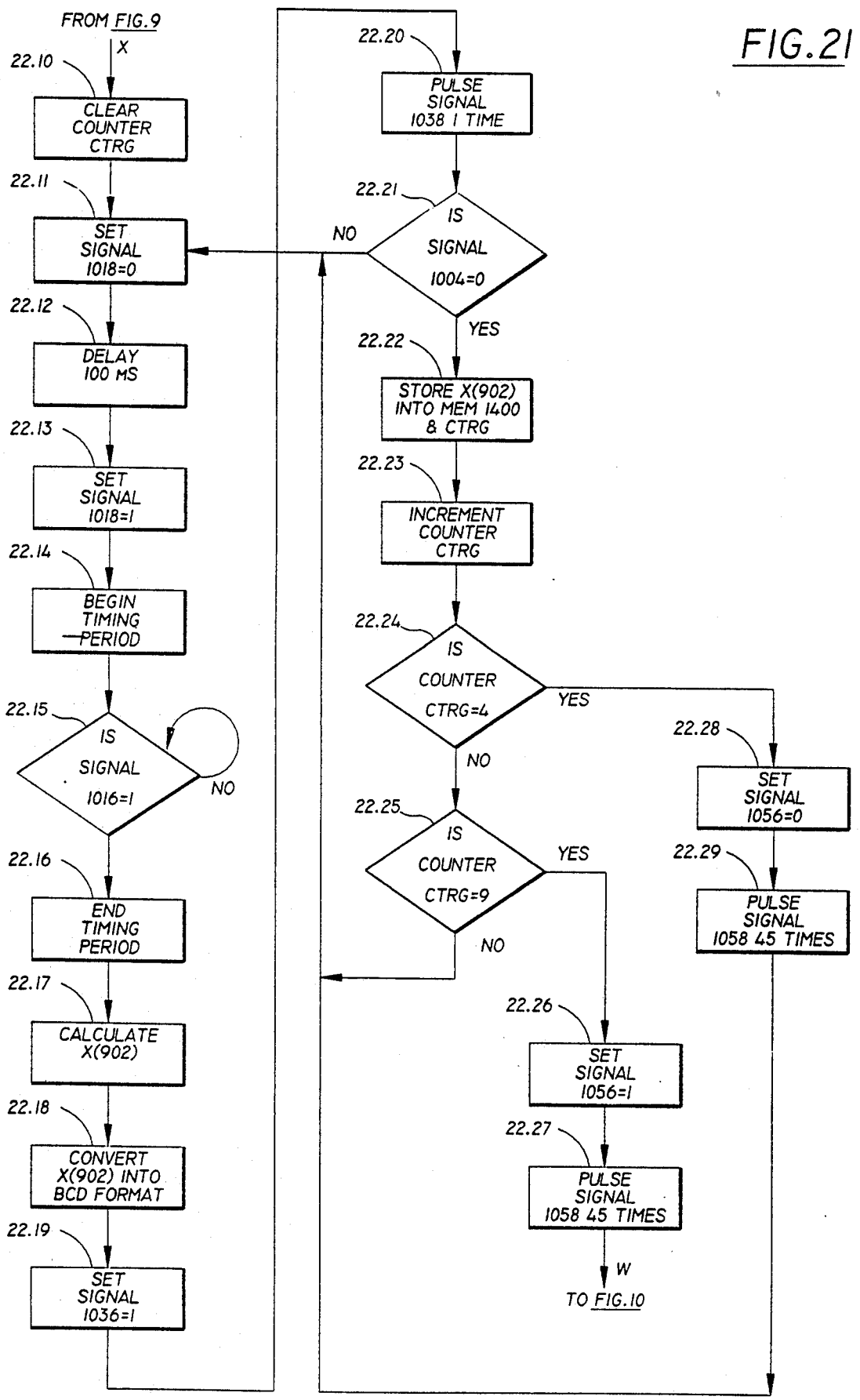
Figure 22:
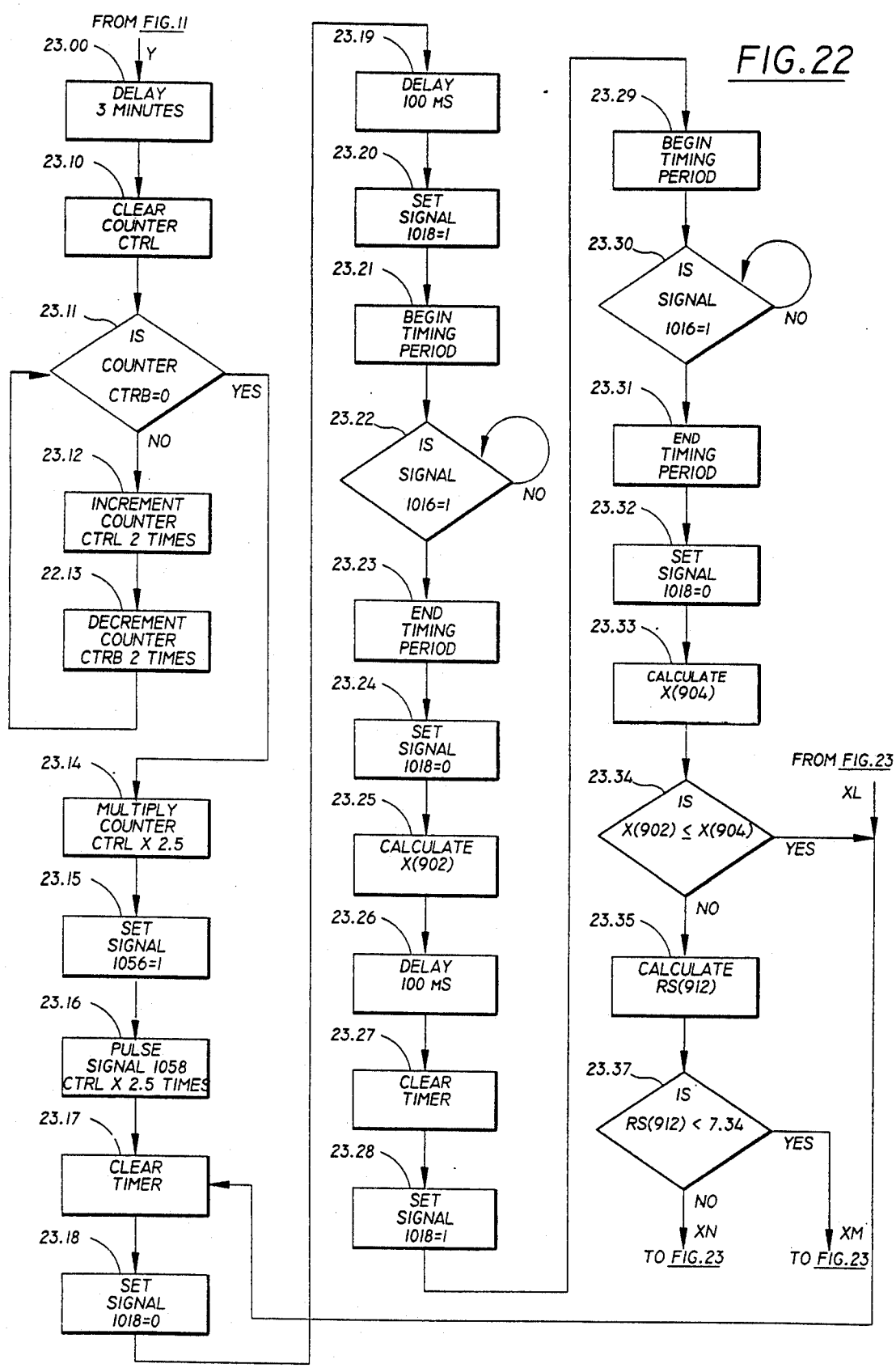

As best shown in FIGS. 7a and 7b, in order to provide an electrical signal to indicate the relative position of the mirror 300 and mirror positioning bracket 302, mirror angle encoder 306 is provided. The mirror angle encoder 306 is comprised of an angle encoder plate 352 and a detent. The angle encoder plate 352 is semi-circular in configuration and is equipped with a single detent which indicates when the mirror 300 and the mirror bracket 302 are at the most clockwise position. The single detent is semi-circular in configuration and has a diameter which cooperates with a roller 354 similar in all respects to roller 54. When the single detent position is engaged, an electrical signal is generated by a detent mechanism switch 358 indicating that the mirror 300 is located at the detent position. The logic signal is utilized by the programmable microcomputer unit 20 to accurately record the position of the mirror 300 when at the initialized position.

Continuing with FIG. 5, when the collision avoidance system 10 is either first connected to the vehicle 12 battery by virtue of connecting +12 volts DC and vehicle ground to the positive voltage regulator 402 or when switch 412 is pressed, causing signal 1002 to go low, the CPU 400 enters into a reset mode. Resistor 414 holds logic signal 1002 high until switch 412 is pressed. The reset mode causes the following: stepper motor 312 receives current signals 1068 and 1070 in the appropriate direction from stepper motor operator circuit 410, causing the stepper motor 312 to rotate the mirror 300 in clockwise fashion for a collision avoidance system 10 that is installed on the right side of the vehicle 12. The stepper motor operator circuit 410 receives logic signals 1064 and 1066 from the CPU 400 which determine the direction in which to rotate the stepper motor 312 and the duration of rotation. The direction of rotation is defined by the state of a logic signal 1064. When logic signal 1064 is high and is received by the stepper motor operator circuit 410 it outputs current signals 1068 and 1070 to stepper motor 312 to cause stepper motor 312 to rotate in the clockwise direction. When the stepper motor operator circuit 410 receives a low logic signal 1064 the stepper motor operator circuit 410 provides current signals 1068 and 1070 to stepper motor 312 to cause same to rotate in the counter-clockwise direction. In conjunction with signal 1064, signal 1066 is applied to the stepper motor operator circuit 410. The signal 1066 is pulsing with a single pulse causing the stepper motor operator circuit 410 to rotate the stepper motor 312 four degrees. The stepper motor 312 causes the angle encoder plate 352 to rotate with roller 354 compressing then and relaxing against spring 356 so that activation of the detent mechanism switch 358 by the roller 354 and spring 356 combination sends a single pulse with an amplitude of +5 volts DC to be received by the CPU 400 when the mirror 300 reaches position where the roller 354 extends into the single detent.

When the detent mechanism switch 358 causes logic signal 1022 to be high the CPU 400 is apprised that the mirror 300 is at the single detent, the initialization position for the mirror 300.

The mirror 300 is moved from this initial position by the operator of the vehicle 12 during an initial programming session. In addition to initialization of the mirror positioning unit 22 during a reset operation, the rotational base 30 is initialized in the following manner. Stepper motor 44 receives current signals 1060 and 1062 from stepper motor operator circuit 408 and causes stepper motor 44 to continuously rotate the rotational base 30 in the clockwise direction for a collision avoidance system 10 that is installed on the right side of the vehicle 12. Initialization of a collision avoidance system 10 mounted on the left side of the vehicle 12 requires the rotational base 30 to be rotated in the counter-clockwise direction. The stepper motor operator circuit 408 receives logic signals 1056 and 1058 from the CPU 400 which determine the direction in which to rotate the stepper motor 44 and the duration of rotation. The direction of rotation is defined by the state of logic signal 1056. When a high logic signal 1056 is received by the stepper motor operator circuit 408 it outputs current signals 1060 and 1062 to the stepper motor 44 to cause rotation in the clockwise direction. When the stepper motor operator circuit 408 receives a low logic signal 1056 it provides current signals 1060 and 1062 to the stepper motor 44 to cause rotation in the counter-clockwise direction.

In conjunction with signal 1056, signal 1058 is applied to the stepper motor operator circuit 408. The logic signal 1058 is outputted by CPU 400 in pulse form with a single pulse causing the stepper motor operator circuit 408 to rotate the stepper motor 44 four degrees in a manner similar to that described above in connection with the description of FIGS. 3 and 4.

It will be understood that a unique train of pulses is generated by the detent mechanism switch 58 when the roller 54 and spring 56 combination cycles continuously through a compression and relaxation, enabling the CPU 400 to determine the rotational base 30 position from any given previously unknown position, as experienced during initialization, in the following manner: CPU 400 causes logic signal 1056 to become high signaling the stepper motor operator circuit 408 to output current signals 1060 and 1062 in the right direction to cause stepper motor 44 to rotate the rotational base 30 in the clockwise direction. Simultaneously logic signal 1058 is outputted to stepper motor operator circuit 408 as a single pulse causing stepper motor 44 to rotate four degrees. In conjunction with signal 1058 CPU 400 determines if logic signal 1020 is at a high logic level, indicative of a detent position or a point where the angle encoder plate 52 is not in contact with the roller 54, due to the semi-circle configuration thereof, or if it is at a low logic level.

If logic signal 1020 is detected to be high a 1 is entered into memory location 1300 and logic signal 1058 is again outputted to stepper motor operator circuit 408 as a single pulse which causes stepper motor 44 to rotate another four degrees.

Logic signal 1020 is tested again to determine if it is high or low. If logic signal 1020 is high a 1 is entered into memory location 1301. If logic signal 1020 is low a 0 will be entered into memory location 1301. The above process of rotating the rotational base 30 four degrees and then determining and storing the status of logic signal 1020 is carried out until a string of 10 samples of logic signal 1020 is entered into memory locations 1300 through 1309 at which time a comparison routine is invoked as follows: the pattern of 1's and 0' entered at memory locations 1300 through 1309 is tested against the following pattern; 1 1 1 0 1 0 0 0 0 1. If the pattern of 1's and 0's matches the above pattern then the rotational base 30 is determined to be located at position 86.

The unique pattern above is a consequence of the sequence of detents in conjunction with the semi-circular shape of the angle encoder plate 52 and the direction of rotation. Since each detent, which represents the rotational base 30 positions 84 through 102, is located exactly 20 degrees from an adjacent detent, five pulses of the stepper motor 44 are required to arrive at any adjacent detent. When the angle encoder plate 52 is positioned at a detent a high logic signal is generated by the detent mechanism switch 58, and 1, which is entered into memory during the sampling of signal 1020, will always be followed and preceded by a 0, except at the point where the semi-circular angle encoder plate 52 is no longer positioned at a detent. At the point where the angle encoder plate 52 is rotated clockwise past detent position 102 two adjacent 1's, are entered into memory. When the comparison routine determines that the data entered into memory locations 1300 through 1309 match the above pattern the CPU 400 causes logic signal 1056 to go low.

In conjunction with logic signal 1056, logic signal 1058 is outputted to stepper motor operator circuit 408 as a sequence of 5 pulses which causes the rotational base 30 to rotate counter-clockwise to position 84.

At this time the initialization routine is complete and scanning of the 200 degree area begins.

If the above pattern does not match the contents of memory locations 1300 through 1309 the CPU 400 rotates the rotational base 30 four degrees in the clockwise direction as described previously.

Immediately after rotating the rotational base 30 the values that are currently present in memory locations 1300 through 1309 are shifted down to their lower adjacent memory locations. Memory location 1309's value is placed into memory location 1308. Memory location 1308's value is placed into memory location 1307 and so on until all memory location values are shifted down to a lower memory location. The value of memory location 1300 is discarded. Immediately following the shifting of the memory locations, logic signal 1020 is sampled. If logic signal 1020 is high a 1 is placed into memory location 1309, which has been vacated due to the shifting process, and if logic signal 1020 is low a 0 will be placed into memory location 1309.

After logic signal 1020 is sampled and the correct data entered into memory location 1309, the above comparison routine is invoked to determine if this new pattern of 1's and 0's matches the above pattern. If a match is found then the rotational base 30 is rotated back to position 84 and the initialization is complete.

If a match does not occur the above procedure for updating the data pattern is repeated and the comparison routine is invoked again. This process is repeated until the above pattern is found to match the contents of memory locations 1300 through 1309.

The above initialization routine for the rotational base 30 is invoked during a reset condition and when the ignition circuitry 502 is detected by the CPU 400 to be in service. The CPU 400 determines when the ignition circuitry 502 of the vehicle 12 is on, when logic signal 1014 is low. When the vehicle 12 is in a parked condition and the ignition circuitry 502 of the vehicle 12 is off, logic signal 1014 is high due to pull up resistor 448. When the vehicle 12 ignition circuitry 502 introduces a current to relay 442 a magnetic field effect causes mechanical contacts of relay 442 to close, creating a circuit to vehicle 12 ground. This in turn causes the CPU 400 to interpret logic signal 1014 as low. When the vehicle 12 ignition circuitry 502 stops current flow to relay 442 residual current is recycled to ground via diode 446.

After the initialization of the mirror 300 and the rotational base 30 from a power up or switch 412 reset, the CPU 400 scans switches 490 and 420 to determine which operator programmed distances to use when scanning the 200 degree area. A total of eight operator programmed distances may be entered by up to two operators of the vehicle 12. Operator programmed distances will be accepted and utilized for rotational base 30 positions 84, 86, 88, and 90.

Since the collision avoidance system 10 can accommodate two operators, each with the ability to program distances for two distinct warning zones, four values are recorded for this set of acoustical ranging unit 16 positions. The four operator programmed distances are designated as X(910), X(912), X(914) and X(916). Operator programmed distance X(910) represents the distance value recorded by the CPU 400 during an operator initiated programming session for operator #1, zone #1, and is entered into memory location 1400. Operator programmed distance X(912) represents the distance value recorded by the CPU 400 during an operator initiated programming session for operator #1, zone #2 and is entered into memory location 1401. Operator programmed distance X(914) represents the distance value recorded by the CPU 400 during an operator initiated programming session for operator #2, zone #1 and is entered into memory location 1402. Operator programmed distance X(916) represents the distance value recorded by the CPU 400 during an operator initiated programming session for operator #2, zone #2 and is entered into memory location 1403.

In accordance with rotational base 30 positions 84, 86, 88, and 90 utilizing a common operator programmed distance, rotational base 30 positions 100 and 102 also utilize an operator programmed distance.

Since the collision avoidance system 10 can accommodate two operators, four values will also be recorded for acoustical ranging unit 16 positions 100 and 102. The four operator programmed distance will be designated as X(918), X(920), X(922) and X(924). Operator programmed distance X(918) represents the distance value recorded by the CPU 400 for operator #1, zone #1 and is entered into memory location 1404. Operator programmed distance X(920) represents the distance value recorded by the CPU 400 for operator #1, zone #2 and is entered into memory location 1405. Operator programmed distance X(922) represents the distance value recorded by the CPU 400 for operator #2, zone #1 and is entered into memory location 1406. Operator programmed distance X(924) represents the distance value recorded by the CPU 400 for operator #2, zone #2 and is entered into memory location 1407.

The CPU 400 determines which operator programmed distance to use by decoding the configuration of switches 420 and 490. After a power on or switch 412 reset initialization, the CPU 400 assumes that the vehicle seat is physically adjusted for operator #1 using of either operator programmed distances X(910) or X(912) for rotational base 30 positions 84, 86, 88, and 90 and X(918) or X(920) for rotational base 30 positions 100 and 102. Further determination on using either operator programmed distance X(910) or X(912) and X(914) or X(916) is made by determining the status of the zone #1/#2 switch 420 and determining the status of logic signal 1006. If logic signal 1006 is high (zone #1) then operator programmed distances X(910) and X(918) are used in subsequent tests. If logic signal 1006 is low (zone #2) then operator programmed distances X(912) and X(920) are used in subsequent tests.

To confirm the presence of operator #2 the CPU 400 polls logic signal 1076 every second to determine the state. When seat switch 490 is activated by operator #2 during the course of adjusting the seat, a path to ground is created and a low logic signal 1076 is invoked. When seat adjustment does not take place, switch 490 does not create a path to vehicle 12 ground and logic signal 1076 is high due to the effect of the pull up resistor 480.

If it is determined that logic signal 1076 is low then either operator programmed distances X(914) or X(916) for rotational base 30 positions 84, 86, 88, and 90 and either operator programmed distances X(922) or X(924) for rotational base 30 positions 100 and 102 are used in subsequent equations when calculating distance and relative speed.

As with operator #1 the status of zone #1/#2 switch 420 determines with operator programmed distances to use. If logic signal 1006 is high (zone #1) then operator programmed distances X(914) and X(922) are used in subsequent equations. If logic signal 1006 is low then operator programmed distances X(916) and X(924) are used in subsequent equations. With each transition of the logic signal 1076 from a high state to a low state the CPU 400 toggles from using either operator programmed distances X(910), X(912), X(918), and X(920) or X(914), X(916), X(922), and X(924). After the CPU 400 determines which operator programmed distances to use, the distances are modified. The modified operator programmed distances are used in subsequent equations to determine whether or not to invoke a warning.

After the initialization and programming is completed the CPU 400 is instructed by the program 900 to determine if the vehicle 12 is prepared to move forwardly.

When vehicle 12 reverse circuitry 500 is on, a current is delivered to relay 436 causing the mechanical contacts of the relay 436 to close. When the mechanical contacts close, a circuit is completed to vehicle 12 ground which induces logic signal 1012 to go low. In the normal un-energized mode logic signal 1012 is high due to the effect of pull up resistor 444. After the vehicle 12 reverse circuitry 500 no longer supplies current to relay 436 residual current is present and is recirculated through the relay 436 by diode 440.

In the normal forward mode of operation the vehicle's reverse circuitry 500 does not supply current to relay 440 and logic signal 1012 will be high. The CPU 400 then scans logic signal 1014 to determine if the vehicle 12 ignition circuitry 502 is on.

After logic signal 1012 has been polled in order to determine if the vehicle is being prepared to move in the forward direction and has been found to be at high logic level the seat switch 490 will be polled. If input logic signal 1076 is low then the CPU 400 has determined that the seat is currently being adjusted for a different operator. In order to position the mirror 300 automatically for the different driver, memory location 2004 is utilized. When memory location 2004 is equal to one the CPU 400 assumes that operator #1 is operating the vehicle and when memory location 2004 is equal to zero the CPU 400 assumes that operator #2 is operating the vehicle. Therefore if input logic signal 1076 is low the CPU 400 will alter the mirror 300 to the next operator's preferred position. For instance, if operator #1 has been remembered by the CPU 400 as having operated the vehicle last (by virtue of detecting a one in memory location 2004) the CPU 400, upon determining that the seat has been re-adjusted adjusts the mirror 300 to operator #2's position in the following manner; memory location 2011 is used to hold the number of pulses of logic signal 1066 that has occurred when the mirror 300 was positioned to operator #2's preferred setting. This number is the exact number of pulses required to rotate the mirror 300 counter-clockwise from the initialized mirror 300 position. The number of pulses for operator #1 is stored in memory location 2010. Therefore in the given scenario the current mirror 300 position is that of operator #1 and will be rotated to operator #2's position. Memory location 2011 will then be subtracted from memory location 2010 and the result will be used to rotate the mirror 300. If the result from the subtraction is negative then this is an indication that operator #1's position is more counter-clockwise then operator #2 and the mirror 300 will have to be rotated clockwise to operator #2's position. Therefore upon detecting that the above subtraction yielded a negative result, logic signal 1064 will be set to a high logic level and logic signal 1066 will be pulsed the number of times which is equal to the absolute value of the subtraction result. If the result is positive then the logic signal 1064 will be set to low level and logic signal 1006 will again be pulsed "result" times. After completion of the rotation of the mirror 300 the CPU 400 will set memory location 2004 to a zero, thereby indicating for future reference that the mirror 300 is now located at operator #2's position. The above process is repeated when the CPU 400 determines that it is necessary to rotate the mirror 300 from operator #2's position to operator #1's with the difference in memory location 2010 being subtracted from memory location 2011.

After the CPU 400 has determined conclusively that the vehicle is now prepared to move in the forward direction logic signals 1072 and 1074 will be polled in order to determine if the current operator of the vehicle 12 is adjusting the mirror 300 to a new position. If logic signal 1072 is low then the CPU 400 has determined that the operator is requesting clockwise movement of the mirror 300 to the left (for a collision avoidance system mounted on the right side of the vehicle). Therefore logic signal 1064 will be set to high level and logic signal 1066 will be pulsed so long as it is determined that logic signal 1072 is low. Upon every pulse of logic signal 1066, a counter will be decremented which has been previously down loaded with the "old" number of pulses from memory location 2011.

Continuing, memory location 2011 is reloaded with the new counts. Also memory location 2020 is set to zero to indicate that the mirror 300 currently resides at the operator's preferred position. After the CPU 400 determines that logic signal 1072 is no longer low, logic signal 1074 is polled in order to determine if the operator is requesting counter-clockwise movement of the mirror 300 to the right. The above procedure for moving the mirror 300 to the left is carried out with the counter now being incremented.

If logic signal 1014 is high the CPU 400 enters into a surveillance mode of scanning. If the CPU 400 determines that logic signal 1014 is low the CPU 400 will poll logic signal 1012 to determine if the vehicle 12 is prepared to move forward. If logic signal 1012 is low then the CPU 400 enters into the reverse scanning mode. If logic signal 1012 is high the CPU 400 determines that the vehicle 12 is prepared to move in the forward direction. At this time the program 900 instructs the CPU 400 to scan positions 84 through 102 for potential threatening objects 14 in the following manner: at position 84 where the rotational base 30 rests after an initialization or programming period, the CPU 400 will send a high logic signal 1018 to the receiver/transmitter unit 42 causing the receiver/transmitter unit 42 to induce an ultrasonic wave via the transducer 32. Simultaneously a timer internal to the CPU 400 begins timing.

When an object 14 reflects the ultrasonic wave back to the transducer 32, which now acts as an antenna as instructed by the receiver/transmitter unit 42, a high logic level signal 1016 is sent to the CPU 400 from the receiver/transmitter unit 42 via inverter circuits 404 and 406. Inverter circuits 404 and 406 are used to translate a TTL low logic signal to a low logic signal which the CPU 400 can recognize. The program 900 stops the timer and executes the following equation in order to calculate the distance X(902) to the object 14;

$$X(902) = 1125 * T(901)/2 \qquad (1)$$

where;
$X(902)$ = calculated distance to object 14
$1125$ = speed of the ultrasonic sound wave
$T(901)$ = value of timer when high logic signal 1016 is received from the receiver/transmitter unit 42 by CPU 400.

Since the value T(901) represents the total round trip time for an ultrasonic wave to travel to the object 14 and back, this value is divided by two.

Next another distance measurement X(904) is calculated 0.1 second later utilizing equation 1. Immediately after the second distance measurement X(904) the program 900 instructs the CPU 400 to convert a voltage signal 1078 present at the CPU 400 to a binary representation. This analog to digital conversion represents the vehicle's 12 speed S(906) obtained by converting the voltage signal 1078 to an eight bit binary code which can be utilized by the CPU 400. A current signal 1080, which is generated by the speed transducer 492 is introduced to variable resistor 494 at which time voltage signal 1078 is generated due to the effects of the series combination of the resistors 494 and 496, having values chosen to develop a voltage signal 1078 of 5 volts DC when a current signal 1080 of 20 milliamps is present. A 20 milliamp current signal 1080 is generated when the vehicle 12 has reached a maximum speed of 65 miles per hour.

When the vehicle 12 is stationary a current signal 1080 of 4 milliamps is present, generating a voltage signal 1078 of 1 volt DC. Variable resistor 494 is utilized to calibrate the voltage signal 1078 to the desired voltage of +5 VDC when current signal 1080 is at a value of 20 milliamps and a voltage of +1 VDC when the current signal 1080 is at a value of 4 milliamps. The present vehicle speed S(906) is used to process the two distance measurements X(902) and X(904) to detect if the object 14 is stationary in the following manner: if the detected object 14 is stationary then the second distance measurement X(904) equals a predicted distance to the stationary object 14 whose value is calculated by the following equation;

$$X(908) = X(902) + (or -) [S(906) * .1] \qquad (2)$$

where;
$X(908)$ = the predicted distance of the stationary object 14
$X(902)$ = the first measured distance of the object 14
$S(906)$ = the current vehicle 12 speed
$.1$ = time interval between distance measurements $X(902)$ and $X(904)$
$(-)$ = used at rotational base 30 positions 100 and 102.

The program 900 instructs the CPU 400 to execute equation 2 and then compares the predicted distance X(908) to the second distance measurement X(904). If the two values are equal, the detected object 14 is determined to be stationary and no more processing is done at position 84. If the two values are not equal then the second measured distance X(904) is tested by the program 900 to determine if this distance is less than or equal to the operator programmed distance X(910), X(912), X(914), or X(916), described above. The value of the selected programmed distance is first compared to the value of two. If the distance is equal to two the CPU 400 continues to scan rotational base 30 position 84 until subsequent tests reveal that the programmed distance is no longer equal to two. If the value of the chosen operator programmed distance is equal to 1 then a subsequent test utilizing equation 3 below is unnecessary and the CPU 400 continues to calculate the relative speed of the detected object 14.

If a value other than one or two is utilized for the chosen operator programmed distance the operator programmed distance will be modified according to the following equation;

$$X(990) = X(???) + (1S(906) * 2) \quad (3)$$

where;
$X(990)$ = modified driver programmed distance
$X(???)$ = chosen driver programmed distance
(either driver programmed distance $X(910)$, $X(912)$, $X(914)$, or $X(916)$)
$S(906)$ = current vehicle 12 speed Equation 3 modifies the currently chosen operator programmed distance X in order to provide an additional 2 seconds of warning time. If it is found that the second distance measurement $X(904)$ is less than or equal to the modified operator programmed distance $X(990)$ the program 900 instructs the CPU 400 to store the second distance measurement $X(904)$ into memory location 990 in order to compare this distance measurement against other distance measurements to be taken at positions 86, 88, and 90 and tested to determine if the second distance measurement $X(904)$ at these positions is less than the modified operator programmed distance $X(990)$ or if the relative speed is great enough to warrant a warning.

This comparison is made so LED 62 displays only the object 14 which poses the greatest threat to the vehicle 12 which has been detected at positions 84, 86, 88, or 90. If during the time the program 900 determines that the second distance measurement $X(904)$ is not less than or equal to the modified operator programmed distance $X(990)$ the program 900 instructs the CPU 400 to store a value of 0 at memory location 990. The CPU 400 proceeds to calculate the relative speed $RS(912)$ of the detected object 14 in relation to the vehicle 12 in accordance with the following equation:

$$RS(912) = [X(902) - X(904)]/.1 \quad (4)$$

where:
$RS(912)$ = the calculated relative speed between the vehicle 12 and the object 14;
$X(902)$ = the first distance measurement for the object 14;
$X(904)$ = the second distance measurement of the object 14.

Since the distance measurements $X(902)$ and $X(904)$ are taken 0.1 second apart the difference between the two distance measurements $X(902)$ and $X(904)$ is divided by the time interval to arrive at the relative speed between the vehicle 12 and the object 14. If equation 4 yields a negative result a 0 is entered into memory location 991 indicating the object 14 is moving away from the vehicle 12. However if the result is positive the calculated relative speed $RS(912)$ is used in conjunction with the object's 14 second measured distance $X(904)$ to determine if a maneuver such as a lane change can be accomplished safely.

It is assumed that a lane change takes approximately three seconds to complete. This time period is then used in the following equation to arrive at predicted distance $X(916)$ to the object 14;

$$X(916) = X(904) - [RS(912) * 3] \quad (5)$$

where:
$X(916)$ = the predicted distance to the object 14 within 3 seconds;
$X(904)$ = the second measured distance to the object 14;
$RS(912)$ = the relative speed of the object 14 with -continued
respect to the vehicle 12.

The predicted distance $X(916)$ is then compared to the modified operator programmed distance $X(990)$. If the predicted distance $X(916)$ is less than or equal to the operator programmed distance $X(990)$ the predicted distance $X(916)$ is then placed into memory location 991. If the predicted distance $X(916)$ is greater than the modified operator programmed distance $X(990)$, a value of 0 is placed in memory location 991.

After the above tests are carried out and the results are placed into memory, the CPU 400 rotates the rotational base 30 to position 86.

The program 900 instructs the CPU 400 to cause the rotational base 30 to rotate to position 86 as previously defined. However, here logic signals 1060, 1062, 1056, 1058 and 1020 become the operatives. Once rotational base 30 is at position 86, the program 900 instructs the CPU 400 to execute the procedure utilized at position 84 for detecting and monitoring an object 14 present at this position. Memory location 992 is utilized to hold the second distance measurement $X(904)$ if it is determined, via equation 2, that the object 14 is not stationary and is less than the modified operator programmed limit $X(990)$, as determined by equation 3. If the second distance measurement $X(904)$ is greater than the modified operator programmed distance $X(990)$ a 0 is entered into memory location 992 and the relative speed $RS(912)$ is calculated, via equation 4, and utilized in equation 5 to determine if the relative speed $RS(912)$ is great enough to warrant a warning, at which time the second distance measurement $X(904)$ is placed into memory location 993. If it is found that the relative speed is not great enough to warrant a warning a 0 is entered into memory location 993. The above process continues until positions 84, 86, 88, and 90 have been scanned for objects 14 with the results being placed in memory locations 990, 992, 994 and 996, respectively, and 991, 993, 995, and 997 respectively.

Therefore, assuming a worse case scenario, multiple objects 14 can be located and identified at each of the four positions 84, 86, 88, and 90.

It will be understood that information regarding an object's 14 distance and relative speed is gathered and subjected to the above equations and tests at all four positions first. After all relative information has been received and entered into memory, a comparison routine is invoked to determine which object 14 poses the greatest danger. Since only one visual warning device, LED 62, is used to inform the operator of imposing objects 14 located at the rear of the vehicle 12, a priority scheme for displaying object's 14 distances is employed in the following manner; first the program 900 instructs the CPU 400 to compare the distance values located at memory locations 990, 992, 994, and 996 which are less than the modified operator programmed distance $X(990)$. The smallest value (other than zero) found at memory location 990, 991, 992, or 993 is displayed on LED 62. If all memory locations contain a zero, memory locations 994, 995, 996, and 997 are compared to each other. The smallest value here is displayed on LED 62. If memory locations 994, 995, 996, and 997 all contain a zero, the number 0 is displayed on LED 62. In order for the object 14 to be viewed by the operator a memory location 2012 is used to track the object 14. If the object's 14 distance is located in memory locations 990-993 a one is written to memory location 2012. If the object's 14 distance is located at memory locations 994-997 a two is written to memory location 2012.

If a distance is found suitable for display on LED 62, the memory location which contains the value, represented by a byte, is subjected to a subroutine which converts the binary information supplied by the byte into an eight bit byte value which represents two binary coded decimals (BCD) in a single byte. The lower nibble of the byte will contain a value equivalent to the ones place in decimal notation. The higher nibble will contain the value equivalent to the tens place in decimal notation.

The eight bit byte is presented to the BCD to seven segment decoder/operator/latch integrated circuits 450, 452, 458, and 460 via logic signals 1040 through 1054.

Logic signals 1040 through 1046 contain the lower nibble of the byte and logic signals 1048 through 1054 contain the higher nibble.

The logic signals 1040 through 1046 are shared between the integrated circuits 452 and 460 and logic signals 1048 through 1054 are shared between integrated circuits 450 and 458. All four integrated circuits 450, 452, 458, and 460 convert the BCD information of logic signals 1040 through 1054 into signals which selectively light the seven individual segments to correctly represent the decimal digit to the respective display.

Integrated circuit 450 is utilized to display the ten's value of the decimal on display LED 60 and integrated circuit 452 is utilized to display the one's value of the decimal on display LED 60. Integrated circuit 458 is utilized to display the ten's value of the decimal on display LED 62 and integrated circuit 460 is utilized to display the one's value of the decimal on display LED 60.

In order for the integrated circuits 450, 452, 458, and 460 to latch the correct BCD value into the respective integrated circuit, latch signals are provided on integrated circuits 450, 452, 458, and 460. Since two complete BCD values are contained in one byte, latch signal 1028 is provided for both integrated circuits 458 and 460 which service display LED 62 and latch signal 1036 is provided for both integrated circuits 450 and 452 which service display LED 60.

In addition a blanking input is provided for each integrated circuit which selectively allows the integrated circuit to cause the respective display to appear dark whenever the blanking input is low. These inputs are utilized by the CPU 400 to flash the display whenever a warning is justified. Blanking logic signal 1030 is utilized for integrated circuits 458 and 460 and blanking logic signal 1036 is utilized for integrated circuits 450 and 452.

After the correct byte is returned from the BCD subroutine of the program 900 the CPU 400 causes the logic signal 1028 to go low for a period of 0.1 milliseconds, after which CPU 400 causes the logic signal 1028 to go high. This cycling of the logic signal 1028 causes the integrated circuits 458 and 460 to latch onto the BCD values which are present on logic signals 1040 through 1054.

In addition, LED 62 is required to flash due to the nature of the warning. Therefore a memory location is utilized to inform the CPU 400 whether or not the blanking signals 1030 and 1036 should be made high or low.

Since the processing time of the CPU 400 is so fast the CPU 400 will flash the display LED 60 or LED 62 at a frequency of 1 Hz in the following manner: subsequent to displaying of the distance to the object 14 detected to pose a threat to the vehicle 12 the CPU 400 causes the blanking logic signal 1030 to go high, causing the decoded decimal to be displayed on LED 62. Continuing, the CPU 400 sets the first bit of memory location 2001 to a one. The CPU 400 then continues to service the other rotational base 30 positions according to a positive scan cycle defined above.

After the CPU 400 has finished servicing rotational base 30 position 102 the value which is located at memory location 2001 is read. If a one is present at the first bit in memory location 2001 the CPU 400 causes blanking logic signal 1030 to go low causing display LED 62 to go dark.

A zero is then written to the first bit in memory location 2001, resetting the bit.

If the CPU 400 determines that the first bit in memory location 2001 is a zero no action is taken. After determining that a programming session has not been requested, the CPU 400 begins a negative scan cycle routine of rotational base 30 positions 100 through 84. Upon determining that an object 14 still poses a threat to the vehicle at rotational base positions 84, 86, 88, or 90 the CPU 400 displays the distance to the object 14 on LED 62 and causes blanking logic signal 1030 to go high, turning the display LED 62 back on. In addition the CPU 400 writes a one to the first bit at memory location 2001.

Continuing, the CPU 400 turns off LED 62 after servicing rotational base position 102 due to the presence of the one at the first bit in memory location 2001. This process of toggling the value of the first bit of memory location 2001 and flashing the display LED 62 continues until the object 14 which has been detected at rotational base 30 positions 84, 86, 88, or 90 no longer poses a threat. When the CPU 400 determines that no objects 14 pose a threat a value of zero will again be written to the first bit of memory location 2001.

Since the total elapsed on time for the display LED 62 is equal to the positive scan time required to service rotational base positions 84 through 102 and the total off time of the display LED 62 is equal to the negative scan time required to service rotational base positions 100 through 84 display LED 62 will flash with a frequency of 1 Hz.

When the CPU 400 determines that at least one memory location does not contain a zero and when the CPU 400 detects the use of the turn signal lever, by virtue of the lane change circuitry 498 generating a low logic signal 1010, an audible tone is emitted by beeper 454 for a period of 2 seconds.

When the operator of the vehicle 12 utilizes the turn signal, a current is introduced to relay 430 causing the mechanical contacts therein to close, producing a low logic signal 1010. When no current is introduced to relay 430 logic signal 1010 is high due to the effect of the pull up resistor 438. When current is present at relay 430 and then subsides, residual current is recycled by diode 434. When the CPU 400 determines that logic signal 1010 is low and a warning session is invoked, a timer internal to the CPU 400 is initiated to start timing. Simultaneously the output of the timer is gated to logic signal 1082. After two seconds, the timer stops timing and the logic signal 1082 goes low. In the preferred embodiment, an audible beeper 454 is utilized to warn the operator of an impending collision.

The program 900 also instructs the CPU 400 to rotate the mirror 300 to a position which is most advantageous in viewing the detected object 14 by the operator. The most advantageous position is directly related to the current position of the mirror 300 and the position of the rotational base 30 at which the object 14 was detected. Due to the nature of the above conditions the mirror 300 may be rotated to any number of different positions.

The procedure for rotating the mirror 300 to a certain position is dependant upon the status of two memory locations, 2020 and 2012. Memory location 2020 is used to indicate the current position of the mirror 300. When memory location 2020 contains a zero the mirror 300 is assumed to be located at the operator's preferred setting. When memory location 2020 contains a one the mirror 300 is assumed to be located at a position twelve degrees counter-clockwise from the operator's preferred setting. When memory location 2020 contains a two the mirror 300 is assumed to be at a position which is twenty degrees counter-clockwise from the operator's preferred setting. Memory location 2012 is used to indicate at which rotational base 30 position the object 14 was detected. When memory location 2012 contains a one an object 14 has been detected at rotational base 30 position 84 or 86. When memory location 2012 contains a two an object 14 has been detected at rotational base 30 position 88 or 90. Case one occurs when the mirror 300 resides at the operator's preferred setting and an object 14 has been detected at rotational base 30 positions 84 or 86. Therefore memory location 2020 will contain a zero and memory location 2012 will contain a one. Upon recognizing this the program 900 will instruct the CPU 400 to rotate the mirror 300 in the following manner; logic signal 1064 will be set to a low value and logic signal 1066 will be pulsed three times. After rotation of the mirror 300, memory location 2012 is set to a one indicating that the mirror 300 now resides at a position which is twelve degrees past the operator's preferred setting. When the mirror 300 is thusly positioned, one of several circumstances can occur. During subsequent scans the object 14 may be detected to have moved to a position which is closer to the vehicle 12. This would be identified by detecting an object 14 at rotational base 30 positions 88 or 90. This situation is described as case two and would be identified by the contents of memory locations 2020 and 2012. When memory location 2020 contains a one and when memory location 2012 contains a two the program 900 instructs the CPU 400 to rotate the mirror 300 from the twelve degree position to the twenty degree position in the following manner; logic signal 1064 is set low and logic signal 1066 is pulsed twice, causing the mirror 300 to rotate eight degrees to the twenty degree position. After rotation of the mirror 300, the program 900 writes a two to memory location 2020.

When the mirror 300 is located at the twelve degree position and the object 14 is no longer detected at rotational base 30 positions 84 through 90 the mirror 300 is rotated back to the operator's preferred setting. This condition is case three and is characterized by memory location 2020 containing a one and memory location 2012 containing a zero. The mirror 300 is rotated back to the operator's preferred setting from the twelve degree position in the following manner; logic signal 1064 is set high and logic signal 1066 is pulsed three times.

After the mirror 300 is rotated back to the operator's preferred setting, a zero is written into memory location 2020.

When the mirror 300 resides at the twenty degree position, subsequent scans may detect the object 14 at rotational base 30 positions 84 or 86. This condition is characterized as case four and identified by memory location 2020 containing a two and memory location 2012 containing a one. In this case the mirror 300 is rotated back to the twelve degree position from the twenty degree position in the following manner; logic signal 1064 is set high and logic signal 1066 is pulsed twice. After the mirror 300 is rotated back to the twelve degree position, a one is written into memory location 2020.

Continuing, when the mirror 300 is positioned at the twenty degree position and the object 14 is no longer detected at positions 84 through 90 the mirror 300 is rotated back to the operator's preferred position and is identified when memory location 2020 contains a two and memory location 2012 contains a zero. This is referred to as case five. The mirror 300 is rotated back to the operator's preferred setting in the following manner;; logic signal 1064 is set high and logic signal 1066 is pulsed five times. After the mirror 300 is rotated back to the operator's preferred setting a zero is written into memory location 2020.

The final case is identified as case six and occurs when the mirror 300 resides at the operator's preferred setting and an object 14 is detected at rotational base 30 position 88 or 90. At this time memory location 2020 contains a zero and memory location 2012 contains a two. The mirror 300 is then rotated to the twenty degree position in the following manner; logic signal 1064 is set low and logic signal 1066 is pulsed five times. After the mirror 300 is rotated to the twenty degree position a two is written into memory location 2020.

The program 900 instructs the CPU 400 to continue the positive scan by rotating the rotational base 30 counter-clockwise to position 92 from position 90 in the following manner; stepper motor 44 receives current signals 1060 and 1062 from stepper motor operator circuit 408 to cause the stepper motor 44 to rotate the rotational base 30 in a counter-clockwise direction. The stepper motor operator circuit 408 receives logic signals 1056 and 1058 from the CPU 400 which determine the direction in which to rotate the stepper motor 44 and the duration of rotation. The direction of rotation corresponds to the state of logic signal 1056. When a low logic signal 1056 is received by the stepper motor operator circuit 408, current signals 1060 and 1062 are outputted to the stepper motor 44 causing it to rotate in the counter-clockwise direction. Simultaneously, the stepper motor operator circuit 408 receives logic signal 1058. Logic signal 1058 consists of a single pulse having an amplitude of +5 VDC and an on/off duration of 1 millisecond. As the stepper motor 44 is rotated a full four degrees, the rotational base 30 angle encoder plate 52 causes the roller 54 to compress from a relaxed state.

In this respect spring 56 compresses, causing the detent mechanism switch 58 to generate a low logic signal 1020. After the CPU 400 presents the logic signal 1058 to the stepper motor operator circuit 408 the CPU 400 samples the logic signal 1020 to determine the state. If logic signal 1020 is low, the CPU 400 presents the stepper motor operator circuit 408 with logic signal 1058 as single pulse and causes the stepper motor 44 to rotate another four degrees after which logic signal 1020 is sampled again and the process is repeated until logic signal 1020 is high.

A high logic signal 1020 is indicative of the positioning of rotational base 30 at detent position 92. When the CPU 400 determines, from high logic signal 1020, that the rotational base 30 rests at position 92 a distance measurement is invoked in the following manner; the CPU 400 sends a high logic signal 1018 to the receiver transmitter unit 42 causing the unit 42 to induce an ultrasonic wave via the transducer 32. Simultaneously a timer internal to the CPU 400 begins timing. Some time later the ultrasonic wave is reflected back by an object 14 in the path of the wave. When an object 14 reflects the ultrasonic wave back to the transducer 32, which now acts as an antenna under control of the receiver transmitter unit 42, a high logic level signal 1016 is sent to the CPU 400 from the unit 42 via inverter circuits 404 and 406. Equation 1 is then utilized to calculate the distance to the object 14. The result from equation 1, X(902), is stored and another distance measurement is taken after a 0.1 second delay.

Utilizing equation 1 results in the second distance measurement X(904). Equation 4 is then utilized to calculate the relative speed of the object 14 with respect to the vehicle 12. The CPU 400 then determines if the result, RS(912) is negative or positive. If the result RS(912) is negative or equal to zero no further sampling takes place at position 92 and the rotational base 30 is then rotated to position 94. If the relative speed is positive and is greater than or equal to 7.5 feet per second (5.11 miles per hour) a warning session is invoked in the following member; if a warning session is currently invoked which utilizes LED 60 or LED 62 the current warning session invoked by detect position 92 is ignored if the relative speed RS(912) calculated at detent position 92 is between the values of 7.5 and 15.0 feet per second. If the relative speed RS(912) calculated at detent position 92 is greater than 15.0 feet per second then the currently invoked warning session is interrupted to give way to the following warning session; the second distance measurement X(904) which has been calculated for an object 14 detected at detent position 92 is processed by a subroutine which converts the binary information supplied by the byte into an eight bit byte value which represents two binary coded decimals (BCD) in a single byte. Therefore two BCD values will be represented by a single eight bit byte which is returned from the BCD conversion subroutine. The lower nibble of the byte contains the value of the decimal which holds the ones place in decimal notation. The higher nibble contains the value of the decimal which holds the tens place in decimal notation. The eight bit byte returned from the BCD subroutine is presented to the BCD to seven segment decoder/operator/latch integrated circuits 450, 452, 458, and 460 via logic signals 1040 through 1054. Logic signals 1040 through 1046 contain the lower nibble of the returned byte from the BCD subroutine and logic signals 1048 through 1054 contain the higher nibble.

The logic signals 1040 through 1046 are shared by the integrated circuits 452 and 460 and logic signals 1048 through 1054 are shared by integrated circuits 450 and 458. All four integrated circuits 450, 452, 458, and 460 convert the logic signals 1040 through 1054 into seven signals which selectively light the seven individual segments in order to correctly represent the decimal value on their corresponding decimal digit of their respective displays. Integrated circuit 450 is utilized to display the ten's value of the decimal on display LED 60 and integrated circuit 452 is utilized to display the one's value of the decimal on display LED 60. Integrated circuit 458 is utilized to display the ten's value of the decimal on display LED 62 and integrated circuit 460 is utilized to display the one's value of the decimal on display LED 60.

In order for the integrated circuits 450, 452, 458, and 460 to latch the correct BCD value into the respective integrated circuit, latch signals are provided on integrated circuits 450, 452, 458, and 460. Since two complete BCD values are contained in one byte, latch signal 1028 is provided for both integrated circuits 458 and 460 which service display LED 62 and latch signal 1036 is provided for both integrated circuits 450 and 452 which service display LED 60.

In addition a blanking input is provided for each integrated circuit which selectively allows the integrated circuit to cause the respective display to appear dark whenever the blanking input is low. These inputs will be utilized by the CPU 400 to flash the display whenever a warning is justified. Blanking logic signal 1030 is utilized for integrated circuits 458 and 460 and blanking logic signal 1038 is utilized for integrated circuits 450 and 452.

After the correct byte is returned from the BCD subroutine of the program 900 the CPU 400 causes the logic signals 1028 and 1036 to go low for a period of 0.1 millisecond after which CPU 400 causes logic signals 1028 and 1036 to go high. The cycling of logic signals 1028 and 1036 causes the integrated circuits 450, 452, 458 and 460 to latch onto the BCD values which are present on logic signals 1040 through 1054. Inasmuch LED 60 and LED 62 are required to flash due to the nature of the warning, a memory location is utilized to inform the CPU 400 whether or not blanking logic signals 1030 and 1038 should be made high or low. Since the processing time of the CPU 400 is so fast the displays LED 60 and LED 62 flash at a frequency of 1 Hz in the following manner; subsequent to displaying of the distance to the object 14 which is detected to pose a threat to the vehicle 12 the CPU 400 causes the blanking logic signals 1030 and 1038 to go high causing the currently decoded decimal to be displayed on LED 60 and LED 62.

Continuing, the CPU 400 sets the first bit of memory location 2002 to one. The CPU then continues to service the other rotational base 30 positions according to a positive scan cycle. After the CPU 400 has finished servicing rotational base 30 position 102 the CPU 400 reads the value which is located at memory location 2002. If a one is present at the first bit in memory location 2002 the CPU 400 causes blanking logic signals 1030 and 1038 to go low causing display LED 60 and LED 62 to go dark. The CPU 400 then writes a zero to the first bit in memory location 2002, resetting the bit. If the CPU 400 determines that the first bit in memory location 2002 is a zero no action is taken. After determining that a programming session has not been requested the CPU 400 begins a negative scan cycle service routine of rotational base 30 positions 100 through 84.

Upon determining that an object 14 still poses a threat to the vehicle 12 at rotational base position 92 the CPU 400 displays the distance to the object 14 on LED 60 and LED 62 and causes blanking logic signals 1030 and 1038 to go high, turning the displays LED 60 and LED 62 back on. In addition the CPU 400 again writes a one to the first bit at memory location 2002.

Continuing in the negative scan, the CPU 400 then turns off the display LED 62 after servicing the rotational base position 84 due to the presence of the one at the first bit in memory location 2002. This process of toggling the value of the first bit of memory location 2002 and of flashing LED 60 and LED 62 continues until the object 14 which has been detected at rotational base 30 position 92 no longer poses a threat. When the CPU 400 determines that no objects 14 detected at rotational base 30 position 92 pose a threat LED 60 and LED 62 resume their normal states. Since the total elapsed time for the displays being on is equal to half of the positive scan time required to service rotational base positions 84 through 102 and the total off time is equal to half of the negative scan time required to service rotational base positions 100 through 84, LED 60 and LED 62 will flash with a frequency of 0.5 Hz.

When the CPU 400 determines that a threat exists at position 92, an audible tone is emitted by beeper 454 for a period of 2 seconds. When the CPU 400 determines that a warning session is invoked, a timer internal to the CPU 400 is initiated to start timing. Simultaneously the output of the timer is gated to logic signal 1082. After a two second period the timer stops timing and the logic signal 1082 goes low. In the preferred embodiment, an audible beeper 454 is utilized to warn the operator of an impending collision. After the above warning is invoked or if an object 14 which has been detected at rotational base 30 position 92 has a relative velocity of less than 7.5 feet per second the CPU 400 will then rotate the rotational base 30 to position 94 where the above procedure for position 92 is repeated.

Rotational base 30 positions 94, 96, and 98 are serviced exactly as position 92. Each rotational base 30 position calculates two distance measurements X(902) and X(904) for the detected object 14. From these measurements the relative speed RS(912) is calculated and tested to determine if it is less than or equal to zero. If the relative speed RS(912) is less than or equal to zero no further testing is done at that particular position and the rotational base 30 is rotated to the next adjacent position. If the relative speed RS(912) is positive and is between the values of 7.5 and 15 feet per second, a warning, as describes for position 92, may be invoked. If the relative speed RS(912) is greater than or equal to 15 feet per second a warning is invoked regardless of whether other rotational base 30 positions have invoked a warning.

After positions 92, 94, 96, and 98 have been serviced, the CPU 400 rotates the acoustical ranging unit 16 to position 100.

With the acoustic ranging unit 16 at position 100 a distance measurement is made by the CPU 400 in the following manner; at position 100 the CPU 400 sends a high logic signal 1018 to receiver transmitter unit 42 causing the unit 42 to induce an ultrasonic wave via the transducer 32. Simultaneously a timer internal to the CPU 400 begins timing. Some time later the ultrasonic wave is reflected back by an object 14 in its path. When an object 14 reflects the ultrasonic wave back to the transducer 32, which now acts as an antenna as instructed by the receiver transmitter unit 42, a high logic level signal 1016 is sent to the CPU 400 from the unit via invertor circuits 404 and 406.

Equation 1 is utilized to calculate the distance to the object 14. The result from equation 1, X(902), is stored and another distance measurement is taken after a 0.1 second delay.

Utilizing equation 1 results in the second distance measurement X(904). The present vehicle speed S(906), as represented by the voltage signal 1078 and converted by the internal analog to digital converter, is used to process the two distance measurements X(902) and X(904) to detect if the object 14 is stationary in the following manner: if the detected object 14 is stationary then the second distance measurement X(904) would satisfy equation 2 with the modification of using a negative sign instead of a plus sign. The program 900 instructs the CPU 400 to execute equation 2 and then compares the predicted distance X(908) to the second distance measurement X(904). If the object 14 is stationary, a comparison test is performed as follows; a two second rule, which states that for a vehicle to stop safely the vehicle 12 must have at least a two second distance between the vehicle 12 and any object 14 is in front of the vehicle 12, is utilized to calculate a safe stopping distance X(920) by the following equation $$X(920) = S(906) * 2 \qquad (5)$$
where;
$X(920)$ = the predicted distance the vehicle 12 will travel within two seconds
$S(906)$ = the current vehicle 12 speed.

The calculated stopping distance X(920) is compared to the second distance measurement X(904). If the predicted distance X(920) is greater than the second distance measurement X(904), the distance to the object 14 will flash on LED 60 with a frequency of 1 Hz as previously described for the other rotational base 30 positions and an audible tone is emitted via beeper 454 for two seconds.

If the two values are not equal, then the second measured distance X(904) is tested by the program 900 to determine if this distance in less than or equal to an operator programmed distance X(918), X(919), X(922), or X(924). After the CPU 400 determines which operator programmed distance to use by the method detailed above the value of the programmed distance is compared to the value of one. If the value of the chosen operator programmed distance is equal to one then a subsequent test utilizing equation 3 is skipped and the CPU 400 continues to calculate the relative speed of the detected object 14. If the programmed distance is equal to two the rotational base 30 is rotated to position 102 and remains there until subsequent scans reveal that the programmed distance is no longer equal to two.

If a value other than one or two is utilized for the currently chosen operator programmed distance, the operator programmed distance is modified according to equation 3.

If the second distance measurement X(904) is less than or equal to the operator modified programmed distance X(990), a warning session is invoked as previously described for rotational base 30 position 84 through 90.

With the conclusion of the scan of rotational base 30 position 100 the CPU 400 rotates the rotational base 30 to position 102. With the rotational base 30 at position 102 the above procedure for position 100 is repeated. Conclusion of the scan at rotational base 30 position 102 ends the positive scan sequence at which time the CPU 400 will rotate the rotational base 30 to position 100.

This begins a negative scan sequence. The negative scan sequence occurs when the rotational base 30 positions are scanned clockwise from position 100 through position 84. After the service routine is completed at rotational base 30 position 84, a positive sequence scan is repeated. Due to the multiplicity of warnings that may be invoked at different rotational base 30 positions and due to the use of two displays for three effective scan areas, a hierarchy of warnings must be formed as follows: rotational base 30 positions 100 and 102 receive priority to use LED 60 for displaying a warning regardless of other warnings invoked except when the relative speed RS(912) calculated for an object detected at positions 92, 94, 96, or 98 is greater than or equal to 15 feet per second. When a warning is implemented at rotational base 30 position 100 or 102 the first bit in memory location 2000 is set to a one by the CPU 400 immediately flashing LED 60. Upon subsequent scans at rotational base 30 positions 92, 94, 96, and 98, and when a warning is about to be invoked the CPU 400 first determines the status of the first bit in memory location 2000. If the first bit in memory location 2000 is a one then the warning which was about to be invoked is ignored until subsequent scans determine that the first bit located in memory location 2000 is a zero or if the calculated relative speed RS(912) is less than or equal to 15 feet per second. Upon determining from subsequent scans at rotational base 30 positions 100 and 102 that the object 14 no longer poses a threat, the CPU 400 resets the first bit in memory location 2000 to zero. When rotational base 30 positions 100 and 102 does not invoke a warning and the first bit in memory location 2000 is zero, the warning priority is passed to the rotational base 30 position which first encounters an object 14 giving rise to a warning session. When rotational base 30 position 92, 94, 96, or 98 causes a warning to be invoked, the CPU 400 sets the first bit in memory location 2001 to one, indicating that a warning session is in progress.

When the object 14 that caused the warning session is no longer determined to poses a threat, the CPU 400 sets the first bit in memory location 2001 to zero thereby passing priority to rotational base 30 position 92 through 102 for initiating a warning session.

After the above routines for determining whether or not a threat exists are completed, the program 900 instructs the CPU 400 to determine whether or not a request is made by the operator of the vehicle 12 to invoke a programming session. With completion of the scanning of switches 420 and 490 to determine which set of operator programmed distances to utilizes while in the area scanning phase, switch 416 is polled to determine if the operator of the vehicle 12 is requesting a programming session. In addition to polling switch 416 during initialization, switch 416 is polled after position 102 has been serviced by the CPU 400.

To determine whether or not the operator has requested a programming session the CPU 400 checks the state of logic signal 1004. When switch 424 is rotated upwardly, an electrical circuit to ground is formed, creating a path for both switch 416 and switch 420 to vehicle 12 ground. When switch 424 is in the left position no electrical circuit to ground is made and activation of either switch 416 or 420 has no effect upon the operation of the CPU 400. After the operator positions the switch 424 into the up position switch 416 invokes a programming session by generating a low logic signal 1004, completing a path to vehicle 12 ground. When CPU 400 determines that logic signal 1004 is low the program 900 instructs the CPU 400 to enter into the programming subroutine. During the programming subroutine the operator of the vehicle 12 enters the distances that the CPU 400 will use when determining if a detected object 14 is within the operator programmed distances which have been extended to reflect an increase in vehicle speed. These base distances are programmed by the operator for use when the vehicle 12 is travelling at a speed of 10 miles per hour or less and is modified with increasing vehicle speed. To correctly enter the distance measurements into the correct memory locations an operating procedure for entering the operator programmed distances must be followed by the operator. The operator or operators must enter the programmed distances for the various operator/zone configurations as follows; the first distance entered is recognized by the CPU 400 for operator #1/zone #1, positions 84 through 90 and recorded into memory location 1400, followed by the second distance entered, which is recorded into memory location 1401, for operator #1/zone #2, positions 84 through 90. The third distance entered by the operator is stored into memory location 1402, allocated for operator #2/zone #1, positions 84 through 90 and the fourth distance entered is stored into memory location 1403 allocated for operator #2/zone #2, positions 84 through 90.

The above distance measurements are initiated by the CPU 400 at rotational base 30 position 84. The CPU 400 continuously emits and detects ultrasonic waves in the following manner; at position 84 the CPU 400 sends a high logic signal 1018 to the receiver transmitter unit 42 causing the receiver transmitter unit 42 to induce an ultrasonic wave via the transducer 32.

Simultaneously a timer internal to the CPU 400 begins timing. Some time later the ultrasonic wave is reflected back by an object 14 in the path of the ultrasonic wave. When an object 14 reflects the ultrasonic wave back to the transducer 32, now acting as an antenna as instructed by the receiver transmitter unit 42, a high logic level signal 1016 is sent to the CPU 400 from the unit 42. Since the receiver transmitter unit 42 includes TTL logic, inverter circuits 404 and 406 are provided to insure that logic signal 1016 has an amplitude of +5 VDC. This is necessary for recognition since the CPU 400 includes CMOS technology. Back to back cascading of the inverter circuits 404 and 406 guarantees that logic signal 1016 received at the CPU 400 is the same as that generated by the receiver transmitter unit 42.

Equation 1 is then utilized to calculate the distance to the object 14. The result from equation 1, X(902), displays on LED 62 as previously described, After the CPU 400 displays the currently measured distance a poll of the status of logic signal 1004 is begun. If logic signal 1004 is low, the currently displayed distance is entered into memory location 1400, after which the CPU 400 invokes another distance measurement and the process is repeated until the logic signal 1004 is determined to be low five times.

After the logic signal 1004 is low five times, the CPU 400 rotates the rotational base 30 to position 102 where the above process is repeated utilizing LED 60 for display. When the CPU 400 determines that the logic signal is low ten times, the CPU 400 resumes normal scanning activities starting with rotational base 30 position 84. The last distance entered at position 102 is utilized by the program 900 during a reversing scan procedure. This distance is assumed by the program to be the distance from the collision avoidance mirror to the front of the vehicle.

The physical process of entering distance by the operator is as follows; to initiate a programming session the operator of the vehicle 12 inserts a key into switch 424 and rotates it upwardly, creating a circuit to ground for switches 416 and 420. The operator then depresses switch 416 causing logic signal 1004 to go low.

Upon first recognizing low logic signal 1004 the CPU 400 enters into a programming subroutine. The operator then places an object 14 at a distance from the collision avoidance system where he would first like to be alerted. After placing the object 14 at rotational base position 84 and at the correct distance switch 416 is depressed again causing the CPU 400 to enter the distance into the memory location 1400 for operator #1/ zone #1, positions 84 through 90 at 10 miles per hour. Next the operator places an object 14 at rotational base 30 position 84 and at the distance he wishes to utilize for operator #1/zone #2, positions 84 through 90 and enters that distance by depressing switch 416 at which time the CPU 400 distance into memory location 1401. Continuing, operator #2 repeats the above procedure and the CPU 400 enters the two distances into memory locations 1402 and 1403 for zone #1 and zone #2, positions 84 through 90 respectively.

After the CPU 400 senses logic signal 1004 to be low five times rotational base 30 is moved to position 102. Operator #1 then places an object 14 at position 102 and at the distance where he would like to be first warned of the object 14 and depresses switch 416. CPU 400 enters the distance into memory location 1404. Successive distance measurements are carried out for operator #1/zone #2, and, operator #2/zone #2 and are recorded into memory locations 1405, 1406, and 1407 respectively. After all warning distances have been entered the operator will place an object 14 at the front of the vehicle and depress switch 416, causing this distance to be entered into memory location 1408. This distance is used by the program 900 to locate the front of the vehicle when operating in a reverse scan mode.

Upon determining that switch 416 has been depressed ten times the CPU 400 returns to normal operating procedure. If the CPU 400 determines that the switch 416 has not been depressed after an initialization, the CPU 400 utilizes the following default values for the different zones; Operator #1 Zone #1 84, 86, 80, 90 15 feet; 100,102-2 feet; Operator #1, Zone #2, 84, 86, 88, 90 10 feet; Operator #2, Zone #1 84, 86, 88, 90 15 feet, 100, 102-2 feet; Operator #2, Zone #2 84, 86, 88, 90 15 feet; 100,102 7 feet.

If the operator wishes to preclude any detected object 14 from being subjected to the test to determine whether or not the object's 14 distance is less than or equal to the programmed distance the operator must place an object 14 at a distance of exactly one foot from the collision avoidance system. After pressing the switch 416 the CPU 400, upon sensing the low logic signal 1004, enters the value of one foot into the appropriate memory location. During subsequent routine scans if the CPU 400 determines that a value of one foot is present at any memory location, the subsequent tests will not take place.

For rotational base 30 to be dedicated to service at either rotational base 30 position 84 or 102 the operator must enter the value of two feet when entering a programmed distance value for the respective position. Upon subsequent routine scans and when the CPU 400 has determined that the operator programmed distance is exactly two feet the CPU 400 rotates the rotational base 30 to the position where the two foot value for the operator programmed distance was first detected. After the CPU 400 records either the operator programmed distances or the default values into the appropriate memory locations, it rotates the rotational base 30 back to position 84. When the CPU 400 determines that the vehicle 12 is operating in reverse by detecting a low logic signal 1014 generated by the ignition circuitry 502 and in conjunction with a low logic signal 1012 generated by the reverse circuitry 500, the CPU 400 enters into a reverse scan mode as detailed in the following; rotational base 30 is rotated to position 84 by motor 44 as described earlier for the forward motion. The CPU 400 sends a high logic signal 1018 to the receiver transmitter unit 42 causing the unit 42 to induce an ultrasonic wave via the transducer 32. Simultaneously a timer internal to the CPU 400 begins timing. Some time later the ultrasonic wave is reflected back by an object 14 in its path. If an object 14 reflects the ultrasonic wave back to the transducer 32, which in now acting as an antenna as instructed by the receiver transmitter unit 42, a high logic level signal 1016 is sent to the CPU 400 from the unit 42. At this time the program 900 stops the timer and performs a calculation utilizing equation 1 to calculate the distance to the object 14. The first distance measurement X(902) is compared to a value of twenty feet. If the distance measurement X(902) is less than or equal to twenty feet, the CPU stores this distance measurement X(902) into memory location 1090.

Continuing, the program 900 instructs the CPU 400 to rotate the rotational base 30 to position 86 where the above detection and distance calculation is repeated. The first distance measurement X(902) for an object detected at position 86 is compared to the value of twenty feet. If the CPU 400 determines that the first distance measurement X(902) is less than or equal to twenty feet then the distance measurement X(902) will he stored at memory position 1091. This procedure continues until positions 84 through 90 have been serviced.

After position 90 has been serviced the program 900 instructs the CPU 400 to invoke a comparison routine by which the distance measurements located at memory locations 1090, 1091, 1092 and 1093 for rotational base 30 positions 80, 86, 88, and 90 respectively, are compared to each other to determine which distance which is closest to the vehicle 12.

Normally, when no object 14 has been detected at positions 84, 86, 88, or 90, the LED 62 will be blank. This is done not to distract the operator's attention toward the rear of the vehicle 12 when backing up. When the aforementioned comparison routine has determined that an object 14 poses a threat the distance to that object 14 will flash on LED 62 three times after which the LED 62 will return to its normal blank mode for backing up. In conjunction with the flashing of the distance on LED 60 an oscillating audible beep with a frequency of 20 Hz is heard for three seconds after which the beeper 454 assumes its previous condition.

After the above procedure is carried out by the CPU 400 the program 900 instructs the CPU 400 to rotate the rotational base 30 to position 100 to monitor the front end of the vehicle 12 in its progress when the vehicle 12 is proceeding in the reverse direction. A distance measurement at position 100 is made as described for rotational base 30 position 84. The distance to the object 14 detected at position 100 flashes on LED 62. In conjunction with the visual alarm an audible beep is generated. The distance to the object 14 is used to create the audible tone which oscillates with a frequency which in inversely proportional to the currently measured distance. The frequency of oscillation will be per the following; range of distance frequency 0–1 Ft. constant 1.1 FT.–1.4 Ft. 10 Hz. 1.5 Ft.–2.0 Ft. 8 Hz. 2.1 Ft.–2.4 Ft. 6 Hz. 2.5 Ft.–3.0 Ft. 4 Hz. 3.1 Ft.–3.4 Ft. 2 Hz. 3.5 Ft. or greater no alarm. If a conflict arises between warning sessions that are invoked by objects 14 which have been detected at positions 84, 86, 88, or 90, and position 100 the warning invoked for positions 84, 86, 88, 90, and 92 will give way to the warning invoked for position 100 after which the display will resume its original configuration. When the CPU 400 has determined that the vehicle 12 is parked by virtue of detecting a low logic signal 1014 via the ignition circuitry 502, as comprised of relay 442, diode 446, and resistor 448 the program 900 will then instruct the CPU 400 to monitor the area adjacent to the vehicle 12 for persons. The CPU 400, upon receiving a high logic signal 1014 from the ignition circuitry, will rotate the rotational base 30 to position 84 to monitor this area for possible car thieves. With the rotational base 30 at position 84 a distance measurement will be made by the CPU 400. The program 900 will then instruct the CPU 400 to store this first distance measurement X(902). Next another distance measurement X(904) will be taken as in the previous method after 0.1 second. The two distance measurements X(902) and X(904) are then compared to each other by the CPU 400 to determine whether or not they are equal. If they are equal two subsequent measurements are taken in the manner as described above and the process is repeated. If the two measurements X(902) and X(904) are found to be different then the difference is divide by the time period in which the measurements were taken which is a constant with the value of 0.1 second. The resulting relative speed RS(912) is then compared to the second distance measurement X(904). If the relative speed RS(912) is calculated to be 7.34 feet per second or less and the second distance measurement X(904) is 5 feet or less, a high logic signal 1080 is sent to an alarm circuit 520 of the vehicle 12, causing actuation.

FLOW CHART DESCRIPTION

The following memory location assignments are generic in nature and assigned by the individual programmer.

| | |
|---|---|
| 990 | Holds the second distance measurement X(904) for position 84. |
| 991 | Holds the predicted distance X(916) for position 84. |
| 992 | Holds the second distance measurement X(904) for position 86. |
| 993 | Holds the predicted distance X(916) for position 86. |
| 994 | Holds the second distance measurement X(904) for position 88. |
| 995 | Used to told the predicted distance X(916) for position 88. |
| 996 | Holds the second distance measurement X(904) for position 90. |
| 997 | Holds the predicted distance X(916) for position 90. |
| 1300–09 | Hold the bit pattern generated during an initialization. The pattern is compared to a bit pattern indicative of the position of the detents located on the circumference of the encoder plate. |

1400–1409 have values therein which are defined below and are modified according to vehicle speed and used to test whether to initiate a warning. If the detected object's distance is less than the modified value, a warning is initiated.

| | |
|---|---|
| 1400 | Holds operator #1's programmed distance for zone #1; positions 84–90. |
| 1401 | Holds operator #1's programmed distance for zone #2, positions 84–90. |
| 1402 | Holds operator #2's programmed distance for zone #1, positions 84–90. |
| 1403 | Holds operator #2's programmed distance for zone #2, positions 84–90. |
| 1404 | Holds operator #1's programmed distance for zone #1, positions 100–102. |
| 1405 | Holds operator #1's programmed distance for zone #2, positions 100–102. |
| 1406 | Holds operator #2's programmed distance for zone #1, positions 100–102. |
| 1407 | Holds operator #2's programmed distance for zone #2, positions 100–102. |
| 2000 | A value of one indicates a warning session is invoked by the detection of an object at positions 100 or 102. A value of zero indicates that no warning is in progress. |
| 2001 | A value of one indicates a warning session is invoked by the detection of an object at positions 84, 86, 88, or 90. A value of zero indicates that no warning is in progress. |
| 2002 | A value of one indicates a warning session is invoked by the detection of an object at positions 92, 94, 96, or 98. A value of zero indicates that no warning is in progress. |
| 2004 | A value of one signifies that driver #1 is operating the vehicle. A value of zero signifies that driver #2 is operating the vehicle. |
| 2006 | A value of one signifies that a warning is invoked by position 102, when the vehicle is being operated in the reverse direction. If a warning is invoked at any position 84 through 90 the program determines the value of memory location 2006. If the value is equal to one then the auditory warning invoked by positions 84 through 90 is ignored. |
| 2010 | Holds the current number of pulses CCW (counter-clockwise) from the initialized mirror position for driver #1's preferred setting. |
| 2011 | Holds the current number of pulses CCW from the initialized mirror position for driver #2's preferred setting. |
| 2012 | Utilized to determine the degree of rotation needed to position the mirror so the operator may view an object when it is detected at either positions 84/86 or positions 88/90. A value of one indicates that an object is detected at position 84 or 86 and the program rotates the mirror 12 degrees CCW (for a collision avoidance mirror installed on the right side of the vehicle) from the operator's preferred setting. A value of two indicates that an object is detected at position 88 or 90 and the program rotates the mirror 20 degrees CCW from the operator's preferred setting. A value of zero indicates that no objects are detected and the mirror is not rotated. |
| 2020 | Utilized to track the current position of the mirror. A value of one indicates that the mirror resides at a position which is 12 degrees CCW of the operator's preferred setting. A value of two indicates that the mirror resides at a position 20 degrees CCW of the operator's preferred setting. A value of zero indicates that the mirror resides at |

-continued the operator's preferred setting.

Steps 1.1–1.4 are used to initialize the mirror to the most CCW position during an initialization routine invoked by a power-on or reset. A reset is only recognized after the completion of a negative scan sequence.

| | |
|---|---|
| Step 1.1 | Output a high logic signal 1064. |
| Step 1.2 | Pulse logic signal 1066 from a low logic state to a high and back to a low,. Pulse width shall be a minimum of 1 millisecond. This signal in conjunction with logic signal 1064 causes the mirror to rotate four degrees CW (clock-wise). |
| Step 1.3 | If logic signal 1022 is high go to Step 1.4. If logic signal 1022 is low go back to Step 1.2 to rotate the mirror another four degrees. |
| Step 1.4 | Set memory location 2004 to a one. Upon initialization the collision avoidance mirror is configured for driver #1. |

Steps 2.1 through 2.95 constitute the initialization of the Acoustical Ranging Unit (ARU) 32. The unit is first rotated 10 times and a sequence of bits is recorded into memory locations 1300 through 1309, the pattern is then tested against a set pattern defining of the positions of the ten detents on the encoder plate 52. When the initial test and if the comparison fails the acoustical ranging unit 32 is rotated in four degree increments generating a new bit pattern which is tested for a match.

| | |
|---|---|
| Step 2.1 | Output a low logic signal 1056. |
| Step 2.2 | Pulse signal 1058 from a low logic signal to a high and back to a low. The pulse width shall be a minimum of 1 millisecond. This logic signal in conjunction with logic signal 1056 causes the acoustical ranging unit to rotate four degrees CW. |
| Step 2.3 | Check status of input logic signal 1020. |
| Step 2.4 | If logic signal 1020 is high enter a one into the memory location as pointed to by the sum of 1300 plus the current count in counter CTRA. |
| Step 2.5 | If logic signal 1020 is low enter a zero into the memory location as pointed to by the sum of 1300 plus the current count in counter CTRA. |
| Step 2.6 | Increment counter CTRA by one. |
| Step 2.7 | Check if counter CTRA is equal to nine. If so go to Step 2.8 if not go to Step 2.2 |
| Step 2.8 | Compare the bit pattern in memory locations 1300–1309 to the pattern 111010001. |
| Step 2.9 | If a match is found go to Step 3.0. If no match is found go to Step 2.91. |
| Step 2.91 | Pulse logic signal 1058 as in Step 2.2 |
| Step 2.92 | Shift the values located in memory locations 1300–1309 to adjacent lower memory locations (i.e the value located in memory location 1301 goes to 1300, the value located in memory location 1302 goes to 1301 etc.). |
| Step 2.93 | Check the input logic signal 1020. If logic signal 1020 is high go to Step 2.94, If is low go to Step 2.95. |
| Step 2.94 | Enter a one into memory location 1309. |
| Step 2.95 | Enter a zero into memory location 1309. |
| Step 2.96 | If rotational base 30 is at position 86 the program returns rotational base 30 to position 84 and logic signal 1056 is set low. |
| Step 2.97 | Logic signal 1058 will be pulsed one time to rotate the rotational base 30 four degrees. |
| Step 3.0 | Enter a one into memory location 5000 in preparation for a positive scan sequence. |
| Step 3.1 | Set counters CTRA, CTRB, CTRC, CTRD, CTRM, and CTRN to zero to prepare for a positive scan sequence. |
| Step 4.0 | If input logic signal 1006 is low the program calls the subroutine which allows the operator to enter his preferred distances. This Step is only executed during an initialization sequence allowing the operator to choose desired distances; otherwise the default distance is used. The input logic signal 1006 is polled during the regular scan cycle. |
| Step 4.2 | If input logic signal 1020 is low go to the subroutine. If input logic signal 1020 is high enter default values for the warning distances. |
| Step 5.1 | Enter the value of 15 (15 ft.) into memory locations 1400, 1402, 1403. |
| Step 5.2 | Enter the value of 10 (10 ft.) into memory location 1401. |
| Step 5.3 | Enter the value of 5 (5 ft.) into memory locations 1404, 1405, and 1406. |
| Step 5.4 | Enter the value of 7 (7 ft.) into memory location 1407. |
| Step 5.5 | During an initialization the program will set memory location 2004 to a one. |
| Step 6.0 | If input logic signal 1022 is low go to Step 1.1. If input logic signal 1022 is high check input logic signal 1006. |
| Step 6.1 | If input logic signal 1006 is low go to the subroutine. If input logic signal 1006 is high check input logic signal 1012. |
| Step 6.2 | If input logic signal 1012 is low invoke subroutine which monitors the vehicle's proximity to other objects. If input signal 1012 is high check signal 1076. |

Steps 7.0–7.44 determine if the seat lever is moved. If the seat lever is moved (by virtue of a low logic signal 1076) the collision avoidance mirror automatically adjust the mirror to the other operator's preferred position. During initialization the program automatically configures the program for operator #1 by setting memory location 2004 to a one. Therefore each subsequent operation of the seat lever causes the program to toggle between each operator's settings and adjusts the mirror accordingly.

| | |
|---|---|
| Step 7.0 | Determine if operator #1 or #2 is operating the vehicle by determining the status of memory location 2004. If memory location 2004 is one adjust mirror for operator #2 since the mirror is previously set for operator #1 and go to Step 7.1. If memory location 2004 is zero then adjust mirror for operator #1 and go to Step 7.11. |
| Step 7.1 | Find the difference in number of counts between operator #2's preferred setting and operator #1's and go to Step 7.2. |
| Step 7.11 | Find the difference in number of counts between operator #1's preferred setting and operator #2's and go to Step 7.21. |
| Step 7.2 | A negative result is an indication that operator #1's preferred setting is located farther CCW from the mirror initialization point than operator #2's and the mirror is rotated CW to operator #2's preferred position. A positive result is an indication that operator #2's preferred setting is located farther CCW from the mirror initialization point then operator #1's and the mirror is rotated CCW to operator #2's preferred position. |
| Step 7.21 | A negative result is an indication that operator #2's preferred setting is located farther CCW from the mirror initialization point than operator #1's and the mirror is |

| | |
|---|---|
| | rotated CW to operator #1's preferred position. A positive result is an indication that operator #1's preferred setting is located farther CCW from the mirror initialization point than operator #2's and the mirror is rotated CCW to operator #1's preferred position. |
| Step 7.31 | Set output signal 1064 to a high logic level. |
| Step 7.32 | Move the mirror CCW and set output signal 1064 to a low logic level. |
| Step 7.33 | Pulse output logic signal 1066 X number of times where X is equal to the absolute difference of the subtraction in Step 7.1. |
| Step 7.34 | Set memory location 2004 to zero indicating operator #2 is present. |
| Step 7.41 | Move the mirror CW by setting output signal 1064 to a high logic level. |
| Step 7.42 | Move the mirror CCW and set output signal 1064 to a low logic level. |
| Step 7.43 | Pulse output logic signal 1064 X number of times where X is equal to the absolute difference of the subtraction in Step 7.11. |
| Step 7.44 | Set memory location 2004 to one indicating that operator #1 is present. |
| Step 8.0 | If input signal logic 1014 is low the vehicle is operating in the forward direction. If logic signal 1014 is high the vehicle is parked and program control returns to the monitor subroutine. |
| Step 8.1 | Determine if the mirror is at the initialized position via input logic signal 1022. If input logic signal 1022 is high the mirror is at the initialized position and program control continues at Step 1.1 where the right mirror position switch is polled since the mirror can only be rotated to a CCW position, if input logic signal 1022 is low both left and right mirror positioning switches are polled. |

Steps 9.0–9.21 In the course of normal driving the operators may adjust the mirror according to their preference. The following Steps service this request. Mirror positioning switch 518 is first polled for low logic levels at which time the appropriate "counts" are loaded into a counter to "track" the mirror to the new position. The "counts" represent the number of pulses of logic signal 1066 required to rotate the mirror from the initialized position to the operator's preferred setting.

| | |
|---|---|
| Step 9.0 | If memory location 2004 is equal to one then the count for operator #1 is loaded into counter CTRF to record the number of counts past the initialization point the mirror now resides. If memory location 2004 is equal to zero then the counts for operator #2 are loaded. |
| Step 9.11 | Load the count which represents operator #2's preferred mirror setting, stored at memory location 2011, into counter CTRF. |
| Step 9.12 | Rotate the mirror CW by setting output signal 1064 high. |
| Step 9.13 | Pulse output signal 1006 once to rotate the mirror four degrees. |
| Step 9.14 | Since the mirror is rotated four degrees CW toward the initialized position the previous count is decremented by one. |
| Step 9.15 | Store the new count into memory location 2011. |
| Step 9.16 | Load the count which represents operator #1's preferred mirror, stored at memory location 2010, into counter CTRF. |
| Step 9.17 | Rotate the mirror CW by setting output signal 1064 high. |
| Step 9.18 | Pulse output signal 1006 once to rotate the mirror four degrees. |
| Step 9.19 | Since the mirror is rotated four degrees CW toward the initialized position the previous count is decremented by one. |
| Step 9.20 | Store the new count into memory location 2010. |
| Step 9.21 | Memory location 2020 is used to keep status on the current position of the mirror. When the mirror is located at the driver's preferred memory location 2020 is set to zero. |

Steps 10.0–10.2 If during Step 8.1 it is determined that the mirror resides at the initialized position either memory location which holds the counts for mirror positioning for operator #1 or #2, is zeroed out.

| | |
|---|---|
| Step 10.0 | Since either operator may position the mirror to the initialized position, via Steps 9.0 through 9.2, a determination is needed to zero the correct memory location. If memory location 2004 is equal to zero go to Step 10.1 If memory location 2004 is equal to one then go to step 10.2. |
| Step 10.1 | Zero out memory location 2011. |
| Step 10.2 | Zero out memory location 2010. |

Steps 11.0–11.3 service the request by either operator to rotate the mirror CCW.

| | |
|---|---|
| Step 11.0 | This Step determines if a request is made operation to move the mirror counter CCW. If input logic signal 1074 is low a request exists If input logic signal 1074 is high the program continues loading warning distances (Steps 12.0 through 12.2). |
| Step 11.1 | If memory location 2004 is equal to one the count for operator #1 is loaded into counter CTRF to record the number of counts past the initialization point for the mirror. If memory location 2004 is equal to zero then the count for operator #2 is loaded. |
| Step 11.21 | This Step loads the count representing operator #2's preferred mirror setting, stored at memory location 2011, into counter CTRF. |
| Step 11.22 | Rotate the mirror CCW by setting output signal 1064 low. |
| Step 11.23 | Pulse output signal 1006 once to rotate the mirror four degrees. |
| Step 11.24 | Since the mirror is rotated four degrees CCW away from the initialized position the previous count is incremented by one. |
| Step 11.25 | Store the new count into memory location 2011. |
| Step 11.26 | This Step loads the count which represents operator #1's preferred mirror setting, stored at memory location 2010 into counter CTRF. |
| Step 11.27 | Rotate the mirror CCW by setting output signal 1064 low. |
| Step 11.28 | Pulse output signal 1006 once to rotate the mirror four degrees. |
| Step 11.29 | Since the mirror is rotated four degrees CCW away from the initialized position the previous count is incremented by one. |
| Step 11.30 | Store the new count into memory location 2011. |
| Step 11.31 | Memory location 2020 is used to keep status on the current position of the mirror. When the mirror is located at the driver's preferred setting memory location 2020 is zero. |

Steps 12.0–12.2 decode the configuration of memory location 2004 and of switch 420 to determine which set warning distances to use during subsequent tests.

| Step | Description |
|---|---|
| Step 12.0 | If memory location 2004 is equal to one then operator #1 is present. If memory location 2004 is equal to zero then operator #2 is present. |
| Step 12.11 | If memory location 2004 is equal to one then determination of which warning distances to use is made by polling switch 420. If logic signal 1006 is low then the warning distances to be utilized are for operator #1 zone #2. If logic signal 1006 is high then the warning distances to be utilized are for operator #1 zone #1. |
| Step 12.12 | Load the operator #1 programmed distance for zone #1, positions 84 through 86. |
| Step 12.13 | Load the operator #1 programmed distance for zone #1, positions 100 and 102. |
| Step 12.14 | Load the operator #1 programmed distance for zone #2, positions 84 through 86. |
| Step 12.15 | Load the operator #1 programmed distance for zone #2, positions 100 and 102. |
| Step 12.16 | If memory location 2004 is equal to zero then used to predict a distance at which the detected object will be located within three seconds. The second distance is again tested to see if it is less than this predicted distance. In any case where the test is true a warning session is invoked. |

Steps 13.1–13.9 comprise the scan sequence for measuring distances to objects. After the initialization period the ARU resides at position 84 where the first distance measurement is taken. The positive scan sequence constitutes the procedure required for takes distance measurements and invokes warning sessions when the ARU cycles through positions 84 through 102. A negative scan sequence services positions 100 through 84. Distance measurements are first taken at positions 84 through 90. Two distance measurements are taken 0.1 seconds apart at each position and the values are tested to see if the detected object is stationary. If so the ARU is cycled to the next position. If not the second distance measurement is tested to see if it is less than an operator programmed distance which is modified to reflect the current vehicle speed. If the second distance is outside of the warning distance the detected object's speed relative to the vehicle is calculated. The relative speed is then used to predict a distance at which the detected object will be located within three seconds. The second distance is again tested to see if it is less than this predicted distance. In any case where the test is true a warning session is invoked.

| Step | Description |
|---|---|
| Step 13.10 | Set the output signal 1018 to a high logic level to instruct the receiver transmitter board to initiate an ultrasonic wave. |
| Step 13.11 | Repeat polling of logic signal 1016 takes place to determine when the receiver transmitter board detected a reflected echo. |
| Step 13.12 | When signal 1016 becomes high the timer stops. |
| Step 13.13 | When timing stops logic signal 1018 is brought low resetting the receiver transmitter board to prepare for another distance measurement. |
| Step 13.14 | The actual distance to the object is calculated utilizing equation 1. |
| Step 13.15 | To determine if the detected object is stationary the vehicle's current speed is calculated. The voltage that is generated by the resistor network and appears as logic signal 1078 is converted to a binary representation by the eight bit on-chip analog to digital converter. A voltage of one volt represents a vehicle velocity of 0 miles per hour and a voltage of five volts represents the maximum detectable velocity of 65 miles per hour. |
| Step 13.20 | When signal 1018 is set high a timer internal to the MCU 1400 begins timing. The time accumulated by the timer is used to compute the distance to the detected object. |
| Step 13.30 | Repeat polling of logic signal 1016 to determine when receiver transmitter board detects a reflected echo. |
| Step 13.40 | When signal 1016 becomes high the timer stops. |
| Step 13.50 | When timing stops logic signal 1018 is brought low to reset the receiver transmitter board to prepare for another distance measurement. |
| Step 13.60 | The actual distance to the object is calculated utilizing equation 1. |
| Step 13.70 | To correctly calculate the detected object's relative velocity a .1 second delay is introduced between successive distance measurements. |
| Step 13.80 | Set the output signal 1018 high. A high logic level on signal 1018 causes the receiver board to initiate an ultrasonic wave. |
| Step 13.90 | When signal 1018 is set high a timer internal to the MCU 1400 begins timing. The time accumulated by the timer is used to compute the distance to the detected object. |

Step 14.0–14.9 are carried out after the ARU has gathered distance measurements from positions 84 through 90. The Steps constitute the test program for positions 84 through 90.

| Step | Description |
|---|---|
| Step 14.0 | The predicted distance of a stationary object is compared to the second distance measurement; if the distances are equal then the detected object is determined to be stationary and no further testing is done for other distance values which have been gathered at the other positions. |
| Step 14.1 | The value in the temporary buffer TEMPA is tested to determine if its value is equal to one. Since TEMPA contains the operator programmed distance for positions 84 through 90 a one directs the program to bypass the remaining tests. |
| Step 14.2 | If TEMPA does not contain a value of one the operator programmed distance is modified according to vehicle speed. |
| Step 14.3 | The modified distance is then compared to the second distance measurement to determine if this distance is less than or equal to the modified operator programmed distance. |
| Step 14.4 | If the second distance measurement in less than or equal to the modified operator programmed distance the second distance measurement is placed into a memory location whose address is pointed to by the counter CTRB with a base address of 990. For instance if CTRB contained a value of 4 the second distance measurement would be placed into memory location 994 (990 + 4). |
| Step 14.5 | If the second distance measurement is less than the modified operator programmed distance a zero is entered into the memory location as pointed to on the counter CTRB. |
| Step 14.6 | If the second distance measurement is greater than the modified operator programmed distance the relative speed between the vehicle and the detected object is calculated. |
| Step 14.7 | A negative result from the calculation of the relative speed is an indication that the object is moving away from the vehicle. The object is no longer a threat and a zero is entered into the memory location whose address is 991 plus the value of the counter CTRB. |

-continued

| | |
|---|---|
| Step 14.8 | If the relative speed is positive (the object is closing in) a predicted distance in calculated utilizing the relative speed and a time period of three seconds. Three seconds is determined to be a sufficient amount of time for the operator to perform a lane change. |
| Step 14.9 | The predicted distance is tested to determine if this predicted distance is less than the modified distance. |
| Step 14.10 | The predicted distance is entered into the memory location whose address is pointed to by a base address of 991 plus the current value of the counter CTRB. |
| Step 14.12 | If the relative speed is negative or the predicted distance is greater than the modified distance a zero is entered into memory location whose address is pointed to by the counter CTRB utilizing a base address of 991. |

Steps 15.0–15.9 Control sequencing of the ARU between a positive scan and a negative scan. Three major partitions are created in the program. The first partition services positions 84 through 90, the second partition services positions 92 through 98, and the third partition services positions 100 and 102. Since both scan sequences utilize the same programming Steps 15.0 through 15.9 track which way to rotate the ARU. A positive scan sequence is controlled by Steps 15.20 through 15.9 and a negative scan sequence is controlled by Steps 15.11 through 15.15.

| | |
|---|---|
| Step 15.0 | If TEMPA is equal to two program control for rotating the ARU is bypassed and control resumes at Step 13.1. |
| Step 15.1 | This Step controls the direction in which the ARU rotates. A one signifies that a positive scan sequence is in progress and a zero indicates a negative scan sequence is underway. |
| Step 15.2 | When counter CTRB contains a value of six all four positions have been serviced and program control is handed off to positions 92 through 98. When a value other than six exits in counter CTRB the ARU is rotated to the next adjacent position for distance measurement and testing. |
| Step 15.3 | If counter CTRB is equal to zero the program rotates the ARU to the next adjacent position by bringing output logic signal 1056 low. |
| Step 15.4 | output signal 1058 is pulsed once to cause the ARU to rotate four degrees CCW as described at Step 2.20. |
| Step 15.5 | Input signal 1020 is polled to determine if the ARU has arrived at the adjacent position. If logic signal 1020 is high (indicative of a detent position) program control continues at Step 16.0. If logic signal 1020 is low logic signal 1058 is pulsed again to rotate the ARU another four degrees at which time signal 1020 is again polled. |
| Step 15.6 | If counter CTRB is equal to six the program rotates the ARU to the next adjacent position by bringing output logic signal 1056 low. |
| Step 15.7 | Output signal 1058 is pulsed once to cause the ARU to rotate four degrees CCW as described at Step 2.20. |
| Step 15.8 | Input signal 1020 is polled to determine if the ARU has arrived at the adjacent position. If logic signal 1020 is high (indicative of a detent position) program control continues at Step 16.0. If logic signal 1020 is low logic signal 1056 is pulsed again to rotate the ARU another four degrees at which time signal 1020 is again polled. |
| Step 15.9 | Since the ARU is rotated to an adjacent position counter CTRB is incremented twice to provide a pointer for other program Steps which involve entering data into correct memory locations (i.e. 990, 991, etc.). |
| Step 15.11 | Program control is transferred to this Step by determining the value of memory location 5000 When memory location 5000 contains a zero (indicative of a negative scan sequence) counter CTRB is checked for a zero condition which signifies the end of a negative sequence scan of positions 84 through 90. Program control is transferred to the beginning of the main program where a positive scan sequence is initiated. If counter CTRB does not contain a zero the ARU is rotated CW to the next adjacent position in the negative scan sequence. |
| Step 15.12 | The contents of memory location 2000 and 2002 are evaluated to determine if a warning session is invoked by previously scanned positions. If either memory location contains the value one, then LED 60 is turned off and a value of zero is written to the appropriate memory location and memory location 5000 is written to with a zero preparing the program for a positive scan. If either memory location contains a zero then memory location 5000 is written to with a one. |
| Step 15.13 | Turn off display LED 60 by setting output logic signal low. |
| Step 15.14 | Clear memory locations 2000 and 2002 after turning off display 60. |
| Step 15.15 | Prepare for a positive scan by setting memory location 5000 to a one. |
| Step 15.16 | Since counter CTRB is not equal to zero the negative scan is continued and the ARU is rotated in the CW direction to the next adjacent position by first setting output logic signal 1056 high. |
| Step 15.17 | The ARU is rotated four degrees CW by pulsing output logic signal 1058 as described in Step 2.2. |
| Step 15.18 | A high input logic signal 1020 indicates the ARU arriving at an adjacent position. Program control proceeds at Step 15.19; if low output logic signal 1058 is pulsed once and the process is repeated. |
| Step 15.19 | Since the ARU is relocated to an adjacent position counter CTRB is decremented. The value of counter CTRB indicates the position at which the ARU currently resides. |
| Step 15.20 | If Step 15.10 determines that the program is in a positive scan mode the counter CTRB is evaluated to determine if positions 84 through 90 have been serviced. If counter CTRB is equal to six then positions 84 through 90 have been services in the positive scan and the ARU is rotated to Step 92 to prepare for a distance measurement there. If counter CTRB is not equal to six then the ARU is rotated to the next adjacent position. |
| Step 15.30 | Since counter CTRB is equal to six (an indication that the positive scan sequence is completed at positions 84 through 90) the positive scan continues to position 92. The ARU is rotated in the CCW direction to position 92 by setting output logic signal 1056 high. |
| Step 15.40 | The ARU is rotated four degrees CCW by pulsing output logic signal 1058 as described in Step 2.2. |
| Step 15.50 | If input logic signal 1020 is high then the program control proceeds to Step 15.50. If input logic signal 1020 is low, output logic signal 1058 is pulsed once and the process is repeated. |
| Step 15.60 | Since counter CTRB is not equal to six the zero a value of zero is written to memory location 2012. |

Steps 16.0 through 16.73 constitute the warning processing done on the memory locations 84 through 90 in both the positive and negative scan sequences. The Steps check the content of the memory locations to find the location that contains the distance (either measured or predicted) which is closest to the vehicle. If all memory locations contain a zero then a zero is displayed on LED 62. The smallest value is converted to BCD by a subroutine and displayed on LED 62. Memory location 2012 is then set to the proper value to indicate (Steps 17.0–17.83) the position for the mirror to reflect the detected object. If the smallest distance value is found at memory locations 990 through 993 (positions 84 and 86) a value of one is set in memory location 2012. If the smallest distance value is found at memory locations 994 through 997 (positions 88 and 90) a value of two is written into memory location 2012. If all memory locations contain a zero a value of zero is written to memory location 2012.

| Step | |
|---|---|
| Step 16.0 | Check memory location 990 and 992 for a value of zero. If either contains a value other than zero proceed to Step 16.7. If both contain zero check memory locations 991 and 993. |
| Step 16.1 | Check memory location 991 and 993 for a value of zero. If either contains a value other than zero proceed to Step 16.6. If both contain zero check memory locations 994 and 996. |
| Step 16.2 | Check memory location 994 and 996 for a value of zero. If either contains a value other than zero proceed to Step 16.5. If both contain zero check memory locations 995 and 997. |
| Step 16.3 | Check memory location 995 and 997 for a value of zero. If either contains a value other than zero proceed to Step 16.4. If both contain zero proceed to Step 16.31. |
| Step 16.31 | If all memory locations contain a zero set memory location 2012 to a zero. |
| Step 16.32 | If all memory locations contain a zero no warning is invoked and memory location 2001 is set to zero. |
| Step 16.33 | The distance value found to be the smallest is contained in temporary memory location TEMPD. Convert this value to a BCD value via the sub-routine. |
| Step 16.34 | Output logic signal 1028 is pulsed as described in Step 2.2 causing the BCD to seven segment decoder latch to receive the BCD value present on the output logic signals. |
| Step 16.35 | Set output logic signal 1030 high to cause LED 62 to display the value of the BCD. |
| Step 16.40 | If either memory location 995 or 997 contains the smallest value a comparison between them is carried out to determine which contains the smallest distance value. |
| Step 16.41 | Store the value found at memory location 995 in temporary memory location TEMPD for conversion. |
| Step 16.42 | Store the value found at memory location 997 in temporary memory location TEMPD for conversion. |
| Step 16.43 | Since the object is detected at either position 88 or 90 set memory location 2012 to a value of two. |
| Step 16.50 | If either memory location 994 or 996 contains the smallest value a comparison between them is carried out to determine which contains the smallest distance value. |
| Step 16.51 | Store the value found at memory location 994 in temporary memory location TEMPD for conversion. |
| Step 16.52 | Store the value found at memory location 996 in temporary memory location TEMPD for conversion. |
| Step 16.60 | If either memory location 991 or 993 contains the smallest value a comparison between them is carried out to determine which contains the smallest distance value. |
| Step 16.61 | Store the value found at memory location 991 in temporary memory location TEMPD for conversion. |
| Step 16.62 | Store the value found at memory location 993 in temporary memory location TEMPD for conversion. |
| Step 16.70 | If either memory location 990 or 992 contains the smallest value a comparison between the two memory locations is carried out to determine which memory location contains the smallest distance value. |
| Step 16.71 | Store the value found at memory location 990 in temporary memory location TEMPD for conversion. |
| Step 16.72 | Store the value found at memory location 992 in temporary memory location TEMPD for conversion. |
| Step 16.73 | If the object is detected at position 84 or 86 set memory location 2012 to one. |
| Step 16.74 | If the object is detected at positions 84 through 90 memory location 2001 is set to one. |
| Step 16.75 | If no object is detected at positions 84 through 90, memory location TEMPD is set to zero for display on LED 62. |

Steps 17.0 through 17.83 position the mirror based on where the object is detected. If the object is detected at positions 84 or 90 the mirror is rotated 12 degrees CCW past the operator's preferred setting. If the object is detected at positions 88 or 90 then a greater rotation (20 degrees) takes place to allow the operator a view of the detected object. The following cases are acted upon (O.P.=operator's preferred position, 12=mirror is rotated 12 degrees CCW from the operator's preferred position, 20=mirror is rotated 20 degrees CCW from the operator's preferred position);

| Object is at | Mirror is at | Mirror moved to |
|---|---|---|
| not or no longer detected | O.P. | not moved |
| not or no longer detected | 12 | O.P. |
| not or no longer detected | 20 | O.P. |
| position 84 or 86 | O. P. | 12 |
| position 84 or 86 | 12 | not moved |
| position 84 or 86 | 20 | 12 |
| position 88 or 90 | O.P. | 20 |
| position 88 or 90 | 20 | not moved |
| position 88 or 90 | 12 | 20 |

| Step | |
|---|---|
| Step 17.0 | Check the current position of the mirror by evaluating the status of memory location 2020. If memory location 2020 is equal to zero the mirror resides at the operator's preferred setting. If memory location 2020 contains a one the mirror resides 12 degrees past the operator's preferred setting. If memory location 2020 contains a two the mirror resides 20 degrees past the operator's preferred setting. |
| Step 17.1 | Check if an object is detected at positions 84 through 90 by determining the value of memory location 2012. If memory location 2012 is equal to one the mirror is positioned 12 degrees past the operator's preferred setting. |
| Step 17.11 | Output a low logic signal 1064. |
| Step 17.12 | Pulse logic signal 1066 three times from a low to a high and then back to a low logic state. Pulse width shall be a minimum of 1 millisecond. This signal in conjunction with logic signal 1064 causes the mirror to rotate twelve degrees CCW. |
| Step 17.13 | Since the mirror is now located 12 degrees |

-continued

| | |
|---|---|
| | past the operator's preferred setting a one is written to memory location 2020. |
| Step 17.2 | Check if an object is detected at positions 84 through 90 by determining the value of memory location 2012. If memory location 2012 is equal to one the mirror is positioned 20 degrees past the operator's preferred setting. |
| Step 17.21 | Output a low logic signal 1064. |
| Step 17.22 | Pulse logic signal 1066 five times from a low to a high and then back to a low logic state. Pulse width shall be a minimum of 1 millisecond. This signal in conjunction with logic signal 1064 causes the mirror to rotate twenty degrees CCW. |
| Step 17.23 | Since the mirror is now located 20 degrees past the operator's preferred setting memory location 2020 is written to with a two. |
| Step 17.3 | Check the current position of the mirror by evaluating the status of memory location 2020. If memory location 2020 contains a one then the mirror resides 12 degrees past the operator's preferred setting. |
| Step 17.4 | Check if an object does not exist at positions 84 through 90. If no objects exist then rotate the mirror back to the operator's preferred setting. |
| Step 17.41 | Output a high logic signal 1064. |
| Step 17.42 | Pulse logic signal 1066 three times from a low to a high and then back to a low logic state. Pulse width shall be a minimum of 1 millisecond. This signal in conjunction with logic signal 1064 causes the mirror to rotate twelve degrees CW back to the operator's preferred setting. |
| Step 17.43 | Since the mirror is now located at the operator's preferred setting memory location 2020 is written to with a zero. |
| Step 17.5 | Check if an object does not exist at positions 88 through 92. If an object exists rotate the mirror eight more degrees from the twelve degree position for a total of twenty degrees past the operator's preferred position. |
| Step 17.51 | Output a low logic signal 1064. |
| Step 17.52 | Pulse logic signal 1066 twice from a low to a high and then back to a low logic state. Pulse width shall be a minimum of 1 millisecond. This signal in conjunction with logic signal 1064 causes the mirror to rotate eight degrees CCW. |
| Step 17.53 | Since the mirror is now located 20 degrees past the operator's preferred setting memory location 2020 is written to with a two. |
| Step 17.6 | Check the current position of the mirror by evaluating the status of memory location 2020. If memory location 2020 contains a two the mirror resides 20 degrees past the operator's preferred setting. |
| Step 17.7 | Check if an object does not exist at positions 84 through 90. If no objects exist then rotate the mirror back to the operator's preferred setting. |
| Step 17.71 | Output a high logic signal 1064. |
| Step 17.72 | Pulse logic signal 1066 five times from a low to a high and then back to a low logic state. Pulse width shall be a minimum of 1 millisecond. This signal in conjunction with logic signal 1064 causes the mirror to rotate twenty degrees CW. |
| Step 17.73 | Since the mirror is now located at the operator's preferred setting memory location 2020 is written to with a zero. |
| Step 17.8 | Check if an object is detected at positions 84 through 90 by determining the value of memory location 2012. If memory location 2012 is equal to one then the mirror is positioned 12 degrees past the operator's preferred setting. |
| Step 17.81 | Output a high logic signal 1064. |
| Step 17.82 | Pulse logic signal 1066 twice from a low to a high and then back to a low logic state. Pulse width shall be a minimum of 1 millisecond. This signal in conjunction with logic signal 1064 causes the mirror to rotate eight degrees CW. |
| Step 17.83 | Since the mirror is now located 12 degrees past the operator's preferred setting a one is written to memory location 2020. |
| Step 17.84 | If an object is detected at positions 84 through 90 check if logic signal 1010 is low. |
| Step 17.85 | If input logic signal 1010 is low sound beeper 454 for three seconds. |
| Step 17.86 | Set output logic signal 1080 high for three seconds. |
| Steps 18.1 through 18.34 service positions 92 through 98. | |
| Step 18.10 | Set the output signal 1018 high to instruct the receiver transmitter board to initiate an ultrasonic wave. |
| Step 18.11 | When signal 1018 is set high a timer internal to the MCU 1400 begins timing. The time accumulated by the timer is used to compute the distance to the detected object. |
| Step 18.12 | Logic signal 1016 is repeatedly polled to determine when the receiver transmitter board has detected a reflected echo. |
| Step 18.13 | When signal 1016 becomes high the timer stops. |
| Step 18.14 | When timing stops logic signal 1018 is reset to a low level to "reset" the receiver transmitter board to prepare for another distance measurement. |
| Step 18.15 | The actual distance to the object is calculated utilizing equation 1. |
| Step 18.16 | To correctly calculate the detected object's relative velocity a .1 second delay is introduced between successive distance measurements. |
| Step 18.17 | Set the output signal 1018 high to instruct the receiver transmitter board to initiate an ultrasonic wave. |
| Step 18.18 | When signal 1018 is set high a timer internal to the CPU 400 begins timing. The time accumulated by the timer is used to compute the distance to the detected object. |
| Step 18.19 | Logic signal 1016 is repeatedly polled to determine when the receiver transmitter board has detected a reflected echo. |
| Step 18.20 | When signal 1016 becomes high the timer stops. |
| Step 18.21 | The actual distance to the object is calculated utilizing equation 1. |
| Step 18.22 | The relative speed of the object is calculated utilizing equation 4. |
| Step 18.23 | The relative speed is tested to determine if the detected object is moving away from the vehicle. A negative relative velocity indicates that the second distance measurement is greater than the first. If the object is determined to be moving away from the vehicle no warning is invoked. |
| Step 18.24 | If the object is determined to be closing in on the vehicle the relative speed is tested to see if the object has sufficient speed to cause a warning session to be invoked. If the object's relative speed is greater than or equal to 7.5 feet per second a warning is invoked. |
| Step 18.25 | If the relative speed is greater than or equal to 7.5 feet per second and if a warning session was not invoked by positions 84 through 90 (determined by the status of memory location 2000) then a warning session is invoked. |
| Step 18.26 | If the relative speed is greater than or equal to 7.5 feet per second and if a warning session was not invoked by positions 100 or 102 (determined by the status of memory location 2001) then a warning session is invoked. |
| Step 18.27 | If positions 84 through 90 or 100 and 102 cause a warning to be invoked the relative speed is then tested to determine if the relative speed is greater than or equal to 15 |

|  |  |
|---|---|
| Step 18.28 | feet per second. If the relative speed is determined to be greater than or equal to 15 feet per second the warnings which were invoked at the aforementioned positions are overridden. |
| Step 18.28 | Convert the value of X(904) to a BCD value via the sub-routine. |
| Step 18.29 | Output logic signal 1028 is pulsed as described in Step 2.2 causing the BCD to seven segment decoder latch to receive the BCD value present on the output logic signals. |
| Step 18.30 | Output logic signal 1038 is pulsed as described in Step 2.2 causing the BCD to seven segment decoder latch to receive the BCD value present on the output logic signals. |
| Step 18.31 | Set output logic signal 1030 high to cause LED 62 to display the value of the BCD. |
| Step 18.32 | Set output logic signal 1036 high to cause LED 60 to display the value of the BCD. |
| Step 18.33 | Since a warning session was invoked at positions 92 through 98 memory location 2002 is set to a one. |
| Step 18.34 | The beeper is sounded for a two second duration. |

Steps 19.1 through 19.23 determine which way the ARU is rotated to continue the correct scanning sequence (either positive or negative).

|  |  |
|---|---|
| Step 19.1 | This Step controls the direction in which the ARU is rotated. A one signifies a positive scan sequence and a zero indicates a negative scan sequence. |
| Step 19.11 | When counter CTRC contains a value of six all four positions have been serviced and program control is handed off to positions 100 and 102. When a value other than six is contained in counter CTRC the ARU is rotated to the next adjacent position for distance measurement and testing. |
| Step 19.12 | If counter CTRC is equal to six the program rotates the ARU to the next adjacent position by bringing output logic signal 1056 to a low level. |
| Step 19.13 | Output signal 1058 is pulsed once to cause the ARU to rotate four degrees CCW. |
| Step 19.14 | Input signal 1020 is polled to determine if the ARU has arrived at the adjacent position. If logic signal 1020 is high (indicative of a detent position) program control continues at Step 19.15. If logic signal 1020 is low, logic signal 1058 is pulsed again to rotate the ARU another four degrees at which time signal 1020 is again polled. |
| Step 19.15 | Since the ARU is rotated to adjacent position counter CTRC is incremented twice. |
| Step 19.16 | If counter CTRC is equal to six the program rotates the ARU to the next adjacent position by bringing output logic signal 1056 to a low level. |
| Step 19.17 | Output signal 1058 is pulsed once to cause the ARU to rotate four degrees CCW. |
| Step 19.18 | If input logic signal 1020 is high initiate an ultrasonic wave. If low pulse output logic signal 1056 again. |
| Step 19.19 | Since counter CTRC is not equal to zero a continuation of the negative scan is needed and the ARU is rotated in the CW direction to the next adjacent position by setting output logic signal 1056 high. |
| Step 19.20 | The ARU is rotated four degrees CW by pulsing output logic signal 1058 as described in Step 2.2. |
| Step 19.21 | A high input logic signal 1020 is indicative of the ARU arriving at an adjacent position by virtue of the detent and the program control proceeds at Step 19.22. If input logic signal is low then output logic signal 1058 is pulsed once and the process is repeated. |
| Step 19.22 | Since the ARU is relocated to an adjacent position counter CTRC is decremented. The value of counter CTRC indicates the position at which the ARU currently resides. |
| Step 19.23 | Since counter CTRC is equal to zero the negative scan is continued and the ARU is rotated CW to the next adjacent position by setting output logic signal 1056 high. |
| Step 19.24 | The ARU is rotated four degrees CW by pulsing output logic signal 1059 as described in Step 2.2. |
| Step 19.25 | A high input logic signal 1020 indicates the ARU arriving at an adjacent position by virtue of the detent and program control proceeds to Step 19.22. If input logic signal is low then output logic signal 1059 is pulsed once and the process is repeated. |

Steps 20.1 through 20.34 are utilized to service positions 100 and 102.

|  |  |
|---|---|
| Step 20.10 | Set output signal 1018 high to instruct the receiver transmitter board to initiate an ultrasonic wave. |
| Step 20.11 | When signal 1018 becomes high a timer internal to the MCU 1400 begins timing. The time accumulated by the timer is used to compute the distance to the detected object. |
| Step 20.12 | Logic signal 1016 is repeatedly polled to determine when the receiver transmitter board has detected a reflected echo. |
| Step 20.13 | When signal 1016 becomes high the timer stops. |
| Step 20.14 | When timing stops logic signal 1018 is brought low to "reset" the receiver transmitter board to prepare for another distance measurement. |
| Step 20.15 | The actual distance to the object is calculated utilizing equation 1. |
| Step 20.16 | To correctly calculate the detected object's relative velocity a .1 second delay is introduced between successive distance measurements. |
| Step 20.17 | Set the output signal 1018 high to instruct the receiver transmitter board to initiate an ultrasonic wave. |
| Step 20.18 | When signal 1018 becomes high a timer internal to the MCU 1400 begins timing. The time accumulated by the timer is used to compute the distance to the detected object. |
| Step 20.19 | Logic signal 1016 is repeatedly polled to determine when the receiver transmitter board has detected a reflected echo. |
| Step 20.20 | When the signal 1016 becomes high timing stops. |
| Step 20.21 | When timing stops logic signal 1018 is brought low to "reset" the receiver transmitter board to prepare for another distance measurement. |
| Step 20.22 | The actual distance to the object is calculated utilizing equation 1. |
| Step 20.23 | To determine if the detected object is stationary the vehicle's current speed is calculated. The voltage that is generated by the resistor network and that appears at logic signal 1078 is converted to a binary representation by the eight bit on-chip analog to digital converter. A voltage of 1 volt represents a vehicle velocity of 0 miles per hour and a voltage of 5 volts represents the maximum detectable velocity of 65 miles per hour. |
| Step 20.24 | The calculation is carried out to compare this value to the second distance measurement of the detected object. |
| Step 20.25 | The predicted distance of a stationary object is compared to the second distance |

| | |
|---|---|
| Step 20.26 | measurement. If the distances are equal then the detected object is determined to be stationary and no further testing is done for the other distance values which have been gathered at the other positions.<br>If the detected object is determined to be stationary a safe stopping distance is calculated via equation 5. The distance is calculated utilizing the current vehicle speed and a time of two seconds. |
| Step 20.27 | The predicted distance calculated in Step 20.26 is compared against the second distance measurement. If the predicted distance is greater than or equal to the second distance measurement a warning is invoked. If the second distance measurement is greater than the predicted distance the second distance measurement is then be tested to see if it is less than an operator programmed distance. |
| Step 20.28 | Since a warning is invoked memory location 2000 is set to a one. |
| Step 20.29 | If the detected object is determined to be stationary or if its distance is greater then the predicted safe stopping distance the temporary storage memory location TEMPB, where the operator programmed distance is stored, it is tested to determine if the value is a one. If the value located in TEMPB is a one the second distance measurement is not be tested with respect to the operator programmed distance. |
| Step 20.30 | The operator programmed distance is modified utilizing equation 3. |
| Step 20.31 | If the second distance measurement is less than the modified operator programmed distance a warning is initiated. |
| Step 20.32 | Convert the value of X(904) to a BCD value via the sub-routine. |
| Step 20.33 | Output logic signal 1038 is pulsed as described in Step 2.2 causing the BCD to seven segment decoder latch to receive the BCD value present on the output logic signals. |
| Step 20.34 | Setting output logic signal 1036 to a high logic signal causes LED 62 to display the value of the BCD. |
| Step 20.35 | If the detected object does not pose a threat to the vehicle display a zero on LED 60. |

Steps 21.1 through 21.27 control the sequencing of the ARU between a positive scan and a negative scan. Three major partitions are created in the program. The first partition services the positions 84 through 90, the second partition services positions 92 through 98, and the third partition services the positions 100 and 102. Since a positive scan sequence and a negative scan sequence utilize the same lines of programming Steps 21.1 through 21.27 provide tracking procedure to determine which way to rotate the ARU. A positive scan sequence is controlled by Steps 21.12 through 21.16 and a negative scan sequence is controlled by Steps 21.17 through 21.27.

| | |
|---|---|
| Step 21.1 | If TEMPB is equal to two program control for rotating the ARU is bypassed and control is resume at Step 20.1 where the distance measuring procedure is carried verbatim. |
| Step 21.11 | This Step controls the direction in which the ARU is rotated. A one signifies that a positive scan sequence is in progress where a zero indicates that a negative scan sequence is underway. |
| Step 21.12 | When counter CTRD contains a value of two both positions have been serviced and program control is handed off to positions 92 through 98. When a value other than six in contained in counter CTRD the ARU is rotated to the next adjacent position for distance measurement and testing. |
| Step, 21.13 | If counter CTRD is equal to two the program rotates the ARU to the next adjacent position by bringing output logic signal 1056 to a low level. |
| Step 21.14 | Output signal 1058 is pulsed one time to cause the ARU to rotate four degrees CCW. |
| Step 21.15 | Input signal 1020 is polled to determine if the ARU has arrived at the adjacent position. If logic signal 1020 is high (indicative of a detent position) program control is continue at Step 16.0. If logic signal 1020 is at a low logic signal logic signal 1058 is pulsed again to rotate the ARU another four degrees at which time signal 1020 is again polled. |
| Step 21.16 | Since the ARU has moved to the next adjacent position counter CTRD is incremented twice. |
| Step 21.17 | If counter CTRD is equal to two the program turns off display LED 62 if a warning was invoked at either positions 84 through 90 or positions 92 through 98. Memory locations 2001 and 2002 are checked to determine if the their values are equal to one. |
| Step 21.18 | Turn off display LED 62 by setting output logic signal 1030 to a low logic level. |
| Step 21.19 | Reset memory locations 2001 and 2002 by writing value of zero. |
| Step 21.20 | Prepare the program for a negative scan by setting memory location 5000 to a zero |
| Step 21.21 | To prepare for a negative scan the program rotates the ARU to the next adjacent position by bringing output logic signal 1056 to a high level. |
| Step 21.22 | Output signal 1058 is pulsed one time to cause the ARU to rotate four degrees CW. |
| Step 21.23 | Input signal 1020 is polled to determine if the ARU has arrived at the adjacent position. If logic signal 1020 is high (indicative of a detent position) program control is continue at Step 21.24. If logic signal 1020 is at a low logic signal logic signal 1058 is pulsed again to rotate the ARU another four degrees at which time signal 1020 is again polled. |
| Step 21.24 | Since the ARU has moved to the next adjacent position counter CTRD is decremented twice. |
| Step 21.25 | To prepare for a negative scan the program rotates the ARU to the next adjacent position by bringing output logic signal 1056 to a high level. |
| Step 21.26 | Output signal 1058 is pulsed one time to cause the ARU to rotate four degrees CW. |
| Step 21.27 | Input signal 1020 is polled to determine if the ARU has arrived at the adjacent position. If logic signal 1020 is high (indicative of a detent position) program control is continue at Step 21.24. If logic signal 1020 is low, logic signal 1058 is pulsed again to rotate the ARU another four degrees at which time signal 1020 is again polled. When logic signal 1020 is determined to be at a high logic level program control is resumed at Step 18.1. |

Steps 22.1 through 22.29 constitute a sub-routine in which the operator enters his or her preferred warning distances. The sub-routine is called up by the condition of switch 420 which is polled during the beginning of the service routine for positions 84 through 90. The sub-routine utilizes counter CTRG to keep track of the number of times the operator enters the data (by virtue of polling switch 416). The sub-routine constantly measures a distance to an object and displays that distance on LED 60. When logic signal 1004 is determined to be low the currently displayed distance is entered into the memory location whose address is formed by utilizing the base memory location of 1400 and then using the counter CTRG as an offset. After four distance are stored the ARU is rotated to position 102 where four more distances are recorded.

| | |
|---|---|
| Step 22.1 | Clear counter CTRG. |
| Step 22.11 | Reset the receiver transmitter board in anticipation of a distance measurement by setting logic signal 1018 to a low level. |
| Step 22.12 | To allow the receiver transmitter board to reset a delay of .1 seconds is introduced. |
| Step 22.13 | Set the output signal 1018 to a high logic level. A high logic level on signal 1019 instructs the receiver transmitter board to initiate an ultrasonic wave. |
| Step 22.14 | When signal 1018 is set to a high logic level a timer internal to the MCU 1400 begins timing. The time accumulated by the timer is used to compute the distance to the detected object. |
| Step 22.15 | Logic signal 1016 is repeatedly polled to determine when the receiver transmitter board has detected a reflected echo. |
| Step 22.16 | When signal 1016 becomes high the timer stops. |
| Step 22.17 | Calculate the distance to the object by utilizing equation 1. |
| Step 22.18 | Convert the value of X(904) to a BCD value via the sub-routine. |
| Step 22.19 | Set output logic signal 1036 to a high logic level to turn on display LED 60. |
| Step 22.20 | Output logic signal 1038 is pulsed as described in Step 2.2 causing the BCD to seven segment decoder latch to receive the BCD value present on the output logic signals. |
| Step 22.21 | Poll input logic signal 1004 to determine if the operator is requesting that the currently measured distance be entered into a memory location. |
| Step 22.22 | If input logic signal 1004 is low then enter the currently calculated distance measurement into the memory location as pointed to by the base address of 1400 with an offset whose value is contained in counter CTRB. |
| Step 22.23 | When the distance is entered into a memory location increment the counter CTRG to keep track of the number of operator entered distances for positions 84 through 90. |
| Step 22.25 | A counter CTRG value of eight indicates that the programming session is complete and program control returns to the main program. |
| Step 22.26 | Set output logic signal 1056 to a high logic level in anticipation of returning the ARU to position 84. |
| Step 22.27 | Output signal 1058 is pulsed 45 times to rotate the ARU back to position 84 as described in Step 2.2. |
| Step 22.28 | Set output logic signal 1056 to a low logic level in anticipation of returning the ARU to position 102 where the routine continues to record the operator programmed distances for positions 100 and 102. |
| Step 22.29 | Output signal 1056 is pulsed 45 times to rotate the ARU to position 102 as described in Step 2.2. |

Steps 23.0 through 23.41 consist of the monitor portion of the program. When the vehicle is parked the program returns the ARU to position 84 where an object is detected and monitored. When an object is detected having a relative speed less then or equal to 7.34 feet per second and whose distance is less than 5 feet a signal is sent to the vehicle's existing alarm. In addition the position of the ARU is monitored and the signal is also be sent when the program detects the ARU moved from position 84.

| | |
|---|---|
| Step 23.0 | A three minute delay is provided within which the operator may exit the vehicle. |
| Step 23.1 | Counter CTRL is used to keep track of where the ARU was when the monitor sub-routine was invoked for the program to correctly position the ARU at position 84. The counter CTRL is cleared. |
| Step 23.11 | If counter CTRB is zero then the ARU is already at position 84. |
| Step 23.12 | Counter CTRL is incremented as counter CTRB is decremented to determine where the ARU resides. |
| Step 23.13 | The counter CTRB is decremented to zero to determine where the ARU resides. |
| Step 23.14 | Since five pulses of output logic signal 1058 are required the value of counter CTRL is multiplied by 2.5 to arrive at the required number of pulses. |
| Step 23.15 | Set output logic signal 1056 to a high logic level in anticipation of returning the ARU to position 84. |
| Step 23.16 | Output logic signal 1058 is pulsed the number of times which is equal to the result of Step 23.14. |
| Step 23.17 | The timer used for distance calculations is cleared. |
| Step 23.18 | Set the output signal 1018 to a low logic level. A low logic level on signal 1018 resets the receiver transmitter board. |
| Step 23.19 | To allow the receiver transmitter board to reset a delay of .1 second is introduced. |
| Step 23.20 | Set the output signal 1018 to a high logic level. A high logic level on signal 1018 instructs the receiver transmitter board to initiate an ultrasonic wave. |
| Step 23.21 | When signal 1018 is set to a high logic level a timer internal to the MCU 1400 begins timing. The time accumulated by the timer is used to compute the distance to the detected object. |
| Step 23.22 | Logic signal 1016 is repeatedly polled to determine when the receiver transmitter board has detected a reflected echo. |
| Step 23.23 | When signal 1016 high the timer stops. |
| Step 23.24 | Set the output signal 1018 to a low logic level. A low logic level on signal 1018 resets the receiver transmitter board. |
| Step 23.25 | The distance to the detected object is calculated utilizing equation 1. |
| Step 23.26 | To allow the receiver transmitter board to reset a delay of .1 second is introduced. |
| Step 23.27 | The timer used for distance calculations is cleared. |
| Step 23.28 | Set the output signal 1018 to a high logic level. A high logic level on signal 1019 instructs the receiver transmitter board to initiate an ultrasonic wave. |
| Step 23.29 | When signal 1019 is set to a high logic level a timer internal to the MCU 1400 begins timing. The time accumulated by the timer is used to compute the distance to the detected object. |
| Step 23.30 | Logic signal 1016 is repeatedly polled to determine when the receiver transmitter board has detected a reflected echo. |
| Step 23.31 | When signal 1016 becomes high the timer stops. |
| Step 23.32 | Set the output signal 1018 to a low logic level. A low logic level on signal 1018 resets the receiver transmitter board. |
| Step 23.33 | The second distance measurement to the detected object is calculated via equation 1. |
| Step 23.34 | If the detected object is stationary then the second distance measurement is equal to the first. If they are not then the detected object is determined to be moving and the relative speed is calculated. |
| Step 23.35 | The relative speed of the object is calculated utilizing equation 4. |
| Step 23.36 | When the determination is made that the object does not impose threat or if a warning signal is sent the ignition circuitry is monitored to determine if the vehicle is preparing to move via a low logic signal |

-continued

| | |
|---|---|
| | 1014. If so program control returns to Step 8.0. |
| Step 23.37 | The relative speed is checked to determine if it is less than or greater than 7.34 feet per second. |
| Step 23.38 | If the relative speed is less then or equal to 7.34 feet per second and the second distance measurement is less then 5 feet an output signal is sent to the vehicle's existing alarm system. |
| Step 23.39 | If the object is less then 5 feet away and the relative speed is less then or equal to 734. feet per second the alarm signal 1060 is set a high logic level. |
| Step 23.40 | If it is determined that a previously determined warning condition existed but has now cleared up output logic signal 1080 is set to a low logic level. |
| Step 23.41 | When the ARU resides at position 84 input logic signal 1020 is at a high logic level. When the ARU is physically turned from this position input logic signal 1020 is low at which time a warning is invoked. |

Steps 24.10 through 24.68 constitutes the portion of the program which monitors the vehicle's progress as the vehicle is operating in reverse. The program first returns the ARU to position 84. Measurement distances are then taken at positions 84 through 90. If the measured distance of an object is less then 20 feet that distance measurement is placed into memory. If the distance measurement is greater than 20 feet a zero is entered into the respective memory location. The accumulated distances are then compared to each other to determine which object is closest to the vehicle. If all memory locations are equal to zero no warning is given and the display LED 62 is turned off. Also the ARU is rotated to position 102 to monitor the front of the vehicle. If at least one memory location is less then twenty feet that distance is then displayed on LED 62 and the beeper is sounded. After the warning the ARU is then rotated to position 102 where the distance of the front end to a detected object is displayed on LED 60 and the audible beeper is caused to oscillate with a frequency which is inversely proportional to the distance to the detected object. After position 102 is serviced input logic signal 1012 is polled to determine if the vehicle is still being operated in the reverse mode. If input logic signal 1012 is low then the scanning procedure for the reverse mode is repeated. If input logic signal is high then program control is returned to the main program.

| | |
|---|---|
| Step 24.1 | Counter CTRN is used to keep track of where the ARU was when the monitor sub-routine was invoked for the program to correctly position the ARU at position 84. The counter CTRN is first be cleared. Counter CTRM is used to keep track of the positions which are monitored. Counter CTRM is first be cleared. |
| Step 24.11 | If counter CTRB is zero then the ARU is already at position 84. |
| Step 24.12 | Counter CTRN is incremented as counter CTRB is decremented so as to determine where the ARU is. |
| Step 24.13 | The counter CTRB is decremented to zero so as to determine where the ARU resides. |
| Step 24.14 | Since it takes five pulses of output logic signal 1058 the value of counter CTRN is multiplied by 2.5 to arrive at the required number of pulses. |
| Step 24.15 | Bet output logic signal 1056 to a high logic level in anticipation of returning the ARU to position 84. |
| Step 24.16 | Output logic signal 1058 is pulsed the number of times which is equal to the result of Step 24.14. |
| Step 24.17 | The counter CTRM is cleared. |
| Step 24.18 | Output logic signal 1036 is set to a low logic level so as t turn off display LED 60. |
| Step 24.19 | The timer used for distance calculations is cleared. |
| Step 24.20 | Set the output signal 1018 to a low logic level. A low logic level on signal 1018 instructs the receiver transmitter board reset. |
| Step 24.21 | To allow the receiver transmitter board to reset a delay of .1 seconds is introduced. |
| Step 24.22 | Bet the output signal 1018 to a high logic level. A high logic level on signal 1018 instructs the receiver transmitter board to initiate an ultrasonic wave. |
| Step 24.23 | When signal 1018 is set to a high logic level a timer internal to the MCU 1400 begins timing. The time accumulated by the timer is used to compute the distance to the detected object. |
| Step 24.24 | Logic signal 1016 is repeatedly polled to determine when the receiver transmitter board has detected a reflected echo. |
| Step 24.25 | When signal 1016 becomes high the timer stops. |
| Step 24.26 | Set the output signal 1018 to a low logic level. A low logic level on signal 1018 instructs the receiver transmitter board reset. |
| Step 24.27 | The distance to the detected object is calculated utilizing equation 1. |
| Step 24.28 | The calculated distance to the object is tested to determine if the distance is less then or equal to twenty feet. |
| Step 24.29 | If the calculated distance is less the or equal to twenty then the calculated distance is placed into the memory location whose address is formed by the base address of 1090 plus the current value found in counter CTRM. |
| Step 24.30 | When placing the calculated distance into the correct memory location counter CTRM is incremented one time. |
| Step 24.31 | If the calculated distance is greater then twenty then a value of zero is entered into the memory location whose address is formed from the base address of 1090 plus the current value of counter CTRM. |
| Step 24.32 | The current value of counter CTRM is checked to determine if all of positions 84 through 90 have been serviced. A counter value of four indicated that all positions have been serviced. |
| Step 24.33 | If the counter value of CTRM is not equal to four then the ARU is rotated to the next adjacent position where the distance measurement routine is repeated. Therefore output logic signal 1056 is set to a low logic signal. |
| Step 24.34 | The program is next pulse output signal 1059 one time which is cause the ARU to rotate four degrees CCW as described at Step 2.2. |
| Step 24.35 | Input signal 1020 is polled to determine if the ARU has arrived at the adjacent position. If logic signal 1020 is high (indicative of a detent position) program control is continue at Step 24.19. If logic signal 1020 is at a low logic signal logic signal 1058 is pulsed again to rotate the ARU another four degrees at which time signal 1020 is again polled. |
| Step 24.36 | Memory locations 1090 through 1094 are checked to determine if any contain a zero. If all memory locations contain a zero then no warning is invoked. |
| Step 24.37 | If all memory locations contain zeros then the ARU is rotated to position 102 where the distance measurement routine is repeated. Therefore output logic signal 1056 is set to a low logic signal. |

| | -continued |
|---|---|
| Step 24.38 | The program is next pulse output signal 1058 thirty times which is cause the ARU to rotate CCW to position 102. The individual pulses is of the sane nature as with the pulse at Step 2.2. |
| Step 24.39 | The timer used for distance calculations is cleared. |
| Step 24.40 | Set the output signal 1018 to a high logic level. A high logic level on signal 1019 instructs the receiver transmitter board to initiate an ultrasonic wave. |
| Step 24.41 | When signal 1019 is set to a high logic level a timer internal to the MCU 1400 begins timing. The time accumulated by the timer is used to compute the distance to the detected object. |
| Step 24.42 | Logic signal 1016 is repeatedly polled to determine when the receiver transmitter board has detected a reflected echo. |
| Step 24.44 | Find the smallest non-zero value stored in memory locations 1090 through 1094 for display on LED 62. |
| Step 24.45 | The distance value which is found to be the smallest is converted to a BCD value via the BCD conversion sub-routine. |
| Step 24.46 | Output logic signal 1028 is pulsed with the form of the pulse as that which is described in Step 2.2 causing the BCD to seven segment decoder latch to receive the BCD value present on the output logic signals. |
| Step 24.47 | Pulsing output logic signal 1030 three times causes LED 62 to flash the distance to the object. |
| Step 24.49 | If memory location 2006 is equal to six then a warning is invoked by detection of the front of the vehicle being close to an object therefore the warning invoked by positions 84 through 90 is not be allowed use of the audible beeper. |
| Step 24.50 | If no warning was invoked by position 102 then the audible beeper is sounded for a duration of three seconds. |
| Step 24.51 | When signal 1016 becomes high the timer stops. |
| Step 24.52 | Set the output signal 1018 to a low logic level. A low logic level on signal 1018 instructs the receiver transmitter board .reset. |
| Step 24.53 | The distance to the detected object is calculated utilizing equation 1. |
| Step 24.54 | Since the distance from the front of the vehicle to the object is to be calculated the distance from the collision avoidance mirror to the front of the vehicle is subtracted to arrive at the true distance from the front of the vehicle to the object. This distance is utilized to create an audible sound which is inversely proportional to this distance. The value found in memory location 1409, which was programmed by the operator to accommodate different vehicles, is subtracted from the calculated distance X(902). |
| Step 24.55 | The result of the subtraction is converted into BCD and displayed on LED 60. |
| Step 24.56 | Output logic signal 1028 is pulsed as described in Step 2.2 causing the BCD to seven segment decoder latch to receive the BCD value present on the output logic signals. |
| Step 24.57 | Pulsing output logic signal 1030 three times causes LED 62 to flash the distance to the object. |
| Step 24.58 | The result from Step 24.54 is tested to determine at which frequency the audible beeper sounds. If the result is between the values of zero and/or equal to 1.1 feet the audible alarm is constant. |
| Step 24.59 | Output logic signal 1082 is set high. |
| Step 24.60 | The result from Step 24.54 is tested to determine at which frequency the audible beeper sounds. If the result is between the values of 1.1 and/or equal to 1.4 feet the audible alarm oscillates at 10 cycles per second. |
| Step 24.61 | Output logic signal 1082 is pulsed ten times per second as described in Step 2.2. |
| Step 24.62 | The result from Step 24.54 is tested to determine at which frequency the audible beeper sounds. If the result is between the values of 1.4 and/or equal to 2.0 feet the audible alarm oscillates at 8 cycles per second. |
| Step 24.63 | Output logic signal 1082 is pulsed eight times per second as described in Step 2.2. |
| Step 24.64 | The result from Step 24.54 is tested to determine at which frequency the audible beeper sounds. If the result is between the values of 2.0 and/or equal to 2.4 feet the audible alarm oscillates at 6 cycles per second. |
| Step 24.65 | Output logic signal 1082 is pulsed six times per second as described in Step 2.2. |
| Step 24.66 | The result from Step 24.54 is tested to determine at which frequency the audible beeper sounds. If the result is between the values of 2.4 and/or equal to 3.0 feet the audible alarm oscillates at 4 cycles per second. |
| Step 24.67 | Output logic signal 1082 is pulsed four times per second as described in Step 2.2. |
| Step 24.68 | The result from Step 24.54 is tested to determine at which frequency the audible beeper sounds. If the result is between the values of 3.0 and/or equal to 3.4 feet the audible alarm oscillates at 2 cycles per second. |
| Step 24.69 | Output logic signal 1082 is pulsed two times per second as described in Step 2.2. |
| Step 24.70 | Since a warning is invoked by position 102 memory location 2006 is set to one indicating to scanning session at positions 84 through 90 that the audible beeper is in service. |
| Step 24.71 | When all positions are serviced input logic signal 1012 is polled to determine if the vehicle is still in reverse. If input logic signal 1012 is low the reverse scanning procedure is repeated. If input logic signal is high program control is returned to Step 6.3. |
| Step 24.72 | When the input logic signal is high output logic signal 1082 is set low to turn off the audible beeper. |
| Step 24.73 | The ARU is returned to position 84 where the reverse scanning sequence is repeated and output logic signal 1056 is set high in anticipation of rotating the ARU CW. |
| Step 24.74 | Output logic signal 1058 is pulsed forty five times to return the ARU to position 84 where the reverse scanning sequence is repeated. |
| Step 24.75 | When it is determined that the vehicle is no longer in reverse memory location 2006 is set to zero. |
| Step 24.76 | When it is determined that no objects pose a danger for collision of the front end of the vehicle memory location 2006 is set to a zero. |

As described above the system 10 of the present invention has a number of advantages, some of which have been described above and others of which are inherent in the invention.

Also, modifications can be proposed to the system 10 without departing from the teachings herein. Accordingly the scope of the invention is only to be limited as necessitated by the accompanying claims.

What is claimed is:

1. A collision avoidance system for a motor vehicle, the system being mounted in place of a side mirror of the vehicle and comprising:

a rotatable mirror;

means functionally engaged to said mirror for rotating the mirror in a predetermined manner between predetermined positions;

a rotatable ultrasonic transmitting and receiving unit;

means for rotating the ultrasonic transmitting and receiving unit in a predetermined manner between predetermined positions functionally engaged to said unit;

means for producing an audible alarm;

two displays, each indicative of a particular area relative to the vehicle and;

a microprocessor functionally engaged to said mirror rotating means, unit rotating means, alarm producing means, and said displays and programmed to accept input from the transmitting and receiving unit, to process same, to cause rotation of the unit and the mirror, to cause output of processed values selectively to the displays and to cause an audible alarm when said processed values are within predefined limits.

2. The system of claim 1 wherein said mirror is supported on a rotatable shaft, the shaft having a gear engaged thereto which cooperates with a gear on a motor mounted in said housing.

3. The system of claim 2 wherein said ultrasonic transmitting and receiving unit is supported on a rotatable shaft, the shaft having a gear engaged thereto which cooperates with a gear on a motor mounted in said housing.

4. The system of claim 3 wherein each rotatable shaft has an angle encoding plate mounted thereon, the plate being semicircular and having detects placed at predetermined locations about the arcuate periphery thereof.

5. The system of claim 4 further including a spring biased detent mechanism for the mirror for the transmitting and receiving unit, each of which engages the detents in a systematic manner and includes means for sending signals to said microcomputer relative to the detent position it is engaged to at a certain point in time.

6. The system of claim 5 wherein said motors are stepper motors.

7. The system of claim 6 wherein said stepper motors are operated by said microcomputer in response to processed signals received from said angle encoder plates and said transmitting and receiving unit.

8. The system of claim 7 wherein said transmitting and receiving unit comprises an acoustical transducer and a conical wave guide which transmit an ultrasonic signal and receive a return signal when the transmitter signal is reflected by an object in its path.

9. The system of claim 8 wherein said received signal is processed by said microcomputer and then output to the appropriate display if it is within a preprogrammed range, and if not, the transducer is rotated to a next position.

10. The system of claim 9 wherein said transducer is positionable in any one of 10 predetermined positions providing a scan of an area covering 200 degrees.

11. The system of claim 10 wherein scanning takes place in a back and forth manner.

12. The system of claim 11 including means for allowing operator programming of preferred distances.

13. The system of claim 12 wherein said mirror is rotated by said microcomputer when a reflected signal is received by the transmitting and receiving unit from a blind spot of the vehicle.

14. The system of claim 13 operating under microcomputer control when the vehicle is moving forwardly.

15. The system of claim 14 operating under microcomputer control when the vehicle is moving rearwardly.

16. The system of claim 15 operating, when the vehicle is not moving, in a monitor mode under microcomputer control and being capable of actuating a vehicle anti-theft alarm when the presence of an object is determined for a predetermined period of time within a predetermined distance of the vehicle.

17. The system of claim 16 wherein one vehicle has two collision avoidance systems mounted thereon, one on a driver side of the vehicle and one on a passenger side of the vehicle.

18. The system of claim 17 scanning 360 degrees about the vehicle under microcomputer control.

19. A collision avoidance system for use on a vehicle comprising:

a housing which is mounted in a vehicle side view mirror position;

a mirror mounted on a rotatable shaft in said housing;

an acoustical ranging unit mounted on a rotatable shaft in said housing and including an acoustical transducer and a conical wave guide;

a stepper motor suitably engaged to the rotatable shaft of said acoustical ranging unit;

an angle encoder comprising a plate of semicircular configuration having detents about an arcuate periphery thereof mounted to each rotatable shaft;

a detect mechanism which rides along the periphery of each angle encoder plate and produces electrical signals relating to an exact location about the semicircle;

an alarm and at least two displays, one corresponding to a front end of the vehicle and another corresponding to the rear of the vehicle; and a microcomputer which receives signals from the transducer, indicating an object in a signal path, calculates the distance to the object, calculates the speed of the object relative to the speed of the vehicle and, if the distance is less than an operator programmed distance within the microcomputer, causes visualization of the speed on an appropriate display as well as causing an audible alarm to sound.

20. A system for avoiding a vehicular collision by detecting an object in proximity to a vehicle at any angle relative thereto including:

rotatable means for creating an ultrasonic signal and receiving an echo thereof;

means for calculating the time between creation and receiving of said signal;

means for determining from which rotational position said echo is received;

means for modifying said time calculation relative to speed of a vehicle to which the system is engaged;

means for generating a warning signal if said modified time calculation generates a value within predefined limits; and means for resetting said system to cause said signal creating means to generate and receive an echo of another ultrasonic signal at an adjacent rotational position to which said signal creating means are rotated.

21. The system of claim 20 wherein said system further includes means for converting a signal to a binary coded decimal and outputting same to a comparator for a comparison.

22. The system of claim 21 wherein said system further includes means for determining the speed of the vehicle to which the system is engaged.

23. The system of claim 22 wherein said rotatable means comprise a rotational base having detents thereon which, when singularly engaged to a conductive receiving element, create a signal indicative of said detent.

24. The system of claim 23 wherein said system is further engaged to a seat adjusting lever in a manner to sense seat adjustment for adjusting said system resetting means.

25. The system of claim 24 wherein said system is engaged to a mirror in a manner to adjust same to a position determined by analyzing the echo of said signal generating means.

26. The system of claim 25 including means engaged to a drive train of said vehicle to determine if the vehicle is operating in a forward or reverse mode.

27. The system of claim 26 including means for determining if the vehicle is standing still.

28. The system of claim 27 further including means for storing an operator selected set of operating parameters.

29. The system of claim 28 wherein said storing means are engaged to processing means which access the stored parameters for comparisons of said stored parameters to calculated parameters.

30. The system of claim 29 wherein said stored parameters include: operator identification; vehicle speed; and vehicle motion.

31. The system of claim 30 wherein said mirror is initialized to operator chosen position.

32. The system of claim 31 wherein said mirror is rotated to a calculated position up receiving a signal echo from a position which is not accommodated by the initialized position for viewing by the operator.

33. The system of claim 32 including means for taking a first and a second echo signal, said signals both coming from the same position, and calculating the time difference between them to calculate a change in relative velocity between the echo producing object and the vehicle to which the system is mounted.

34. The system of claim 33 wherein said means for calculating comprise a microprocessor.

35. The system of claim 34 wherein said means for storing comprise a random access memory.

36. A system for avoiding a vehicular collision by detecting an object in proximity to a vehicle at any angle relative thereto including:
   rotatable means for creating an ultrasonic signal and receiving an echo thereof;
   means for calculating the time between creation and receiving of said signal;
   means for converting the calculated time to a distance equivalent;
   means for determining from which rotational position said echo is received;
   means for modifying said distance equivalent relative to speed of a vehicle to which the system is engaged;
   means for generating a warning signal if said modified distance equivalent generates a value within predefined limits; and
   means for resetting said system to cause said signal creating means to generate and receive an echo of another ultrasonic signal at an adjacent rotational position to which said signal creating means are rotated.

37. The system of claim 36 wherein said means for converting time to distance apply:

$$X(902) = 1125 * T(901)/2$$
where;
$X(902)$ = calculated distance to object
$1125$ = speed of the ultrasonic sound wave
$T(901)$ = value of timer for conversion.

38. The system of claim 37 wherein said means for modifying said distance equivalent apply:

$$X(908) = X(902) \pm [S(906) * .1]$$
where;
$X(908)$ = the predicted distance of the stationary object
$X(902)$ = the first measured distance to the object
$S(906)$ = the current vehicle speed
$.1$ = time interval between distance measurement $X(902)$ and a consecutive distance measurement to obtain predicted distance to the stationary object.

39. The system of claim 38 wherein said means for modifying said distance equivalent further apply:

$$RS(912) = [X(902) - X(904)]/.1$$
where:
$RS(912)$ = the calculated relative speed between the vehicle and the object;
$X(902)$ = the first distance measurement for the object;
$X(904)$ = the second distance measurement for the object to calculate relative speed between the vehicle and the object.

40. The system of claim 39 wherein said means for generating a warning signal apply:

$$X(990) = X(???) + ([S(906)/.1] * 20)$$
where;
$X(990)$ = modified driver programmed distance
$X(???)$ = chosen driver programmed distance (either driver programmed distance $X(910)$, $X(912)$, $X(914)$, or $X(916)$
$S(906)$ = current vehicle speed
to obtain a modified driver programmed distance based on vehicle speed.

41. The system of claim 40 wherein said means for modifying said distance equivalent relative to vehicle speed apply:

$$X(916) = X(904) - [RS(912) * 3]$$
where:
$X(916)$ = the predicted distance to the object within 3 seconds;
$X(904)$ = the second measured distance to the object;
$RS(912)$ = the relative speed of the object with respect to the vehicle
to determine a predicted distance to an object within 3 seconds based on relative speed of the object and the vehicle.

42. The system of claim 41 wherein said means for modifying said distance equivalent further apply:

$$X(920) = S(906) * 2$$
where;
$X(920)$ = the predicted distance the vehicle will travel within two seconds
$S(906)$ = the current vehicle speed
to determine the distance the vehicle will travel in two seconds at a particular speed.

* * * * *